United States Patent
Salem et al.

(10) Patent No.: US 11,140,579 B2
(45) Date of Patent: Oct. 5, 2021

(54) METHOD AND SYSTEM FOR JOINT ACCESS TO UNLICENSED SPECTRUM

(71) Applicant: Huawei Technologies Co., Ltd., Shenzhen (CN)

(72) Inventors: Mohamed Adel Salem, Kanata (CA); Jiayin Zhang, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/005,564

(22) Filed: Jun. 11, 2018

(65) Prior Publication Data

US 2019/0380064 A1 Dec. 12, 2019

(51) Int. Cl.
*H04W 28/16* (2009.01)
*H04W 74/08* (2009.01)
*H04W 16/14* (2009.01)

(52) U.S. Cl.
CPC ........... *H04W 28/16* (2013.01); *H04W 16/14* (2013.01); *H04W 74/0808* (2013.01)

(58) Field of Classification Search
CPC .. H04W 16/14; H04W 74/0808; H04W 28/16
See application file for complete search history.

(56) References Cited

U.S. PATENT DOCUMENTS

| 10,420,088 B2* | 9/2019 | Ang | H04W 72/12 |
| 2014/0140314 A1* | 5/2014 | Wei | H04W 48/12 |
| | | | 370/329 |

(Continued)

FOREIGN PATENT DOCUMENTS

| CN | 104219017 A | 12/2014 |
| CN | 107113795 A | 8/2017 |
| WO | 2018076307 A1 | 5/2018 |

OTHER PUBLICATIONS

3GPP TS 36.213 V15.1.0 (Mar. 2018); 3rd Generation Partnership Project; Technical Specification Group Radio Access Network; Evolved Universal Terrestrial Radio Access (E-UTRA); Physical layer procedures (Release 15); (Section 15.1.5 Channel access procedure for transmission(s) on multiple carriers).

(Continued)

*Primary Examiner* — Qun Shen
(74) *Attorney, Agent, or Firm* — Slater Matsil, LLP

(57) ABSTRACT

Aspects of the present disclosure provided methods and devices for a transmit receive point (TRP) to access one or more unlicensed channels in an unlicensed spectrum jointly with at least one other TRP. An example method may include a step of aligning a starting time of a potential transmission on at least one of the one or more unlicensed channels with a starting time of a potential transmission of at least one other TRP on the at least one of the one or more unlicensed channels. A further step includes performing channel access on the at least one of the one or more unlicensed channels by performing at least one of a spatial domain channel access procedure or a combination of a spatial domain channel access procedure and a frequency domain multi-channel access procedure. Another step includes transmitting at the aligned starting time on the at least one of the one or more unlicensed channels in the joint access period when the at least one of the one or more unlicensed channels is available.

25 Claims, 22 Drawing Sheets

(56) References Cited

U.S. PATENT DOCUMENTS

| | | | |
|---|---|---|---|
| 2014/0341024 A1* | 11/2014 | Bhushan | H04L 1/00 370/230.1 |
| 2014/0341034 A1 | 11/2014 | Hui | |
| 2015/0312279 A1* | 10/2015 | Wentink | H04W 74/0816 370/329 |
| 2015/0341921 A1* | 11/2015 | Chen | H04W 74/004 370/330 |
| 2016/0056935 A1* | 2/2016 | Damnjanovic | H04W 76/27 370/252 |
| 2016/0174217 A1 | 6/2016 | Salem et al. | |
| 2016/0192396 A1* | 6/2016 | Ng | H04W 16/14 370/329 |
| 2016/0302226 A1* | 10/2016 | Kim | H04W 72/1289 |
| 2016/0345206 A1* | 11/2016 | Yerramalli | H04W 72/042 |
| 2017/0070962 A1* | 3/2017 | Wang | H04W 52/241 |
| 2017/0086152 A1* | 3/2017 | Li | H04W 72/0446 |
| 2017/0188336 A1* | 6/2017 | Ahn | H04W 72/04 |
| 2017/0231006 A1* | 8/2017 | Yin | H04W 74/0816 |
| 2018/0054792 A1* | 2/2018 | Lee | H04L 5/00 |
| 2018/0124834 A1 | 5/2018 | Salem et al. | |
| 2018/0167137 A1* | 6/2018 | Azizi | H04B 7/2656 |
| 2019/0075596 A1* | 3/2019 | Ye | H04L 5/0035 |

OTHER PUBLICATIONS

Qualcomm Incorporated, "Multi-carrier LBT operation", 3GPP TSG RAN WG1 #82, R1-153868, Aug. 24-28, 2015, 6 Pages, Beijing, China.

Huawei et al., "Coexistence and channel access for NR unlicensed band operations", 3GPP TSG RAN WG1 Adhoc Meeting, R1-1800041, Jan. 22-26, 2018, 7 Pages, Vancouver, Canada.

Huawei et al., "Coexistence and channel access for NR unlicensed band operations", 3GPP TSG RAN WG1 Meeting #92bis, R1-1803679, Apr. 16-20, 2018, 7 Pages, Sanya, China.

Huawei et al., "Analysis on LBT with category 2 and 4 for eLAA", 3GPP TSG RAN WG1 Meeting #84, R1-160297, Feb. 15-19, 2016, 5 Pages, St. Julian's, Malta.

* cited by examiner

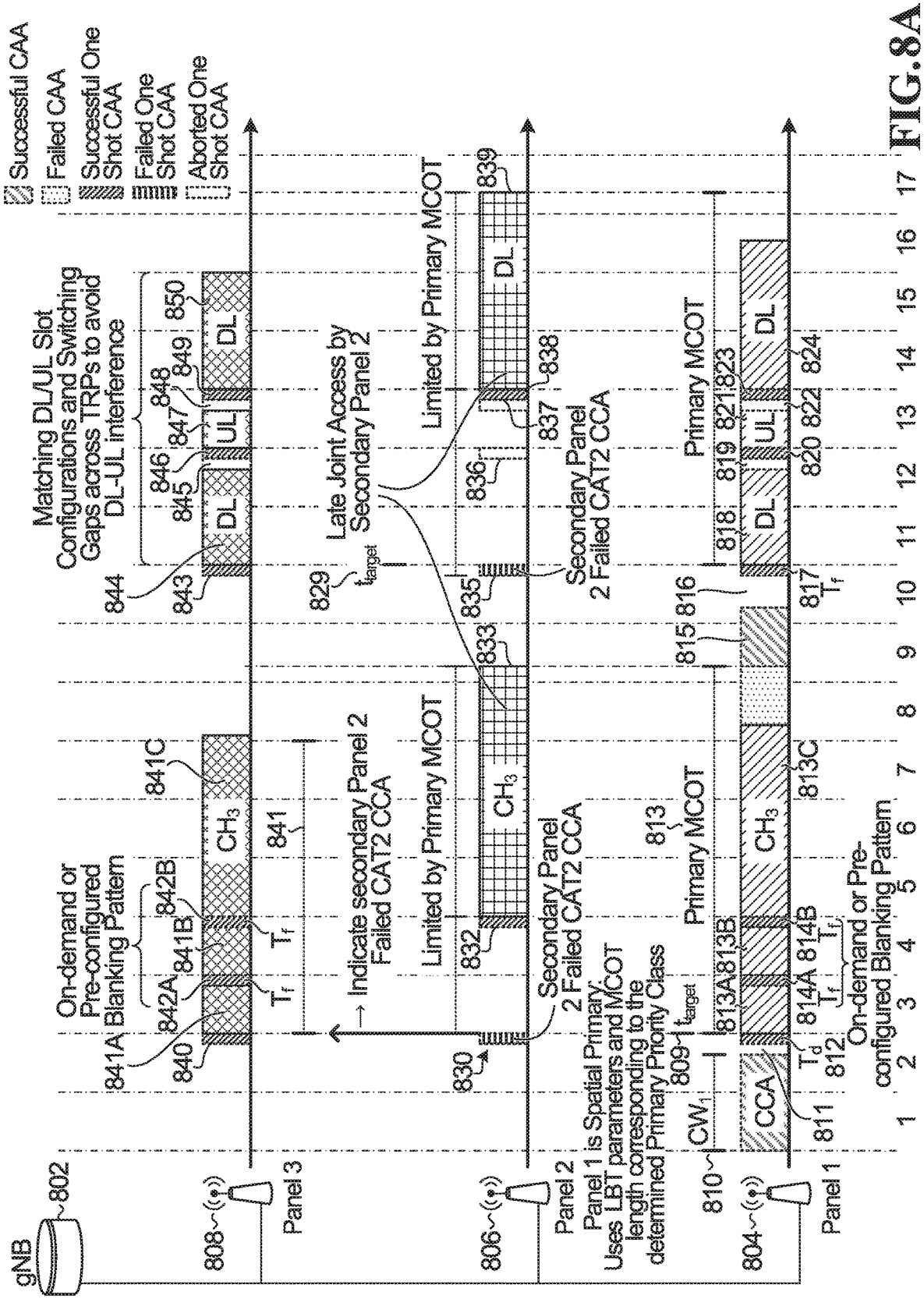

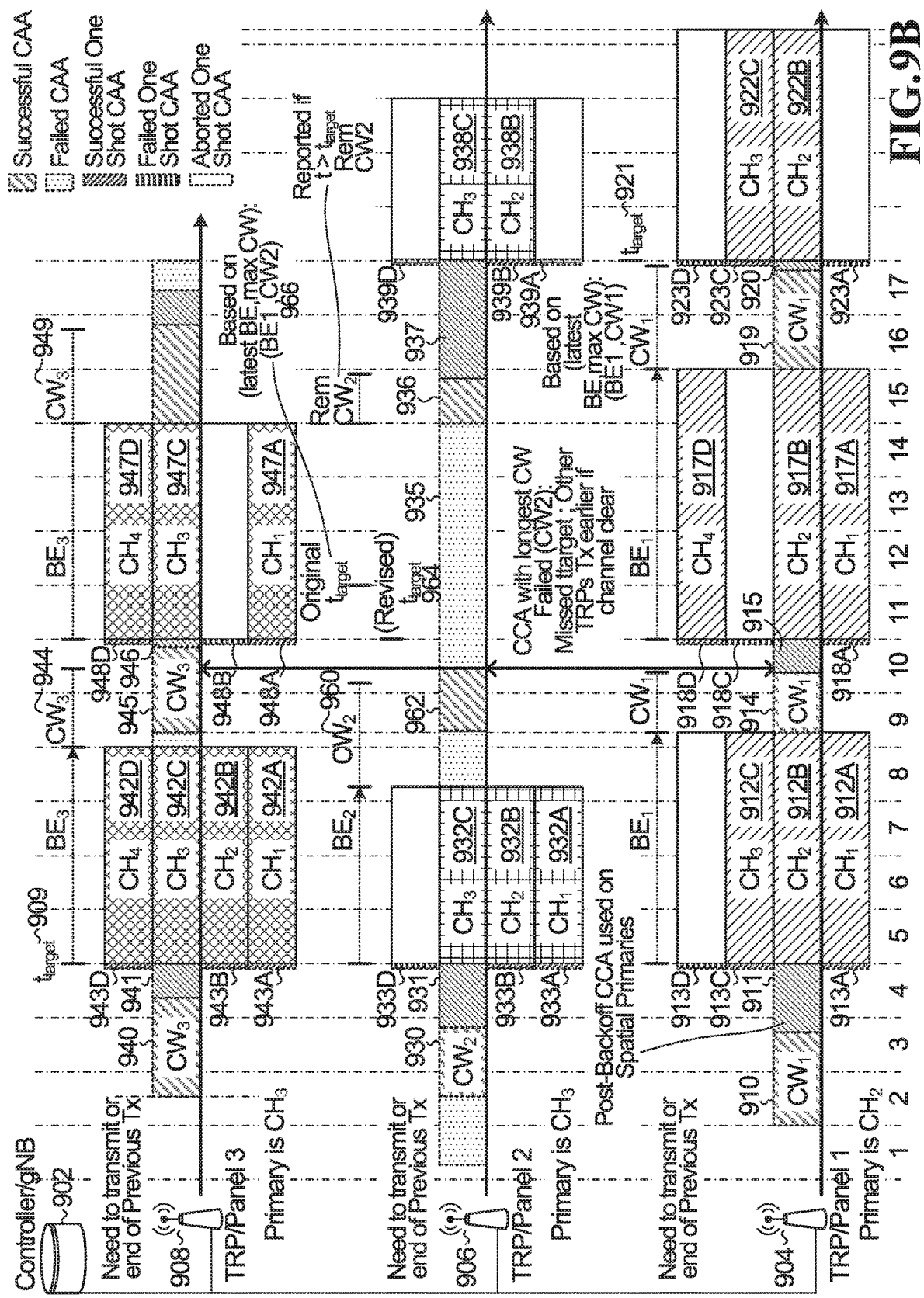

METHOD AND SYSTEM FOR JOINT ACCESS TO UNLICENSED SPECTRUM

TECHNICAL FIELD

The present application relates to mobile air interface technologies, in particular to methods and systems for access to unlicensed spectrum by transmit receive points (TRPs).

BACKGROUND

There is ongoing interest in increasing the use of unlicensed spectrum. There is special interest in aggregating unlicensed spectrum to licensed spectrum, in order to increase resources of a network when needed. Licensed assisted access ("LAA") allows access to unlicensed spectrum via unlicensed component carrier, with assistance from primary component carriers (PCC) operating on licensed spectrum. LAA aims to port the Mobile Broadband (MBB) air interface to the unlicensed spectrum through aggregating unlicensed component carriers (CCs) at the operator's small cells. Small cells (also referred to as low power nodes (LPNs)) are low-powered radio access nodes that may operate in both the licensed and unlicensed spectrum, and have a relatively short coverage range (e.g., within 200 m from antenna(s) of the small cell). The 5 GHz unlicensed spectrum, commonly used by wireless local area networks (WLANs), is of particular interest.

Some existing technologies transmit a blocking signal or use a deferring time period between a clear channel assessment (CCA) process completing time and a downlink transmission starting time, and unlicensed spectrum is not used for downlink transmission during this period. As well, other TRPs of WLAN or other LAA groups may start downlink transmission during the deferring time period and thus cause downlink transmission collisions. In addition, some existing technologies have aggressive schemes to access unlicensed spectrum.

LAA is directed to individual TRPs accessing one or more channels and does not support spatial reuse.

It is important for a technology to access unlicensed spectrum in a fair and efficient manner, so that satisfactory intra-operator or inter-operators coexistence performance as well as satisfactory coexistence performance with incumbent WLAN may be achieved. With the envisioned dense deployments and/or high channel occupancy of WLAN, e.g., IEEE802.11ac, and LAA networks, it is more challenging to attain coexistence fairness. New Radio Unlicensed (NR-U) networks are being developed in part to address such concerns.

SUMMARY

The present disclosure describes methods and systems for access to unlicensed spectrum by a group of transmit receive points (TRPs). A group of TRPs can include any of a group of base stations (for example gNBs) that are spatially distributed with ideal or non-ideal backhaul/fronthaul connections, a group of antenna panels of the same gNB (intra-site panels) or a group of antennas with different QCL (quasi co-located) assumptions, i.e., with different large-scale channel parameters. Therefore, an individual TRP may be a gNB, a radio head, an antenna set of a gNB or one of multiple antenna sets with different QCL assumptions.

An objective of embodiments of the present disclosure is to access unlicensed spectrum in an efficient manner. In embodiments of the present application, optional objectives may also include to avoid downlink transmission collisions, and, to improve coexistence fairness with other radio access technologies, and enable advanced transmission schemes such as coordinated multi-point transmission (CoMP) in the unlicensed spectrum.

According to an aspect of the present application there is provided a method for a transmit receive point (TRP) to access one or more unlicensed channels in an unlicensed spectrum jointly with at least one other TRP. the method includes: aligning a starting time of a potential transmission on at least one of the one or more unlicensed channels with a starting time of a potential transmission of at least one other TRP on the at least one of the one or more unlicensed channels; performing channel access on the at least one of the one or more unlicensed channels by performing at least one of a spatial domain channel access procedure or a combination of a spatial domain channel access procedure and a frequency domain multi-channel access procedure; and transmitting at the aligned starting time on the at least one of the one or more unlicensed channels in the joint access period when the at least one of the one or more unlicensed channels is available.

In some embodiments, the method further includes receiving a configuration from a central controller including an indication of a type of a spatial domain channel access procedure and a type of a frequency domain multi-channel access procedure to be used for joint access to the one or more unlicensed channels.

In some embodiments, performing channel access includes performing a first type of clear channel assessment (CCA) for at least one of the one or more unlicensed channels by configuring the TRP with a random back-off counter for at least one unlicensed channel for the first type of CCA.

In some embodiments, configuring the TRP with a random back-off counter for at least one unlicensed channel for a first type of CCA includes configuring the TRP with a different random back-off counter for one of the unlicensed channels than a random back-off counter for one of the unlicensed channels for the at least one other TRP.

In some embodiments, configuring the TRP with a random back-off counter for at least one unlicensed channel for a first type of CCA includes configuring the TRP with the same random back-off counter for one of the unlicensed channels as a random back-off counter for one of the unlicensed channels for the at least one other TRP.

In some embodiments, the random back-off counter is generated from a single distribution for a contention window based at least in part on the channel access priority class.

In some embodiments, the random back-off counter is generated from a distribution for a contention window corresponding to a largest channel access priority class value of all of the unlicensed channels across the set of the TRP and the at least one other TRP.

In some embodiments, configuring the TRP with a random back-off counter for at least one unlicensed channel for a first type of CCA includes configuring the TRP with a random back-off counter for all of the unlicensed channels that is different than a random back-off counter for all of the unlicensed channels for the at least one other TRP.

In some embodiments, configuring the TRP with a random back-off counter for at least one unlicensed channel for a first type of CCA includes configuring the TRP with a random back-off counter for all of the unlicensed channels that is that same as a random back-off counter for all of the unlicensed channels for the at least one other TRP.

In some embodiments, performing the first type of CCA for at least one of the one or more unlicensed channels includes performing a wideband (WB) CCA for all of the unlicensed channel simultaneously.

In some embodiments, the method further includes, upon the TRP determining that the WB channel is busy during a CCA slot of the WB CCA, changing from the WB CCA to sub-band CCA for the remaining CCA slots without terminating the channel access procedure for each separate unlicensed channel.

In some embodiments, determining that the WB channel is busy during a CCA slot of the WB CCA comprises receipt of a notification of CCA failure.

In some embodiments, the method further includes the TRP performing a second type of CCA for at least one of the one or more unlicensed channels immediately prior to the starting time of the potential transmission on the one or more of the unlicensed channels.

In some embodiments, the method further includes, when the first type of CCA or the second type of CCA senses an unlicensed channel to be busy during a CCA slot, the TRP sending a notification of at least one of a CCA failure and a missed starting time of a potential transmission to the at least one other TRP.

In some embodiments, the method further includes receiving a notification of an earlier starting time of a potential transmission than a previously scheduled starting time of a potential transmission and realigning the starting time of the potential transmission accordingly.

In some embodiments, a duration between an end of the first type of CCA and the starting time of a potential transmission are defined by at least one of a self-deferral duration, a post-back-off CCA and a duration of a second type of CCA.

According to an aspect of the present application there is provided a transmit receive point (TRP) comprising at least one antenna configured to transmit or receive a signal and a controller. The controller is configured to: align a starting time of a potential transmission on at least one of the one or more unlicensed channels with a starting time of a potential transmission of at least one other TRP on the at least one of the one or more unlicensed channels; perform channel access on the at least one of the one or more unlicensed channels by performing at least one of a spatial domain channel access procedure or a combination of a spatial domain channel access procedure and a frequency domain multi-channel access procedure; and transmit at the aligned starting time on the at least one of the one or more unlicensed channels in the joint access period when the at least one of the one or more unlicensed channels is available.

In some embodiments, the TRP is further configured to receive on the at least one antenna, a configuration from a central controller including an indication of a type of a spatial domain channel access procedure and a type of a frequency domain multi-channel access procedure to be used for joint access to the one or more unlicensed channels.

In some embodiments, the controller configured to perform channel access comprises the controller performing a first type of clear channel assessment (CCA) for at least one of the one or more unlicensed channels by configuring the TRP with a random back-off counter for at least one unlicensed channel for the first type of CCA.

In some embodiments, the controller configuring the TRP with a random back-off counter for at least one unlicensed channel for a first type of CCA includes configuring the TRP with a different random back-off counter for one of the unlicensed channels than a random back-off counter for one of the unlicensed channels for the at least one other TRP.

In some embodiments, the controller configuring the TRP with a random back-off counter for at least one unlicensed channel for a first type of CCA includes configuring the TRP with the same random back-off counter for one of the unlicensed channels as a random back-off counter for one of the unlicensed channels for the at least one other TRP.

In some embodiments, the controller performing the first type of CCA for at least one of the one or more unlicensed channels includes performing a wideband (WB) CCA for all of the unlicensed channel simultaneously.

In some embodiments, the controller is further configured to, upon the TRP determining that the WB channel is busy during a CCA slot of the WB CCA, change from the WB CCA to sub-band CCA for the remaining CCA slots without terminating the channel access procedure for each separate unlicensed channel.

In some embodiments, the controller is further configured to perform a second type of CCA for at least one of the one or more unlicensed channels immediately prior to the starting time of the potential transmission on the one or more of the unlicensed channels.

In some embodiments, when the first type of CCA or the second type of CCA senses an unlicensed channel to be busy during a CCA slot, the TRP sends a notification of at least one of a CCA failure and a missed starting time of a potential transmission to the at least one other TRP.

BRIEF DESCRIPTION OF THE DRAWINGS

Reference will now be made, by way of example, to the accompanying drawings which show example embodiments of the present application, and in which:

FIG. 8A is a diagram illustrating a seventh example for a group of TRPs attempting to jointly accessing a single channel in unlicensed spectrum according to one embodiment of the present disclosure;

Similar reference numerals may have been used in deferent figures to denote similar components. Although aspects of the invention will be described in conjunction with the illustrated embodiments, it will be understood that it is not intended to limit the invention to such embodiments.

DETAILED DESCRIPTION OF ILLUSTRATIVE EMBODIMENTS

Figure 1:
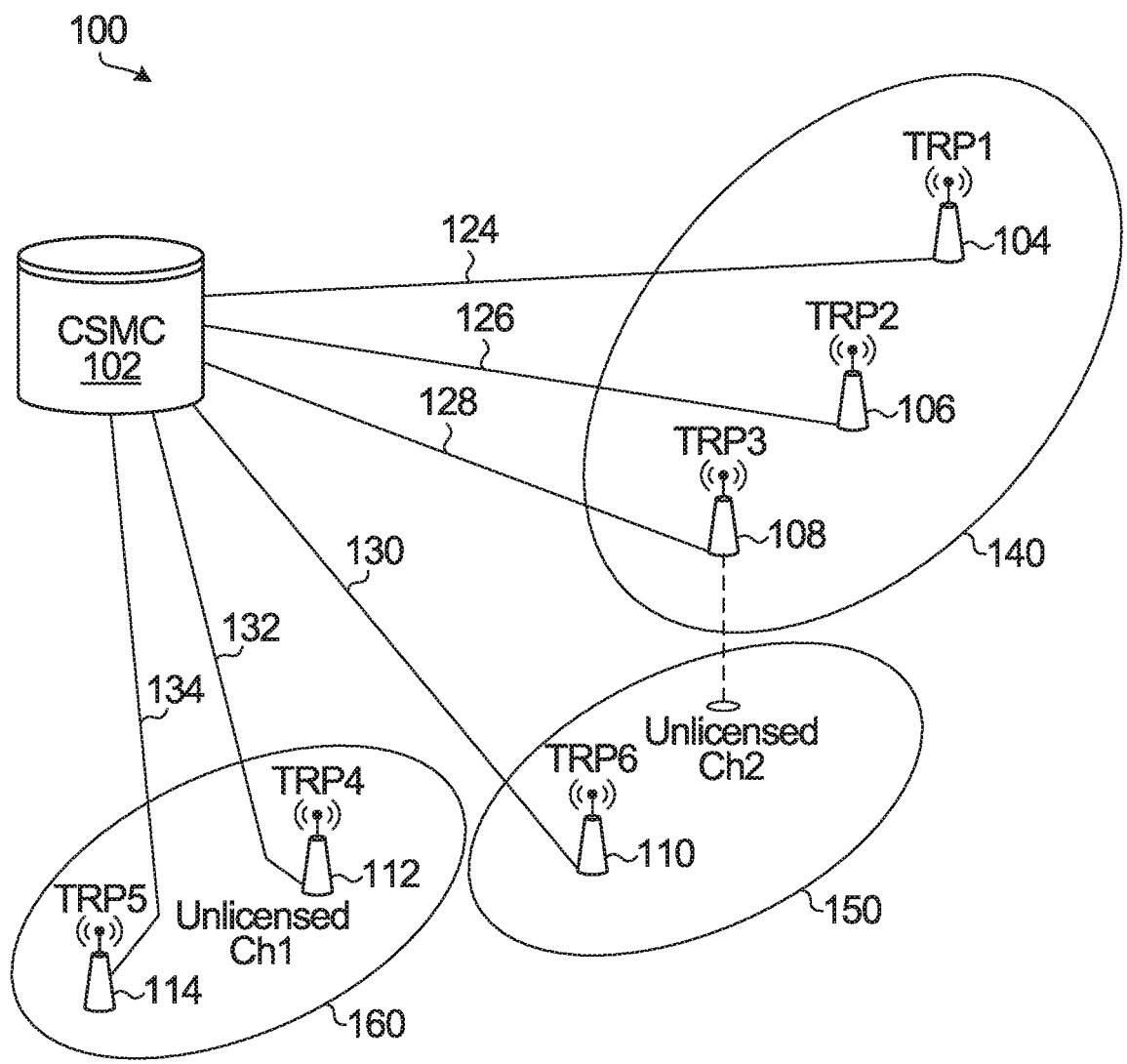
FIG. 1 is a block diagram illustrating an example communications system in accordance with one implementation of the present disclosure.

The present disclosure teaches methods and systems for accessing the unlicensed spectrum. Although described below primarily with respect to New Radio Unlicensed (NR-U) networks, the present disclosure may also be applied to other networks operating on unlicensed spectrum.

Listen-Before-Talk (LBT) mechanism may be used for access to unlicensed spectrum. A TRP may access a medium (which in the case of this application is unlicensed spectrum) to transmit its downlink transmission, such as a downlink burst during a channel occupancy time (COT), when the medium is sensed by the TRP to be available or idle for a predefined period. Such a period may be a clear channel assessment (CCA) period. A downlink transmission, such as a downlink COT, may include downlink user data and/or control signaling. A downlink COT may further include UL data and/or control signaling occurring after a DL-to-UL switching time gap.

The LBT mechanism specified for LAA (Release 13 to 15 of 3GPP standard) relies only on energy detection (ED) to determine the availability of the medium and it is considered the baseline for designing the channel access mechanism for NR-U. If the same ED threshold is used, this LBT mechanism is more aggressive than the carrier sense multiple access with collision avoidance (CSMA/CA) mechanism currently used by WLAN. This is because the CSMA/CA mechanism used by WLAN can be 20 dB more sensitive in detecting the presence of other WLAN signals through Physical Carrier sense and MAC (virtual) Carrier sense.

As well, joint access by NR-U TRPs is desired to simplify NR-U interference measurement and management. In particular, joint access by NR-U TRPs may help address an intra-NR-U operator "exposed node" problem that may result in improved spectral efficiency. The "exposed node" problem occurs when for two neighboring NR-U TRPs operating independently, although not interfering with each other, one may nonetheless block the other's access to the medium. When two TRPs are not interfering with each other's transmission, their respective served UEs are outside the overlapping coverage area. The medium may be the unlicensed spectrum, an unlicensed spectrum channel, or a set of unlicensed spectrum channels. The other TRP may perceive that the medium is busy when it senses the presence of a transmission of the one TRP on the medium. When the medium is perceived as busy by a TRP, the TRP considers that the medium is unavailable at its scheduled downlink transmission starting time. When the two TRPs are grouped together, such as in the same group or Radio Access Cluster (RAC), the TRPs may jointly access the medium as one group. The group of the TRPs can access the medium at the same starting time, i.e., synchronously. A first TRP will not block access to the medium by the second TRP because the second TRP has already started transmitting over the medium.

Joint access by NR-U TRPs may also provide more effective protection from co-channel interference that occurs due to a "hidden node" co-channel interference problem. The "hidden node" problem occurs where a node within the coverage area of a first NR-U TRP may not be in the coverage area of a neighboring second NR-U TRP. However, the node may still interfere with transmissions by the second TRP. By grouping the first and second TRPs together as a single group or RAC, transmissions from the first TRP may block the channel access of the node and thus protect the transmission of the first TRP.

Joint access of neighboring TRPs may also enable features such as aligning the transmissions of neighboring TRPs so as to enable more airtime for coexisting nodes and hence improving coexistence fairness, enabling advanced transmission schemes such as Coordinated Multi-Point (CoMP).

FIG. 1 illustrates an example system 100 in which examples described herein may be implemented. The system 100 may be used in an NR-U network.

In the example system 100, a controller manages operation of a plurality of TRP groups, such as RACs, for example, TRP groups 140, 150, and 160. In an embodiment, the controller may be a central spectrum management control unit (CSMC) 102. A CSMC 102 is a network logical controller, which may be hosted by a Macro gNB or a TRP connected to the TRPs of a group. The CSMC 102 may define one or more RACs for the TRPs managed by the CSMC 102. Each RAC may be channel-specific or channel set-specific—that is, each RAC may be defined to use an unlicensed spectrum channel or a set of unlicensed channels that is different from an adjacent RAC. Several examples of mechanisms to group TRPs into disjoint groups or RACs are described in U.S. application Ser. No. 14/869,617, which is incorporated into this application by reference.

Each group or RAC may include one or more TRPs and each TRP may belong to one or more groups or RACs. For example, TRP 108 in FIG. 1 belongs to both group 140 and group 150. Each TRP provides unlicensed spectrum access for one or more devices, such as UEs or STAs. A TRP may also be a gNB. In the example of FIG. 1, TRP group 140 may comprise TRP1 104, TRP2 106, and TRP3 108; TRP group 150 may comprise TRP3 108 and TRP6 110; and TRP group 160 may comprise TRP5 112 and TRP5 114.

Each TRP of a TRP group may connect to the CSMC 102 via at least one communication link, for example, a backhaul connection link, such as backhaul connection links 124, 126, 128, 130, 132, or 134. Message between the TRPs and the CSMC 102 may be exchanged via communication links. The communication links may be wireless communication link, such as microwave links, or wired links, such as optical fiber links. The CSMC 102 may manage the TRPs via one or more communication links.

Joint access of TRPs, including NR-U TRPs, is desired to opportunistically achieve a frequency reuse factor of one. As shown in TRP groups 140, 150 and 160, TRP group 140 may use unlicensed spectrum channel 1, TRP group 150 may use unlicensed spectrum channel 2, and TRP group 160, the coverage area of which does not overlap with that of the TRP group 140, may re-use unlicensed spectrum channel 1. Grouping TRPs into a group allows the same unlicensed channel to be used by all of the TRPs of the TRP group. As such, a frequency reuse factor of one of the TRPs within a TRP group may be achieved. With respect to a TRP belonging to more than one TRP groups, the TRP uses the unlicensed spectrum channel assigned to the specific TRP group when the TRP operates as a member of the TRP group. For example, when TRP3 108 of FIG. 1 operates as a member TRP of TRP group 140, TRP3 108 uses the unlicensed channel assigned to TRP group 140, namely, the unlicensed channel 1; and when TRP 108 operates as a member TRP of TRP group 150, TRP3 108 uses the unlicensed spectrum channel assigned to group 150, namely, the unlicensed spectrum channel 2.

Although FIG. 1 only illustrates one CSMC 102, multiple CSMCs may be used to manage a plurality of TRPs. The CSMCs may be interconnected via backhaul connection links or interfaces, such as X2 or 5G Xn. As well, the numbers of TRPs of each TRP group managed by the CSMC 102 may also be varied.

Figure 2:
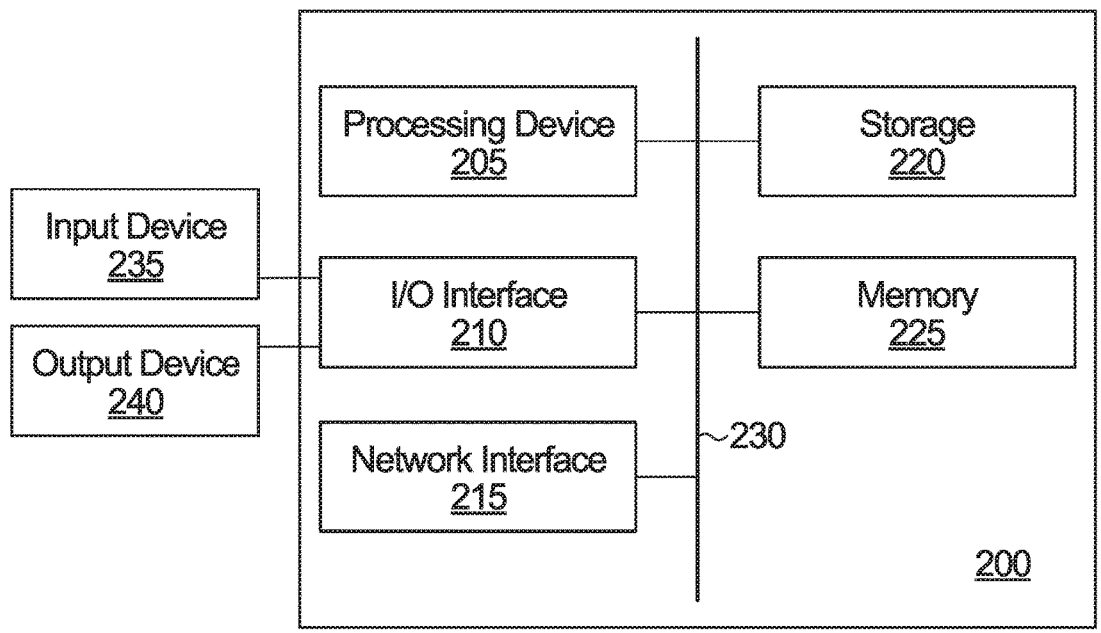
FIG. 2 is a block diagram illustrating an example processing system in accordance with one implementation of the present disclosure.

FIG. 2 is a block diagram of an example processing system 200, which may be used to implement the methods and systems disclosed herein. The processing system 200 may be a component of a CSMC, a gNB, or a TRP. Other processing systems suitable for implementing the present disclosure may also be used, which may include components differing from those discussed below. Although FIG. 2 shows a single instance of each component, there may be multiple instances of each component in the processing system 200.

The processing system 200 may include one or more processing devices 205, such as a processor, a microprocessor, an application-specific integrated circuit (ASIC), a field-programmable gate array (FPGA), a dedicated logic circuitry, or combinations thereof. The processing system 200 may also include one or more input/output (I/O) interfaces 210, which may enable interfacing with one or more appropriate input devices 235 and/or output devices 240. The processing system 200 may include one or more network interfaces 215 for wired or wireless communication with a network (e.g., a wireless core network, an intranet, the Internet, a P2P network, a WAN and/or a LAN). The network interface(s) 215 may include wired links (e.g., Ethernet cable, or fiber optical links) and/or wireless links (e.g., one or more microwave links, or satellite links) for intra-network and/or inter-network communications. The network interface(s) 215 may provide wireless communication via one or more transmitters or transmitting antennas and one or more receivers or receiving antennas, for example. The processing system 200 may also include one or more storage units 220, which may include a mass storage unit such as a solid state drive, a hard disk drive, a magnetic disk drive and/or an optical disk drive.

The processing system 200 may include one or more memories 225, which may include a volatile or non-volatile memory (e.g., a flash memory, a random access memory (RAM), and/or a read-only memory (ROM)). The non-transitory memory(ies) 225 may store instructions for execution by the processing device(s) 205, such as to carry out examples described herein. The memory(ies) 225 may include other software instructions, such as for implementing an operating system and other applications/functions. In some examples, one or more data sets and/or module(s) may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 230 providing communication among components of the processing system 200, including the processing device(s) 205, I/O interface(s) 210, network interface(s) 215, storage unit(s) 220 and/or memory(ies) 225. The bus 230 may be any suitable bus architecture including, for example, a memory bus, a peripheral bus or a video bus.

In FIG. 2, the input device(s) 235 (e.g., a keyboard, a mouse, a microphone, a touchscreen, and/or a keypad) and output device(s) 240 (e.g., a display, a speaker and/or a printer) are shown as external to the processing system 200. In other examples, one or more of the input device(s) 235 and/or the output device(s) 240 may be included as a component of the processing system 200.

Figure 3A:
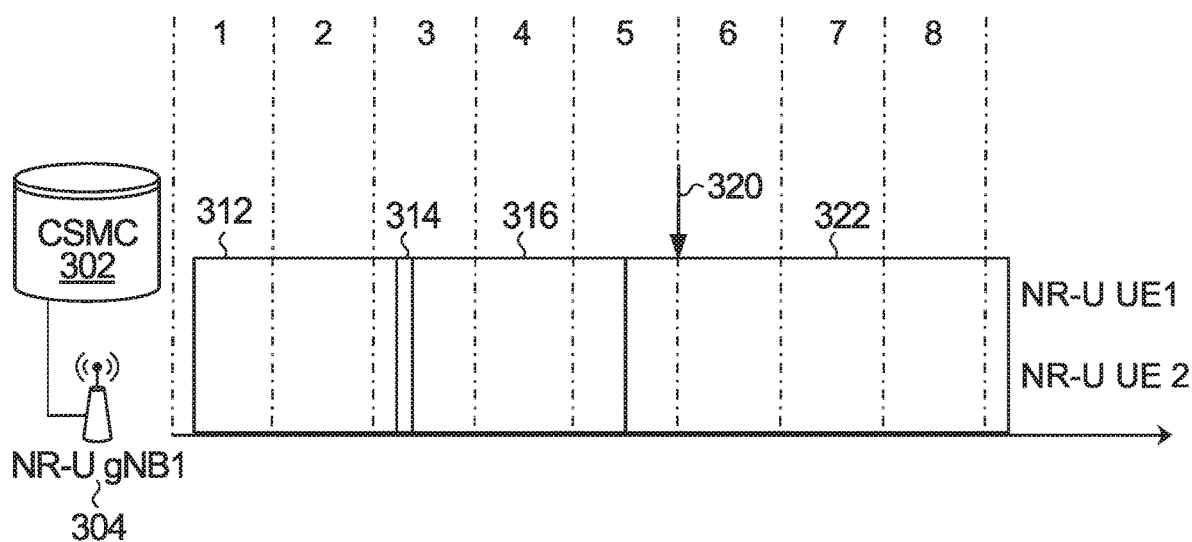
FIG. 3A is a diagram illustrating a mechanism for access to unlicensed spectrum by a single New Radio Unlicensed (NR-U) gNB.

FIG. 3A illustrates a category 4 (CAT4) LBT mechanism for a single NR-U gNB to access a medium. In FIG. 3A, a TRP group is associated with a CSMC 302, and an NR-U gNB1 304. The CSMC 302 is connected to the gNB1 304 via a backhaul connection link. The gNB1 304 may provide unlicensed spectrum access to NR-U UE1 and NR-U UE2. The horizontal axis of the plot in FIG. 3A is divided into marked intervals labeled from 1 to 8. The marked intervals are the boundaries of a particular time unit. The time unit may be a slot, a mini-slot or a sub-frame boundary. The boundaries may also align with boundaries of time units of the licensed spectrum. In this example, the gNB1 304 first senses, for example using energy detection (ED)-based CCA, that the medium is busy at period 312 that occurs over a portion of interval 1, all of interval 2 and a portion of interval 3. The CCA process includes a Distributed Coordination Function (DCF) InterFrame Space (DIFS) 314 within interval 3 and a random Contention Window (CW) duration 316 that occurs over a portion of interval 3, all of interval 4 and a portion of interval 5. The CW 316 is also called an extended Clear Channel Assessment (eCCA) process. The gNB1 304 independently generates a random back-off counter value, $CW_p$, which corresponds with the CW 316, where CW=$CW_p$×a CCA slot duration. For example, a CCA slot duration may be 9 µs. When the status of the medium is continuously idle for a DIFS duration 314, for example 34 µs, the gNB1 304 continues sensing the medium during the CW 316. When the NR-U gNB1 304 is sensing the medium during CW 316, the back-off counter value initialized with $CW_p$ decrements by 1 when an idle CCA slot duration has elapsed, and is decreased to 0 at the completing time of CW 316. In FIG. 3A, the medium remains idle at the completing time of the CW 316. Release 13 of 3GPP requires LAA TRPs to align their respective downlink burst transmissions during COTs with a starting time of a licensed primary component carrier subframe, or a licensed spectrum subframe, for example the licensed subframe starting time. However, for NR-U, there is no such requirement of aligning the transmission with a starting time of the licensed primary component carrier subframe. The CSMC 302 determines the downlink burst transmission starting time 320 and communicates the starting time 320 to NR-U gNB1 304 via the backhaul connection link, so that NR-U gNB1 304 may access to the medium at the starting time 320. At the starting time 320, which aligns with a starting time of the licensed primary component carrier subframe, gNB1 304 starts transmitting over the medium its downlink bursts to NR-U UE1 and/or NR-U UE2 during the duration of 322.

If during the CW 316, the eCCA process is terminated due to the medium 'busy' assessment, the remaining back-off counter value is frozen to maintain priority in a subsequent medium access attempt of the NR-U gNB1 304. In a particular example, the $CW_p$ value initially generated by the random back-off counter generator of the NR-U gNB1 304 is equal to 5 CCA slot durations, during the CW 316. If the medium becomes busy when the back-off counter value is currently equal to 3 CCA slot durations (i.e. after the counter has been decremented by 2 successful CCA slots), the random back-off counter of the NR-U gNB1 304 is frozen at 3 CCA slot durations. In a subsequent medium access attempt by NR-U gNB1 304, the random back-off counter generator will not generate a new counter value but use the remaining value of 3 CCA slot durations.

Figure 3B:
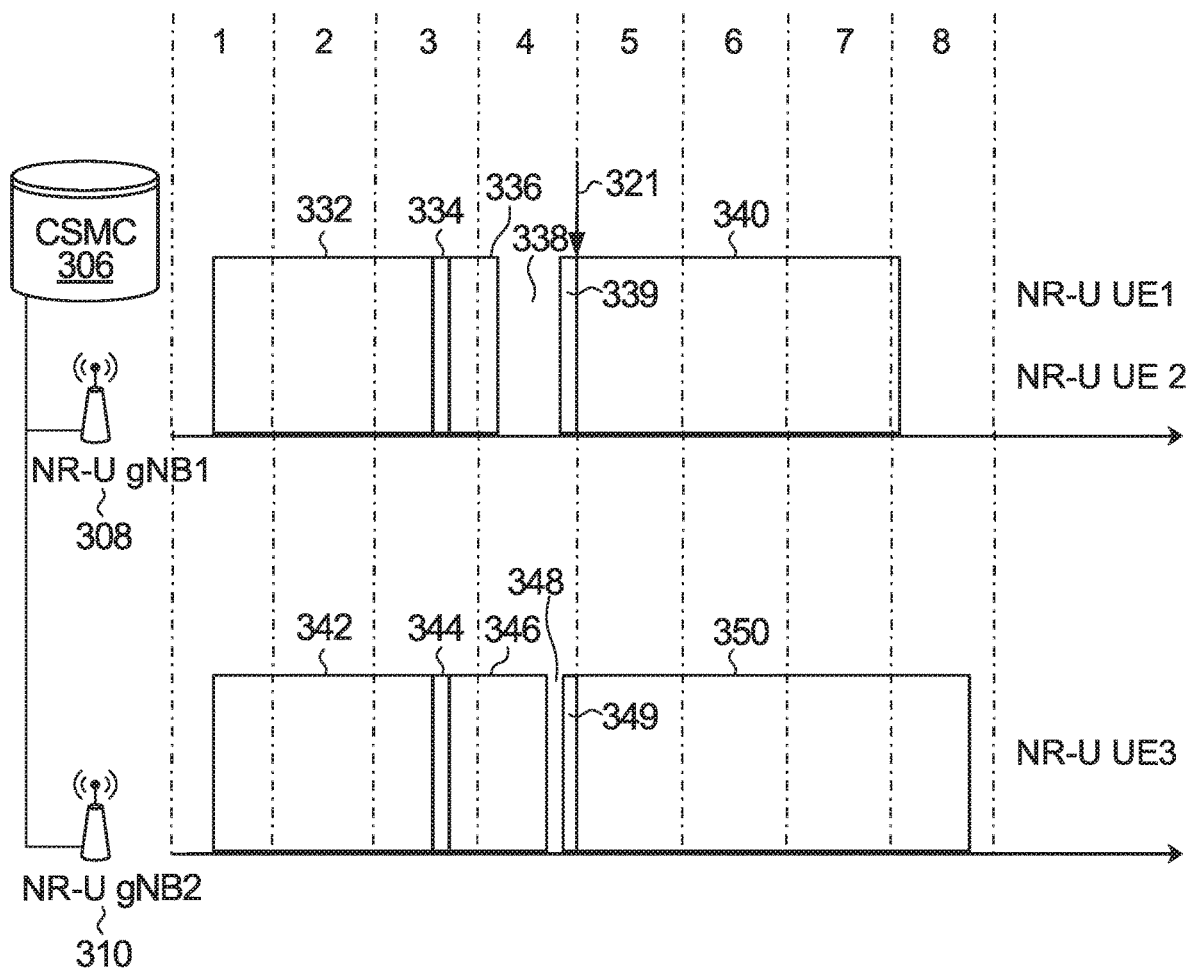
FIG. 3B is a diagram illustrating a mechanism for access to unlicensed spectrum by a group of NR-U gNBs.

FIG. 3B illustrates a CAT4 LBT mechanism for a group of NR-U gNBs to jointly access a medium. In the example of FIG. 3B, a TRP group is associated with a CSMC 306, an NR-U gNB1 308 and an NR-U gNB2 310. The CSMC 306 is connected to each of NR-U gNB1 308 and NR-U gNB2 310 via a backhaul connection link. The NR-U gNB1 308 may provide unlicensed spectrum access to NR-U UE1 and NR-U UE2. The NR-U gNB1 310 may provide unlicensed spectrum access to NR-U UE3. In FIG. 3B, the NR-U gNB1 308 and NR-U gNB2 310 may first sense, for example using ED-based CCA, that the medium is busy at periods 332 and 342, respectively. The NR-U gNB1 308 and NR-U gNB2 310 keep sensing the medium. The NR-U gNB1 308 and NR-U gNB2 310 independently generate respective random back-off counter values $CW_p1$ and $CW_p2$, which corresponds with CW1 336 and CW2 346, respectively, where CW1=cws1×a CCA slot duration and CW2=cws2×a CCA slot duration. For example, a CCA slot duration may be 9 µs. When the status of the medium is continuously idle for a DIFS duration 334 or 344, NR-U gNB1 308 and NR-U eNB2 310 continue sensing the medium during the CW 336 and CW 346. When the NR-U gNB1 308 and NR-U gNB2 310 are sensing the medium during respective CW1 336 and CW2 346, the respective back-off counter values cws1 and cws2 decrement by 1 when a CCA slot duration has elapsed, and are decreased to 0 at the completing time of CW 336 or CW 346, respectively. Similarly, if during the CW1 336 or CW2 346, the CCA process is terminated due to the medium 'busy' assessment, the remaining back-off counter value cws1 or cw2 is frozen to maintain priority in a subsequent medium access attempt of the NR-U gNB1 308 or NR-U gNB2 310.

CW1 336 and CW2 346 may differ from each other. In the example of FIG. 3B, CW1 336 is shorter than CW2 346. The NR-U gNB1 308 and NR-U gNB2 310 continuously assess whether the medium is idle during CW1 336 and CW2 346, respectively, using ED-based CCA. NR-U gNB1 308 can align its downlink burst transmissions with a starting time of a licensed primary component carrier subframe at 321, which occurs after both the CW1 period 336 and CW2 period 346 have completed. Therefore, after the completion of a successful CCA period, each of the NR-U gNB1 308 and the NR-U gNB2 310 defers its downlink burst transmission to a common starting time 321, so that gNB1 308 and gNB2 310 may jointly access the medium at the common downlink subframe transmission starting time 321. The CSMC 306 determines the common starting time 321 and communicates the common starting time 321 to the NR-U gNB1 308 and NR-U gNB2 310 via respective backhaul connection links. After the CCA process has been successfully completed but before the starting time 321, NR-U gNB1 308 invokes a deferring time period 338 for aligning its downlink burst transmission to the starting time 321. Similarly, NR-U gNB2 310 invokes a deferring time period 348 for aligning its transmission of bursts starting at the starting time 321. As such, the NR-U gNB1 308 and NR-U gNB2 310 may jointly access the medium at the common starting time 321.

Similar to the example of the NR-U gNB1 304 in FIG. 3A, during the CW1 336 or CW2 346 period in FIG. 3B, if an eCCA is terminated due to 'busy' assessment, the remaining back-off counter value cws1 of NR-U gNB1 308 or cws2 of NR-U gNB2 310 is frozen to maintain the priority in a subsequent access attempt.

During the deferring time periods 338 and 348, neither the NR-U gNB1 308 nor the NR-U gNB2 310 transmits any signal to notify adjacent TRPs of other networks that the NR-U gNB1 308 or the NR-U gNB2 310 has completed a CCA process. As such, the medium appears to remain idle to TRPs of other networks, such as WLAN or other NR-U networks. Just prior to the end of the deferring time periods 338 and 348 a Category 2 (CAT2) CCA 339,349 can be performed to determine if the channel is still accessible. The CAT2 CCA is a brief one shot CCA that would end at the target start time for accessing the channel. After the deferring time periods 338 and 348, if the CAT2 CCA are successful, the NR-U gNB1 308 and NR-U gNB2 310 start transmitting respective downlink bursts in COTs to NR-U UEs at the common starting time 321 for the durations of 340 and 350, respectively.

In the example of FIG. 3A, the NR-U gNB1 304 transmits a blocking signal 318 on the medium to prevents TRPs of WLAN or other NR-U groups from accessing the medium.

However, in the group access mechanism of FIG. 3B, the NR-U gNB1 308 or the NR-U gNB2 310 in FIG. 3B cannot transmit a blank blocking or reservation signal to prevent TRPs of WLANs or other NR-U groups from accessing the medium during the deferring time period 338 or 348. In FIG. 3B, after the NR-U gNB1 308 has completed its CCA process before the CCA process of the NR-U gNB2 310 is completed, if NR-U gNB1 308 starts transmitting a blocking signal on the medium, if the NR-U gNB2 310 senses the blocking signal, the NR-U gNB2 310 may determine that the medium became "busy" and subsequently terminate its eCCA process. Therefore, the blocking signal may defeat joint access to the medium by a group of TRPs.

On the other hand, because during the deferring time periods 338 and 348, the status of the medium is still idle, adjacent TRPs of WLAN or other NR-U groups that have completed their CCA process before the common starting time 321 may access the medium. In other words, during deferring time periods 338 and 348, the status of the medium may change from idle to busy. The access of the medium by adjacent TRPs of WLAN or other NR-U groups prior to the starting time 321 will not cause the NR-U gNB1 308 and the NR-U gNB2 310 to back off from downlink burst transmissions in COTs at the common starting time 321. As such, when the NR-U gNB1 308 and the NR-U gNB2 310 start transmitting bursts in COT on the downlink of the medium at the common starting time 321, their downlink bursts transmissions in COTs could collide with the transmissions of adjacent TRPs of WLAN or other NR-U groups. This collision may cause back-off delays and throughput losses to other co-existing networks, especially WLANs.

Other versions of CCA may be used as opposed to, or in addition to, the CAT4 CCA. A CAT2 CCA involves a brief one-shot CCA for pre-defined deterministic duration, e.g., 25 or 34 µsec, just prior to a scheduled $t_{target}$ time for accessing a channel for either downlink or uplink. The CAT2 CCA may be used in addition to the CAT4 CCA. For instance, the CAT4 CCA may occur for a period of time, followed by a self-deferral period between the CAT4 CCA and the $t_{target}$ time. To determine if there is any new transmission on the channel since the end of the CAT4 CCA, or if transmission on the channel determined during the CAT4 CCA has dissipated, a CAT2 CCA occurs just before the $t_{target}$ time as a final check to determine if the channel is accessible or not. Another type of CCA is a wideband (WB) CCA. Although the CAT4 CCA and CAT2 CCA are originally defined for single channel CCA, the WB CCA extends the CCA concept to allow a TRP to make a determination of the collective state of multiple contiguous channels simultaneously. In some embodiments of the present disclosure, if there is a determination that a WB channel state is busy, then the WB CCA can be switched, e.g., during the back-off duration CCA, to multiple sub-band CCAs. The sub-band CCAs are performed similar to the original CAT4 CCA or CAT2 CCA.

LAA-specified channel access procedures for transmission(s) on multiple carriers for a single TRP are performed according to one of Type A or Type B procedures as defined in 3GPP TS 36.213 Section 15.1.5. A TRP can access multiple component carriers (CCs), or channels, on which NR-U secondary cell (Scell) transmissions are performed, according to the Type A or Type B procedures. In LAA, each CC is a 20 MHz unlicensed channel. In NR-U, a CC may comprise multiple channels. However, a similar frequency-domain type A-like and type B-like procedure can be applied within one CC.

Type A has two variations for generation of multiple back-off counters of a group of CCs accessible to the TRP. In a first variation, referred to as Type A1, back-off counters used for each CC of the group are generated and maintained independently from different distributions, i.e., using independent values of the priority contention window $CW_p$. The term distribution refers to a particular range of values that the back-off counter can be randomly selected from. In a second variation, referred to as Type A2, the back-off counters for each CC of the group are set to a same number generated from a distribution of a largest priority contention window $CW_p$ of the group of CCs.

For Type B, a single CC of multiple CCs potentially being accessed is selected as a primary channel for which the TRP performs a CAT4 CCA process, and the remainder of a group of multiple CCs are designated as secondary channels. If the CAT4 CCA is successful for the primary CC, then the secondary CCs may have a shorter one-shot CCA process performed on them, such as a CAT2 CCA, immediately before the TRP may access the primary and secondary CCs. If the TRP needs to apply self-deferral after a successful backoff of the CAT4 CCA, a one-shot CCA process may be performed as well on the primary CC before the TRP may access the primary and secondary CCs. Type B also has two variations for generation of a back-off counter for a randomly selected primary CC from the group of CCs accessible to the TRP. In a first variation, referred to as Type B1, the back-off counter for the selected primary CC is generated from a single common distribution with a common $CW_p$, regardless of the actual value of the $CW_p$ of the selected primary CC. In a second variation, referred to as Type B2, the back-off counter for the selected primary CC is set to a number generated from a distribution of a largest $CW_p$ across the set of CCs.

Reference is made to joint access by multiple TRPs in the description below. It is to be understood that although a majority of the examples are described with regard to joint multiple access TRPs, the same principles can apply to multiple antenna panels of a single TRP or multiple antenna panels on each of multiple TRPs being used for joint access.

Aspects of the present disclosure may provide joint TRP access to multiple channels in a manner that is compliant with existing aspects of New Radio (NR). This may be achieved through combining either a spatial-domain Type A-like or Type B-like procedure, and either a frequency-domain Type A-like or Type B-like multi-channel access procedure. In such a joint TRP mechanism, one or more of the following techniques may also be utilized. A 'CCA Failure' occurs when a TRP detects a signal on the channel and therefore the channel is considered to be unavailable. A 'Missed Target' occurs when a TRP determines it will not be able to complete its back-off procedure before an arranged target start time. A TRP 'CCA Failure' or 'Missed Target' indication that is triggered by either respective event may be transmitted to a controller to be used to improve efficiencies of operation of the joint access process by the other TRPs of the group. For example, the indications may enable an earlier (fall-back) alignment of a transmission start time than a previous target start time, if the previous start time was dependent upon the TRP experiencing the 'CCA Failure' or 'Missed Target'. Another technique may include switching from performing a Wideband (WB) CCA simultaneously on multiple channels to performing individual sub-band CCAs during a same channel access attempt to avoid inadvertently identifying that all of a group of channels for which the WB CCA is performed are unavailable if less than all of the channels would trigger a "CAA Failure" using individual sub-band CCAs. Another technique may include using TRP on-demand blanking within an acquired Channel Occupancy Time (COT), i.e. the portion of the time domain resource of a given channel accessible to transmission, to allow TRPs to have additional opportunities within the COT for late joint access of TRPs. A 'CCA Success' occurs when a TRP does not detect a threshold level of energy on the channel and therefore the channel is considered to be available for transmission or reception by the TRP. A TRP 'CCA Success' indication sent by a TRP may enable alignment of transmissions when using CAT2 CCA for spatial domain secondary TRPs. DL and UL slot configurations and dynamic indications associated with those slot configurations can be aligned across the jointly acquired COTs. Selecting a spatial-domain primary TRP and a channel access priority class can be performed depending on the particular combination of spatial domain Type A-like and Type B-like processes and frequency domain Type A-like and Type B-like processes being used. Spatial-domain updating and maintenance of back-off generator parameter $CW_p$ can be performed depending on the particular combination of spatial domain Type A-like and Type B-like processes and frequency domain Type A-like and Type B-like processes being used. DL transmit power can be reduced based on concurrently transmitted COTs in the spatial-domain FIGS. 4, 5, 6A, 6B, 7A, 7B, 8A and 8B provide examples of joint TRP access for a single unlicensed channel by three TRPs. It should be understood that although the examples are all directed to three TRPs, the principles apply to joint TRP access for two TRPs or more than three TRPs. Furthermore, although three TRPs are utilized in the examples, the same principles could apply to multiple antenna panels of a single TRP or multiple antenna panels of more than one TRP.

FIGS. 4, 5, 6A, 6B, 7A, 7B, 8A and 8B illustrate examples of signal timing that allow a group of TRPs to jointly access a medium. The figures each illustrate a timing diagram for three TRPs. The three TRPs are connected to a controller via at least one communication link, for example, a backhaul or a fronthaul connection link. Messages between the TRPs and the controller may be exchanged via the communication links. The communication links may be wireless communication links, such as microwave links, or wired links, such as optical fiber links. The controller may oversee one or more TRP groups. A TRP group may include one or more TRPs. The TRPs may be NR-U TRPs. Each TRP group uses one or more unlicensed spectrum channels. In the case of FIGS. 4, 5, 6A, 6B, 7A, 7B, 8A and 8B there may be additional transmissions that have been aligned prior to what is shown, i.e. what is shown is not necessarily a first aligned transmissions made by the three TRPs. Similarly, there may be additional transmission continuing after the example communications shown in the figures.

The TRP group in the examples of FIGS. 4, 5, 6A, 6B, 7A and 7B is associated with a controller 402 and three TRPs 404, 406, and 408. The controller 402 is connected with each of the three TRPs 404, 406 and 408 via backhaul connection links for message exchanges between the controller 402 and each of the three TRPs 404, 406, and 408. For example the TRPs 404, 406, and 408 may provide the controller 402 with information the controller needs to determine the $t_{target}$. This information may include channel access parameters for a current or subsequent joint access period for the TRP such as, but not limited to burst end point or COT end point, contention window (CW) or corresponding back-off counter, channel access priority class p, and current back-off generator parameter $CW_p$. The TRPs 404, 406, and 408 may provide the controller 402 with information such as if a TRP misses a target, successfully completes a CCA or fails to complete a CCA. In addition, the controller 402 may provide the TRPs 404, 406, and 408 with a new or revised $t_{target}$ as well as any configuration information the TRPs may need as part of the joint access procedure, such as, but not limited to, the type of joint access procedure. Examples of different types of joint access as described below in FIGS. 4, 5, 6A, 6B, 7A, 7B, 8A, 8B, 9A, 9B, 10A, 10B, 10C, 11A, 11B and 12. In some of the types of joint access procedures, TRPs or unlicensed channels may be designated as primary TRPs or primary channels. These designations may be defined explicitly by the controller 402, inherent in the type of joint access, or determined by the TRPs.

There are 17 consecutive time intervals labelled 1 to 17 in FIGS. 4, 5, 6A, 6B, 7A, 7B, 8A and 8B. The marked intervals are defined by the boundaries of a particular time unit. The time unit may be a slot, a mini-slot, a sub-frame, or an OFDM symbol of the unlicensed spectrum. The boundaries are hereafter referred to as 'alignment boundaries.' The alignment boundaries may also align with boundaries of time units of the licensed spectrum.

Figure 4:
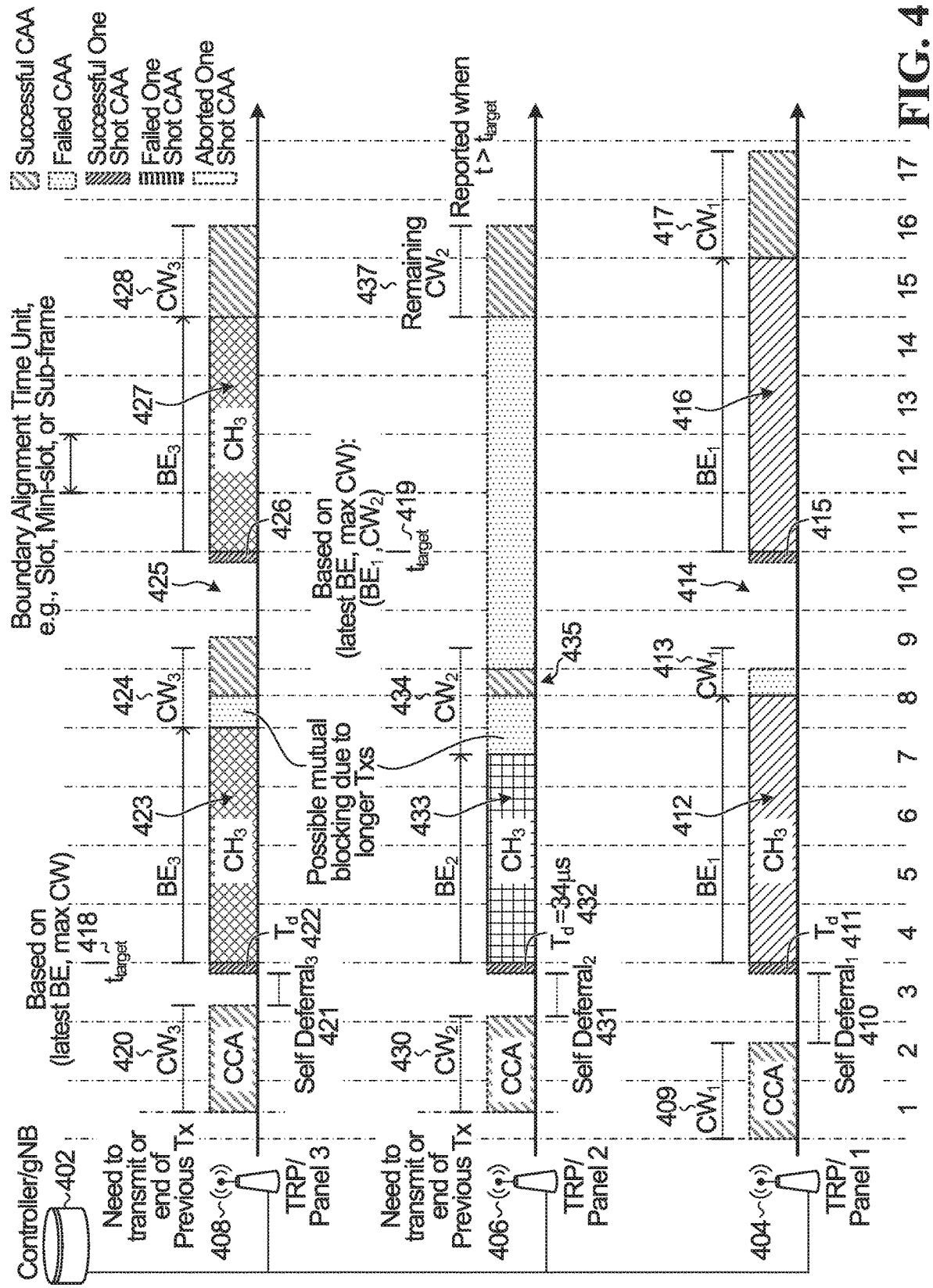
FIG. 4 is a diagram illustrating an example for a group of TRPs attempting to jointly access a single channel in unlicensed spectrum according to one embodiment of the present disclosure.

FIG. 4 illustrates two consecutive joint access periods. For each TRP, each joint access period includes a first contention window for performing a CAT4 CCA, a self-deferral interval prior to a determined target start time ($t_{target}$) begin transmission of a downlink burst, a second period for performing a CAT2 CCA, just before $t_{target}$ and an interval for the acquired COT. If during the CAT4 and CAT2 CCA the channel is sensed as idle, i.e., the energy detected is below the ED threshold, then the TRP will start the transmission. If the channel is sensed as busy during CAT4, the self-deferral and the CAT2 CCA do not occur and the CAT4 CCA is attempted again.

In FIG. 4, each TRP can independently generate and maintain its own back-off counter for a contention window (CW) during which a CCA occurs according to a respective priority class. This can be considered a spatial Type A-like procedure. Each TRP controls its own CCA and transmission of data on the channel. The $t_{target}$ is dependent upon a longest transmission period, indicated as a Burst End (BE) time, of the three TRPs and a maximum contention window (CW) of the three TRPs. As such, each TRP may provision for failure of initial CCA (iCCA) due to potential mutual blocking as a result of different COTs. The determination of $t_{target}$ can be achieved by the TRPs communicating their respective CCA counters and transmission burst end points to the controller 402. The controller determines the value of $t_{target}$. The $t_{target}$ controller may align, e.g., quantize, the $t_{target}$ to the earliest possible alignment boundary. The to $t_{target}$ value is then provided to the TRPs. In this example $t_{target}$ 418 of the first joint access period occurs at the start of interval 4.

In FIG. 4, TRP1 404 is shown to perform a CAT 4 CCA 409 that happens to start at the beginning of interval 1. The medium is sensed as idle by CAT4 CCA 409, and so CAT4 CCA 409 is considered to be successful and the channel is available to TRP1 404. If the medium is sensed as busy during CAT4 CCA 409, the CAT4 CCA 409 is not considered to be successful and TRP1 404 would not transmit at $t_{target}$ 418. Subsequent to CAT4 CCA 409, a self-deferral interval 410 occurs that ends just prior to $t_{target}$ 418 for the first joint access period. TRP1 404 then performs a CAT2 CCA 411 that begins just prior to $t_{target}$ 418 and ends at $t_{target}$ 418, because the CAT2 CCA 411 is successful. If the medium is sensed as busy during CAT2 CCA 411, the TRP1 404 would not transmit at $t_{target}$ 418 for the first joint access period. The period of CAT2 CCA is denoted as $T_d$ and in FIG. 4 is shown to be 34μs. However, this example should not be considered to limit $T_d$ to only this value. Because the channel is accessible, TRP1 404 transmits and may receive data in a burst during COT 412 ending at $BE_1$. TRP1 404 has the longest COT of the three TRPs in the first joint access period. A new CAT4 CCA 413 begins at the end of COT 412. The new CCA 413 is based on a random CW counter time. In the example of FIG. 4, the new CCA 413 is a shorter period of time than the first CCA 409 due to this random selection of the counter time. There is another self-deferral period 414 that occurs until a new CAT2 CCA 415. The new CAT2 CCA 415 ends at $t_{target}$ 419 for the second joint access period, which occurs at the start of interval 11. The $t_{target}$ 419 for the second joint access period is determined in the same manner as $t_{target}$ 418 for the first joint access period was determined, i.e. the TRPs providing information to the controller, the controller making a determination and the controller sending $t_{target}$ 419 for the second joint access period to the TRPs. The medium is sensed to be idle by either CAT 4 CCA 413 or CAT2 CCA 415 and TRP1 404 transmits and may receive a burst during COT 416 ending at $BE_1$ starting at $t_{target}$ 419. Another random length CW 417 is shown subsequent to COT 416 for a third joint access period.

The operation of TRP3 408 in FIG. 4 is similar to TRP1 404. A CAT4 CCA 420, which has a random duration determined by TRP3 408 starts during interval 1 and does not detect a signal on the channel. A first self-deferral interval 421 occurs after the successful CAT4 CCA 420. A CAT2 CCA 422 starts prior to $t_{target}$ 418 and ends at $t_{target}$ 418. The duration of CAT2 CCA 422 is indicated to be $T_d$ and equal to 34 μs, which is comparable to Wi-Fi Distributed Inter-frame Spacing (DIFS). However, it is to be understood that this example should not limit the duration of the CAT2 CCA. TRP3 408 transmits and may receive a burst during COT 423 ending at $BE_3$ because the channel is considered to be accessible. In the example of FIG. 4, the COT 423 finishes prior to the longer COT 412 of TRP1 404. TRP3 408 starts a new CAT4 CCA 424 after COT 423. However, TRP3 408 may detect the transmission of TRP1 404 because TRP1 404 is still transmitting at that time. Whenever CAT4 CCA is interrupted, back-off counter is frozen and iCCA will be repeated until successful. Once iCCA is successful, the back-off counter can be decremented again. Ultimately, CAT4 CCA 424 is successful and a self-deferral interval 425 occurs after CAT4 CCA 424. A new CAT2 CCA 426 starts prior to $t_{target}$ 419 for the second joint access period and ends at $t_{target}$ 419. A new burst is transmitted and UL reception may occur during COT 427 ending at $BE_3$ by TRP3 408 starting at $t_{target}$ 419. TRP 3 408 starts a new CAT4 CCA 428 after COT 427 for the third joint access period.

The operation of TRP2 406 in FIG. 4 is different than TRP1 404 and TRP2 408 because the channel is determined not to be accessible in the second joint access period. A CAT4 CCA 430, which has a random duration determined by TRP2 406, starts during interval 1 and is completed successfully. A first self-deferral interval 431 occurs after the successful CAT4 CCA 430. A CAT2 CCA 432 starts prior to $t_{target}$ 418 for the first joint access period and ends at $t_{target}$ 418. A burst 433 ending at $BE_2$. In the example of FIG. 4, COT 433 finishes prior to the longer COT 412 of TRP1 404. TRP2 406 starts a new CAT4 CCA 434 after COT 433. However, TRP2 406 may detect the transmission of TRP1 404 or TRP3 408 because those TRPs are still transmitting at this time. Whenever CAT4 CCA is interrupted, the back-off counter is frozen and iCCA will be repeated until successful. Once iCCA is successful, the back-off counter can be decremented again. Although there is a duration 435 within CAT4 CCA 434 where TRP2 406 does not sense the channel busy, CAT4 CCA 434 is interrupted before the end of CAT4 CCA 434, e.g., due to some out-of-group transmission. Based on the conventional CAT4 CCA mechanism, the TRP performs iCCA again until success and freezes the remaining value of the random back-off counter of the TRP. Because CATA CCA 434 is not successful, there is no self-deferral interval, no CAT2 CCA and TRP2 406 does not transmit on the channel. After $t_{target}$ 419 for the second transmission period, TRP2 406 notifies the controller 402 of a remaining counter value of CAT4 CCA 434 that was unused for channel access in the second transmission period. TRP2 406 can then use this remaining counter duration for a next CAT4 CCA 437 for the third transmission period.

By not performing CCA processes during the periods between time intervals 9 to 14, the TRP2 406 saves power and computational complexity, and behaves less aggressively by not constantly sensing the medium during the periods from intervals 9 to 14. As well, during the period from time intervals 9 to 14, TRP1 404 and TRP3 408 keep transmitting their respective bursts. As such, even if TRP2 406 kept performing a CCA process during this period, TRP2 406 would sense that the medium is busy and CCA process would not succeed. Therefore, it is unnecessary for TRP2 406 to perform a CCA process during the period from time intervals 9 to 14. As such, this unlicensed spectrum access mechanism is more efficient compared to directly adopting the CAT4 CCA in Release 13 of 3GPP by not sensing the medium when other TRPs in the group are transmitting.

Figure 5:
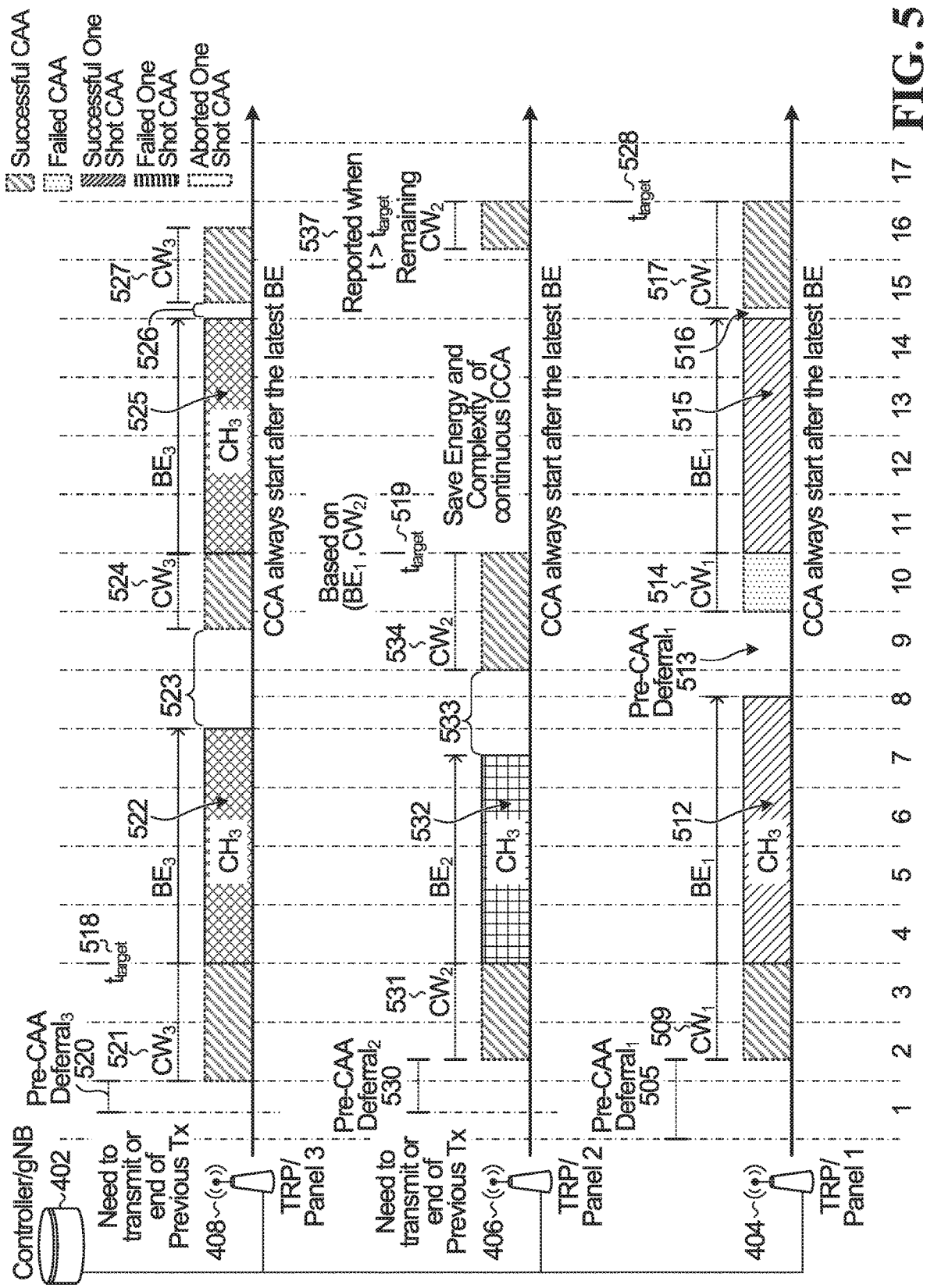
FIG. 5 is a diagram illustrating a second example for a group of TRPs attempting to jointly accessing a single channel in unlicensed spectrum according to one embodiment of the present disclosure.

FIG. 5 illustrates two consecutive joint access periods, each period including a pre-CCA deferral interval prior to a CAT4 CCA, a first contention window for performing the CAT4 CCA, which ends at the $t_{target}$ for transmitting the burst and an interval for transmission of the burst. It is noted that no additional CAT2 CCA is needed since the CAT4 CCA is aligned to end at the $t_{target}$. If throughout the CAT4 CCA the medium is idle, then the TRP will proceed to transmit the burst. If the medium is busy, then the TRP will not transmit the burst because the channel is considered to be unavailable.

In FIG. 5, each TRP can independently generate and maintain its own back-off counter for the CW during which a CCA occurs according to a respective priority class. This can be considered a Type A-like procedure. Each TRP controls its own CCA and transmission of data on the channel. The $t_{target}$ for each joint access period is dependent upon a longest BE and a maximum CW of the three TRPs. In this example the $t_{target}$ for the first joint access period is located at the start of interval 4. Differences between FIG. 4 and FIG. 5 include that in FIG. 4, for each joint access period, there is a deferral time after the CAT4 CCA and before a CAT2 CCA and in FIG. 5, for each joint access period, the deferral time is prior to the CAT4 CCA and the CAT4 CCA is aligned to end at $t_{target}$ of that joint access period.

In FIG. 5, TRP1 404 is shown to have a pre-CCA deferral interval 505 that ends at the beginning of a CAT4 CCA 509. The pre-CCA deferral interval 505 happens to start at the beginning of interval 1 in FIG. 5. The pre-CCA deferral interval 505 is determined based on the time of the end of a previous joint access period, the known duration of the CAT4 CCA for the current joint access period and the next $t_{target}$. The medium is sensed idle by CAT4 CCA 509, and so the CAT4 CCA 509 is considered to be successful because the channel appears to be accessible. If the medium is sensed as busy during CAT4 CCA 509, CAT4 CCA 509 is not successful as the channel is not accessible as of $t_{target}$ 518 during the first joint access period. CAT4 CCA 509 ends just prior to $t_{target}$ 518 for the first joint access period. TRP1 404 transmits and may receive a burst during COT 512 ending at $BE_1$ starting at $t_{target}$ 518. A new pre-CCA deferral interval 513 occurs from the end of COT 512 until the next CAT4 CCA 514. CAT4 CCA 514 begins at the end of the pre-CCA deferral interval 513. The new CCA 514 is based on a random CW counter time and is scheduled to end at the next $t_{target}$ 519 for the second joint access period, which occurs at the start of interval 11. The $t_{target}$ 519 for the second joint access period is determined in the same manner as the $t_{target}$ 518 for the first joint access period was determined. The medium is sensed as idle by CAT4 CCA 514 and TRP1 404 transmits and may receive a burst during COT 515 ending at $BE_1$. A new pre-CCA deferral interval 516 occurs from the end of COT 515 until the next CAT4 CCA 517. CAT4 CCA 517 begins at the end of the pre-CCA deferral interval 516. The new CCA 517 is based on a random CW counter time and is scheduled to end at the next $t_{target}$ 528 for a third joint access period.

The operation of TRP3 408 in FIG. 5 is similar to TRP1 404. A pre-CCA deferral interval 520 starts in interval 1 and ends at the beginning of a CAT 4 CCA 521. There is no signal detected during CAT4 CCA 521, and so the CCA 521 is considered to be successful because the channel appears to be accessible. CAT4 CCA 521 ends just prior to $t_{target}$ 518. TRP3 408 transmits and may receive a burst during COT 522 ending at $BE_3$ starting at $t_{target}$ 518. A new pre-CCA deferral interval 523 occurs from the end of COT 522 until the next CAT4 CCA 524. CAT4 CCA 524 begins at the end of the pre-CCA deferral interval 523. The new CCA 524 is based on a random CW counter time and is scheduled to end at $t_{target}$ 519. The channel is sensed idle by CAT4 CCA 524 and TRP3 408 transmits and may receive a burst during COT 525 ending at $BE_3$. A new pre-CCA deferral interval 526 occurs from the end of COT 525 until the next CAT4 CCA 527. CAT4 CCA 527 begins at the end of the pre-CCA deferral interval 526. The new CCA 527 is based on a random CW counter time and is scheduled to end at $t_{target}^5$ 28 for the third joint access period.

The operation of TRP2 406 in FIG. 5 is different than TRP1 404 and TRP2 408 because the channel is determined not to be accessible in the second joint access period. A pre-CCA deferral interval 530 starts within interval 1 and ends at the beginning of a CAT4 CCA 531. The channel is sensed idle by the CCA 531, and so the CCA 531 is considered to be successful because the channel appears to be accessible. CAT4 CCA 531 ends just prior to $t_{target}$ 518. TRP2 406 transmits and may receive a burst during COT 532 ending at $BE_2$. A new pre-CCA deferral interval 533 occurs from the end of COT 532 until the next CAT4 CCA 534. CAT4 CCA 534 begins at the end of the pre-CCA deferral interval 533. CAT4 CCA 534 is based on a random CW counter time and is scheduled to end at $t_{target}$ 519. During CAT4 CCA 534, TRP2 406 senses the channel as busy and thus CAT4 CCA 534 is not successful. Because CAT4 CCA 534 is not successful, TRP2 406 does not transmit on the channel. After $t_{target}$ 519, TRP2 406 notifies the controller 402 of a remaining counter duration of CAT4 CCA 534 that was unused in the second joint access period. TRP2 406 can then use this remaining counter duration for a next CAT4 CCA 537 leading up to $t_{target}$ 528 for the third joint access period.

Figure 6A:
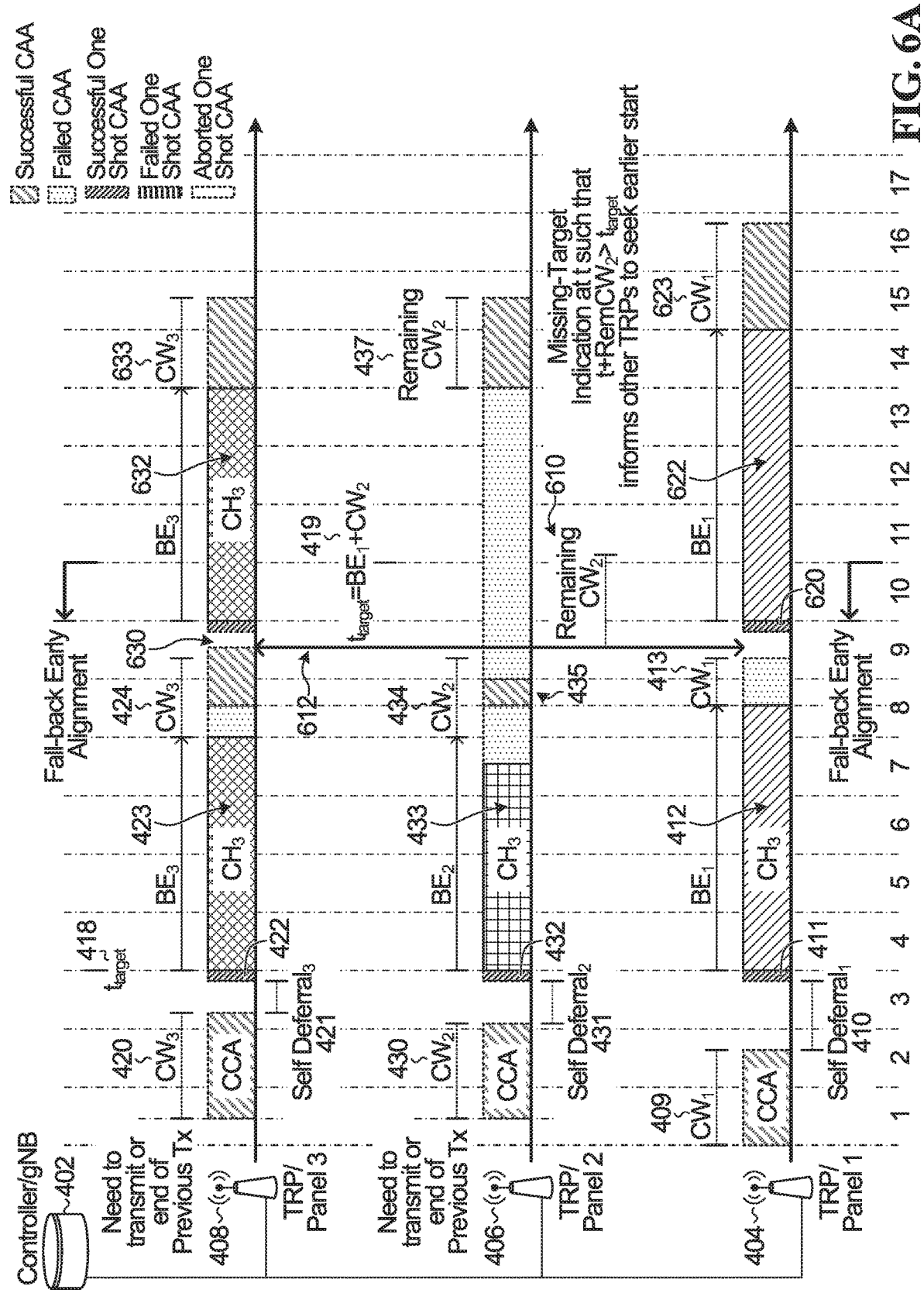
FIG. 6A is a diagram illustrating a third example for a group of TRPs attempting to jointly accessing a single channel in unlicensed spectrum according to one embodiment of the present disclosure.

FIG. 6A is another example of a group of TRPs jointly accessing a medium. In this case fall-back early alignment is shown. If the $t_{target}$ in a given joint access period is based on either BE or CW of a TRP that is not going to access the channel as of $t_{target}$ in the given joint access period due to an unsuccessful CAT4 CCA, then an earlier $t_{target}$ may be possible. The first joint access period of FIG. 6A is the same as in FIG. 4 and the various features of FIG. 6A are therefore labelled the same as in FIG. 4 until the end of the first joint access period.

The $t_{target}$ time of the second joint access period is originally determined by the controller 402 to be based on the BE of TRP1 402 of the previous joint access period, in this case the first joint access period, and on the CW of TRP2 406 of the first joint access period. Because TRP2 406 is not going to transmit in the second joint access period due to the unsuccessful CAT4 CCA 434, instead of the $t_{target}$ time being dependent upon $BE_1$ (BE of TRP1 404) and $CW_2$ (CW of TRP2 406), the controller 402 can determine a new $t_{target}$ time based on $BE_1$ of the previous joint access period and the second longest CW of the previous joint access period. In the example of FIG. 6A, the second longest CW is $CW_3$ (CW for TRP3 408).

In a situation where the second longest CW belongs to a TRP that is also not transmitting due to an unsuccessful CAT4 CCA, then the controller 402 may generate a new $t_{target}$ based on the third longest CW, and so on.

When a TRP has an unsuccessful CCA, the TRP sends an indication to the controller that the TRP will not be transmitting as of $t_{target}$ in the current joint access period through a 'missed target' indication. This indication occurs after a point in time equal to the original $t_{target}$ time minus a remainder of the CW.

Referring to FIG. 6A, a missed target indication time 612 is equal to the original $t_{target}$ 419 minus the remainder counter duration of CW (Rem $CW_2$) 610 for TRP2 406. Therefore, at missed target indication time 612, TRP2 406 indicates to the controller 402 that no transmission of a burst at $t_{target}$ will occur for TRP2 406 and therefore the controller 402 can determine a new $t_{target}$ based on $BE_1$ and $CW_3$. The controller 402 notifies TRP1 404 and TRP3 408 of the revised $t_{target}$.

Once the revised $t_{target}$ is received at TRP1 404, a CAT2 CCA 620 is performed that successfully ends at the revised $t_{target}$. Subsequent to CAT2 CCA 620, TRP1 404 transmits and may receive a burst during COT 622 ending at $BE_1$. Another random length CW 623 is shown subsequent to COT 622 for a third joint access period.

Once the revised $t_{target}$ is received at TRP3 408, a CAT2 CCA 630 is performed that successfully ends at the revised $t_{target}$. Subsequent to CAT2 CCA 630, TRP3 408 transmits and may receive a burst during COT 632 ending at $BE_3$. Another random length CW 633 is shown subsequent to COT 632 for the third joint access period.

In an alternative manner of accessing the channel by a group of multiple TRPs, one TRP of the group of TRPs being selected as a spatial domain primary TRP and the remaining TRPs of the group of TRPs are denoted as spatial domain secondary TRPs, i.e., similar to the frequency domain Type B procedure. The selection of the spatial domain primary TRP can be made by random selection, round robin selection or by the first TRP that finishes its CAT4 CCA indicating that it is the spatial domain primary TRP for that joint access period and other TRPs truncating any ongoing CAT4 CCA.

The spatial domain primary TRP notifies the controller of a successful CAT4 CCA procedure upon completion. The notification can be done through a 'CCA Success' indication.

A back-off counter of the spatial domain primary TRP can be generated from the distribution with the largest $CW_p$ among all of the TRPs, i.e., similar to the frequency domain Type B2 procedure. Furthermore, the maximum COT (MCOT) associated with the channel access parameters used by the spatial domain primary TRP applies to the transmissions of the spatial domain primary TRP as well as its spatial domain secondary TRPs.

Transmission power for each TRP that successfully acquires the channel can be reduced based on a number of concurrently transmitting TRPs to aid in mitigating interference and controlling transmission power in the joint access period.

Figure 6B:
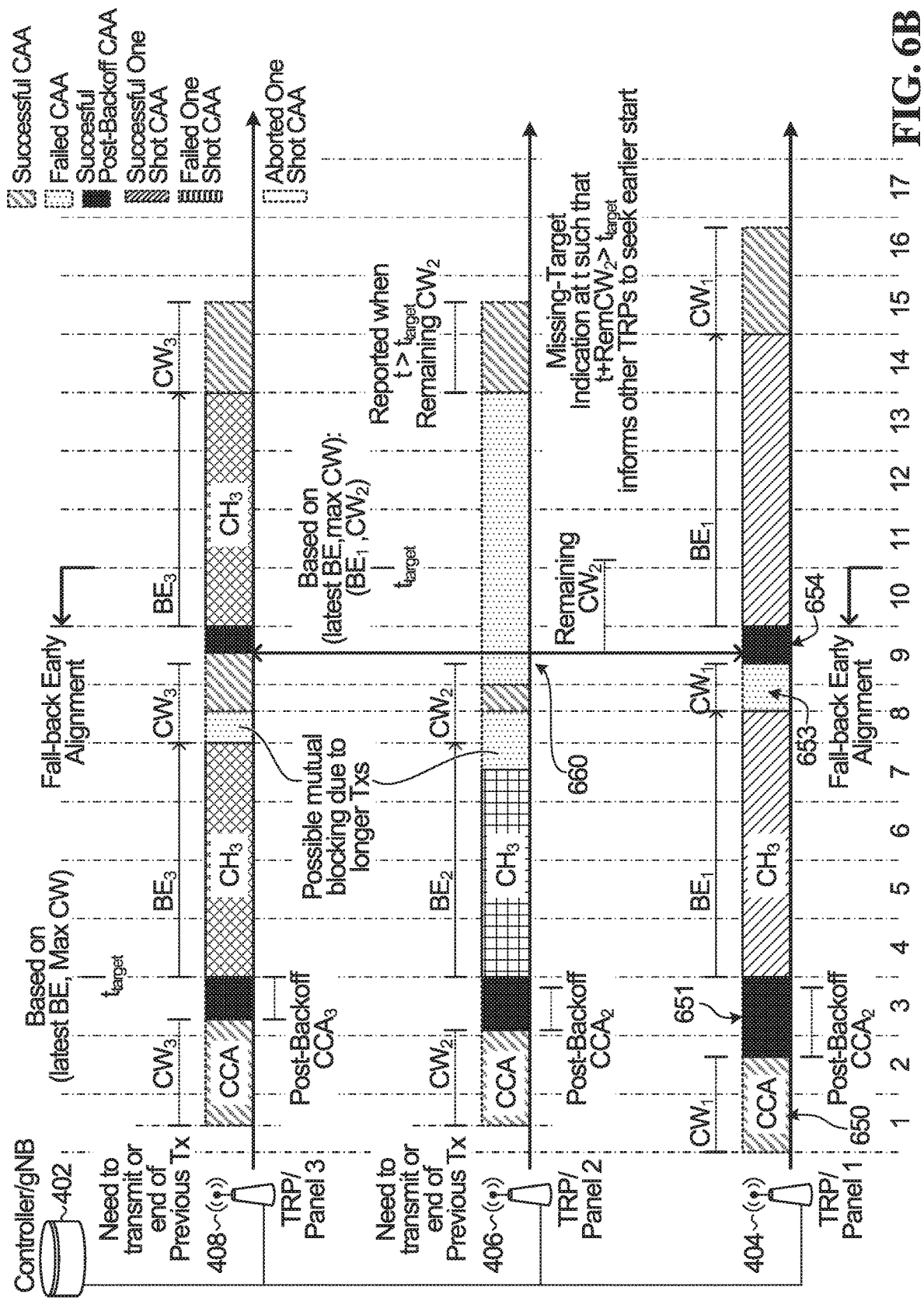
FIG. 6B is a diagram illustrating a fourth example for a group of TRPs attempting to jointly accessing a single channel in unlicensed spectrum according to one embodiment of the present disclosure.

FIG. 6B illustrates an example similar to FIG. 6A. However, instead of TRP1 404 having a self-deferral, such as self-deferral 410 in the first joint access period between the CAT4 CCA 409 and CAT2 CCA 411 as shown in FIG. 6A, in FIG. 6B after a CAT4 CCA 650 ends on the channel, a post-back-off CCA 651 is performed until $t_{target}$ 418. Note that a CAT2 CCA immediately before transmission is not necessary since TRP1 404 continues to sense the channel after the back-off period ends. A similar process occurs for the second joint access period for a CAT4 CCA 653 and a post-back-off CCA 654. In a similar fashion to FIG. 6A, because TRP2 406 is unsuccessful for CAT4 CCA 660, TRP2 406 notifies the controller and other TRPs of the failure and the originally scheduled $t_{target}$ can be revised to be an earlier time, in a similar manner as described with reference to FIG. 6A.

Figure 7A:
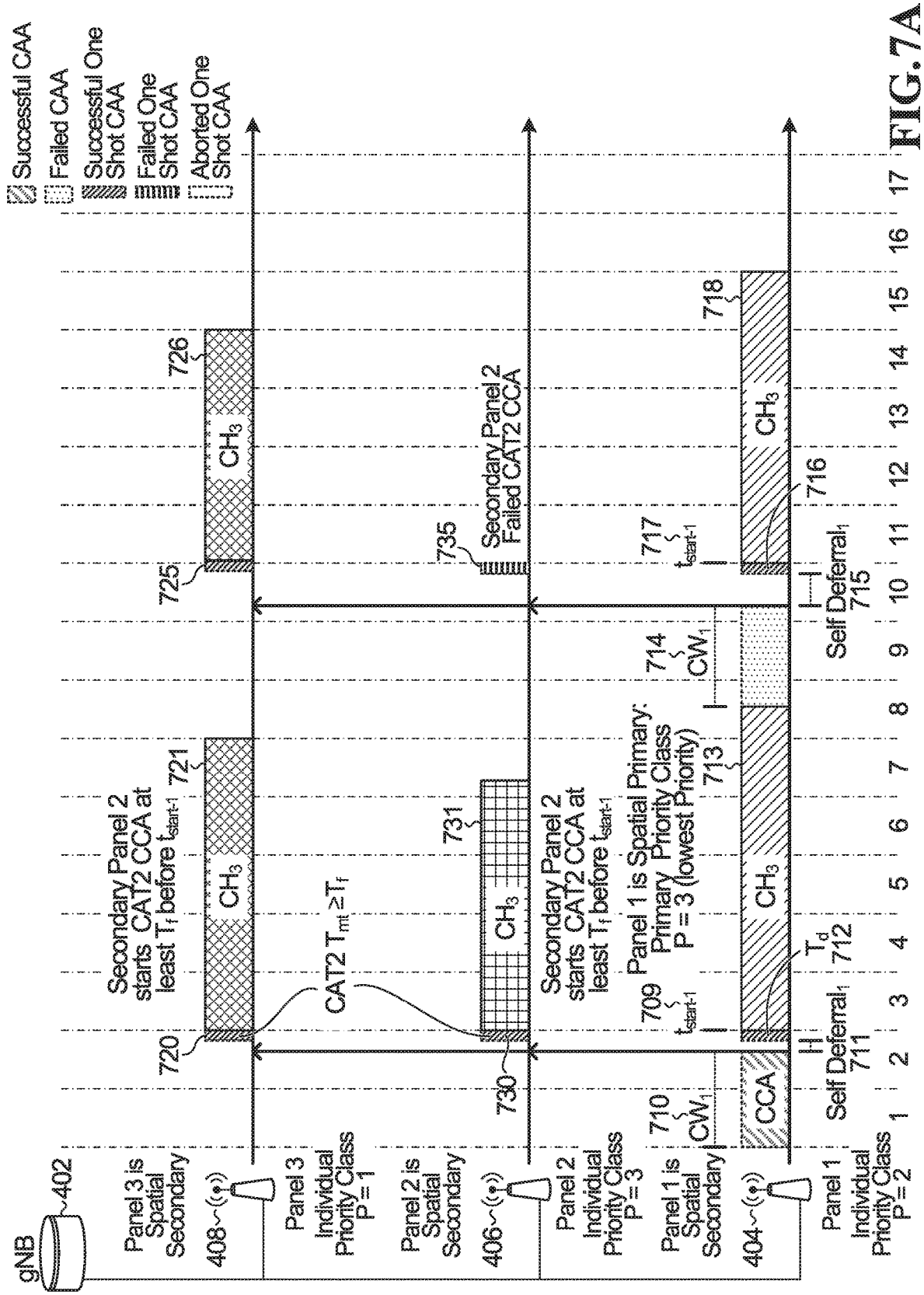
FIG. 7A is a diagram illustrating a fifth example for a group of TRPs attempting to jointly accessing a single channel in unlicensed spectrum according to one embodiment of the present disclosure.

FIG. 7A illustrates two consecutive joint access periods, each period including for a selected spatial domain primary TRP, a first contention window for performing a CAT4 CCA, a self-deferral interval prior to a determined $t_{target}$, a second pre-defined period for performing a CAT2 CCA, just before the $t_{target}$ and an interval for transmission a burst. For each spatial domain secondary TRP, each period includes a self-deferral interval prior to a CAT2 CCA, a pre-defined period for performing the CAT2 CCA, and an interval for transmission a burst. If the channel is sensed as idle by the CAT4 CCA and CAT2 CCA of the spatial domain primary TRP and/or by the CAT2 CCA of the spatial domain secondary TRPs, then the respective TRPs will have access to the channel to transmit at the $t_{target}$. If the channel is sensed as busy during either of the CAT4 CCA or CAT2 CCA of the spatial domain primary TRP then the spatial domain primary TRP will not access the channel. The spatial domain secondary TRP will also not access that channel if the spatial domain primary TRP has sensed the channel as busy during the CAT4 CCA or the spatial domain secondary TRP has sensed the channel as busy during its CAT2 CCA. If the spatial domain primary TRP has sensed the channel as not busy during the CAT4 CCA, but busy during the CAT2 CCA and the spatial domain secondary TRP has sensed the channel as not busy during its CAT2 CCA, the spatial domain secondary TRP may access the channel. Furthermore, if the spatial domain primary TRP has sensed the channel as busy during the CAT4 CCA before $T_{mt}$ from the $t_{target}$, then the spatial domain primary TRP will not perform the CAT CCA when self-deferral is used, and the spatial domain secondary TRPs may not perform the CAT2 CCA either, e.g., upon receiving a CCA Failure indication.

In FIG. 7A, TRP1 404 is selected as the spatial domain primary TRP in both the first and second joint access periods. In other embodiments, it should be understood that the spatial domain primary can change from one joint access period to another. TRP1 404 generates and maintains its own back-off counter for a contention window (CW) during which a CCA occurs according to a respective priority class. This can be considered a spatial domain Type B-like procedure. TRP1 404 controls its own CAT4 CCA and CAT2 CCA processes and transmission or receipt of data on the channel. TRP2 406 and TRP3 408 are spatial domain secondary TRPs and control their CAT2 CCA processes and transmission or receipt of data on the channel. Note that with spatial domain Type B-like procedure, $t_{target}$ is t dependent only upon the BE and the contention window (CW) of the spatial domain primary TRP and need not be communicated to the spatial secondary TRPs if a CCA Success indication is employed. In this example $t_{target}$ of the first joint access period is located at the start of interval 3.

In FIG. 7A, spatial domain primary TRP1 404 is shown to perform a CAT4 CCA 710 that happens to start at the beginning of interval 1. The channel is sensed as idle by CAT4 CCA 710, and so CAT CCA 710 is considered to be successful because the channel appears to be accessible. If the channel is sensed busy during CAT4 CCA 710, CAT4 CCA 710 would not have been successful and spatial domain primary TRP1 404 would not transmit at a $t_{target}$ 709 for the first joint access period. Subsequent to CAT4 CCA 710, a self-deferral interval 711 occurs that ends just prior to $t_{target}$ 709. Spatial domain primary TRP1 404 then performs a CAT2 CCA 712 that begins just prior to $t_{target}$ 709 and ends at $t_{target}$ 709, because the CCA 712 is successful. The duration of CAT2 CCA 512 is indicated to be $T_d$, which may be equal to 34 µs. However, it is to be understood that this example should not limit the duration of the CAT2 CCA. If the channel is sensed as busy during CAT2 CCA 712 and CAT2 CCA 712 was not successful, the TRP1 404 would not access the channel at $t_{target}$ 709. The period of the CAT2 CCA is denoted as $T_d$. TRP1 404 transmits and may receive a burst during COT 713 ending at $BE_1$ starting at $t_{target}$ 709. A new CAT4 CCA 714 begins at the end of the COT 713. The new CCA 714 is based on a random CW counter time. There is another self-deferral period 715 that occurs up until a new CAT2 CCA period 716. The new CAT2 CCA period 716 ends at $t_{target}$ 717 for the second joint access period, which occurs at the start of interval 11. The $t_{target}$ 717 is determined in the same manner as $t_{target}$ 709 for the first joint access period. The channel is sensed as idle by either CAT4 CCA 714 or CAT2 CCA 716 and a burst 718 is transmitted by TRP1 404.

Spatial domain secondary TRP3 408 is shown to perform a CAT2 CCA 720 starting prior to $t_{target}$ 709 and ending at $t_{target}$ 709. The duration of CAT2 CCA 720 is indicated to be $T_{mt} > T_f$ $T_{mt}$ is intended to define a CAT2 CCA duration for multiple frequency or spatial domain secondary TRPs. $T_f$ may be considered to be equal to 25 µs, which is comparable to WiFi Priority Inter-frame spacing (PIFS). However, it is to be understood that this example should not limit the duration of the CAT2 CCA. TRP3 408 transmits and may receive a burst during COT 721. In the example of FIG. 7A, the burst during COT 721 finishes prior to the longer COT 713 of spatial domain primary TRP1 404. Once TRP3 408 finishes the burst during COT 721, TRP3 408 waits until another CAT2 CCA 725 starts prior to $t_{target}$ 717 and ends at $t_{target}$ 717 for the second joint access period. TRP3 408 transmits and may receive another burst during COT 726 as a spatial domain secondary.

The operation of spatial domain secondary TRP2 406 in FIG. 7A is similar to spatial domain secondary TRP3 408 except that the channel is found to be not accessible in the second joint access period. Spatial domain secondary TRP2 406 is shown to perform a CAT2 CCA 730 starting prior to $t_{target}$ 709 and ending at $t_{target}$ 709. TRP2 406 transmits and may receive a burst during COT 731. TRP2 406 is dormant until another CAT2 CCA 735 starts prior to a $t_{target}$ 717 for the second joint access period and is scheduled to end at $t_{target}$ 717. In this case, CAT2 CCA 735 is unsuccessful and the channel is considered not to be accessible by TRP2 406.

In another embodiment of the spatial domain Type B not captured in the figures, a self-deferral period and a CAT2 CCA may not be needed after a successful CAT4 CCA by the spatial domain primary TRP. Rather the spatial domain primary TRP may start a transmission immediately upon the success of the CAT4 CCA using a mini-slot/partial subframe and/or cyclic prefix (CP) extension to fill the time gap, if any, until the earliest alignment boundary. In such case, CAT2 CCA for a spatial secondary TRP is performed such that it ends at the transmission starting point of the spatial domain primary TRP, e.g., based on prior knowledge of the spatial domain primary TRP's CW period or back-off counter value.

A TRP selected as a spatial domain primary TRP can apply channel access parameters, such as but not limited to burst or COT endpoint, contention window (CW) or corresponding back-off counter, channel access priority class p, current back-off generator parameter $CW_p$, and a range of the contention window, from minimum to maximum for a given priority class ($CW_{min,p}, CW_{max,p}$), corresponding to the lowest channel access priority class among those classes handled by all the group TRPs. The lowest channel access priority class corresponds to a largest value of p.

The back-off counter of the spatial domain primary TRP is randomly generated from a uniform distribution between $[0, CW_p]$ where $C_{min,p} \leq CW_p \leq CW_{max,p}$. Initially, the value of $CW_p$ can be set to $CW_{min,p}$.

If at least a preset percentage of hybrid automatic repeat quest acknowledgement (HARQ-ACK) values corresponding to a reference slot or subframe of all spatial transmissions on the channel are determined as a negative acknowledgement (NACK), then the value of $CW_p$ of the spatial primary TRP can be increased for each priority class to the next higher allowed value. Otherwise, the value of $CW_p$ is reset $CW_p = CW_{min,p}$.

Figure 7B:
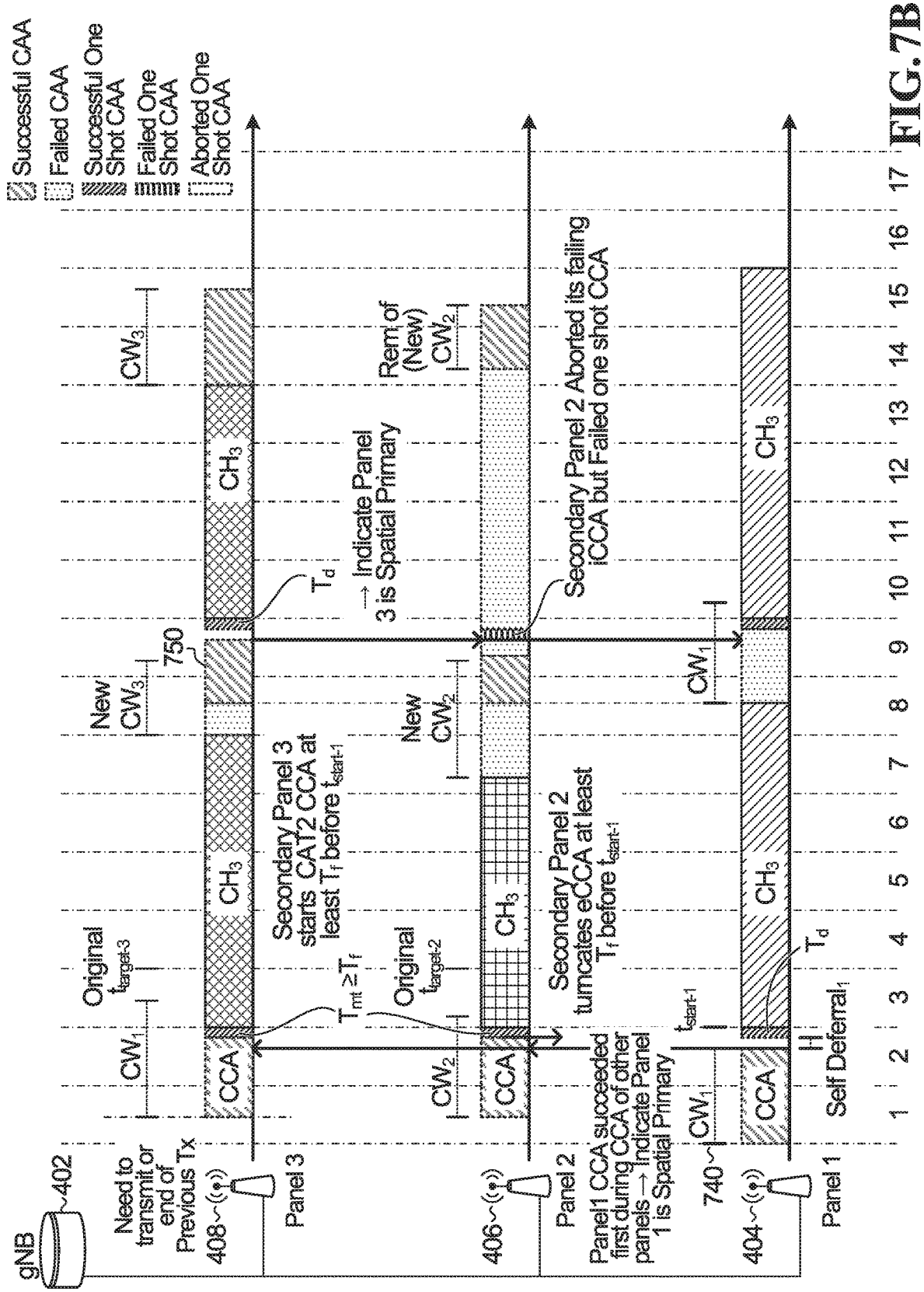
FIG. 7B is a diagram illustrating a sixth example for a group of TRPs attempting to jointly accessing a single channel in unlicensed spectrum according to one embodiment of the present disclosure.

FIG. 7B illustrates an example similar to FIG. 7A, but instead of a TRP being designated as a spatial domain primary TRP, the first TRP to finish a CAT4 CCA successfully declares itself to be the spatial domain primary TRP by sending a notification message, e.g., a CCA Success indication, to the controller or other TRPs, or both. Therefore, instead of TRP1 404 being selected as the primary spatial domain TRP prior to the first CAT4 CCA starting in the first joint access period as described above with reference to FIG. 7A, in FIG. 7B because TRP1 404 is the first TRP that completes a CAT4 CCA, TRP1 404 is determined to be the primary spatial domain TRP. TRP1 404 sends a notification to the controller 402 as well as TRP2 406 and TRP3 408 that TRP1 404 has successfully completed the CAT4 CCA 740 and proclaims itself to be the spatial domain primary TRP for the first joint access period. In the second joint access period, TRP3 408 is the first TRP that completes a CAT4 CCA. TRP3 408 sends a notification to each of the controller 402, TRP2 406 and TRP1 404 that TRP3 408 has successfully completed the CAT4 CCA 750 and proclaims itself to be the spatial domain primary TRP for the second joint access period.

When TRP2 406 receives a notification that TRP1 404 has declared itself to be a spatial domain primary in the first joint access period, TRP2 406 truncates its CAT4 CCA and abandons the remaining CW to take on the role of a spatial domain secondary. TRP2 406 generates a new back-off counter value to be used in the second joint access period. The same process occurs when TRP3 408 receives the notification that TRP1 404 has declared itself to be a spatial domain primary.

FIG. 8A illustrates two joint access periods, each illustrating a different embodiment that takes advantage of gaps within the COT in a joint access period. FIG. 8A is described with regard to the use of three antenna panels associated with and controlled by a gNB. This embodiment may also be applicable to the case of multiple TRPs being multiple gNBs or other spatially separated network nodes controlled by a controller, as in the examples of FIG. 4, 5, 6A, 6B, 7A and 7B. Therefore, in FIG. 8A there are a spatial domain primary panel and multiple spatial domain secondary panels. The first joint access period illustrates a first embodiment that includes using an on-demand or pre-configured blanking pattern to enable spatial domain secondary panels to have late joint access in the case of an earlier CCA failure. The second period illustrates a second embodiment that involves taking advantage of blanking gaps for switching between downlink and uplink transmissions on channel within the joint access period.

The first joint access period, for a selected spatial domain primary panel, includes a first contention window for performing a CAT4 CCA, a self-deferral interval subsequent to the first contention window, a second contention window for performing a CAT2 CCA just prior to a determined $t_{target}$, and an interval for accessing the channel, which may include transmitting and receiving data bursts. One or more small duration windows can occur within the interval for transmitting or receiving the data bursts that are used for CAT2 CCA by a panel as a spatial domain secondary panel. The one or more small duration windows can occur on demand or be preconfigured. If the small duration windows are blanked for more than a predetermined period of time, a non-limiting example being 25 μs, then a CAT2 CCA can be performed before resuming the COT transmission.

For each spatial domain secondary panel, each period includes a self-deferral interval prior to a CAT2 CCA, a pre-defined period for performing the CAT2 CCA just prior to $t_{target}$, and an interval for transmission and receipt of data bursts. One or more small duration windows can occur within the interval for transmitting or receiving the data bursts that can be used for CAT2 CCA by other panels as spatial domain secondary panels. The one or more small duration windows can occur on demand or be preconfigured. If the channel is sensed as idle by the CAT4 CCA and CAT2 CCA of the spatial domain primary panel and/or by the CAT2 CCA of the spatial domain secondary panels, then the respective panels will proceed to transmit the data bursts.

If the channel is sensed as busy for either of the CAT4 CCA or CAT2 CCA of the spatial domain primary panel and/or during the CAT2 CCA of the spatial domain secondary panels, then the respective panels may not be able to transmit starting at $t_{target}$. According to some embodiments, if a panel cannot initially transmit the gNB schedules one or more small duration blanking windows for each of the panels, to enable one or more of the panels to determine if the channel has cleared since a last CCA and allow the panel to access the channel after $t_{target}$. The panel that starts transmission after a successful CAT2 CCA in one of the small duration windows may not be able to transmit all of the intended data burst because the allowable time for transmission is limited by the maximum channel occupancy time (MCOT) of the spatial domain primary panel in the current joint access period.

According to some embodiments, there may be a preconfigured pattern of one or more small duration blanking windows that are scheduled to occur regardless of whether any of the panels have specifically indicated that the CCA processes have been unsuccessful.

Panels that have successfully acquired the channel can blank the joint access period for at least 25 µs immediately before one or more subsequent alignment boundaries according to a pre-configured or on-demand pattern. The pattern may be based on a CAT2 failure indication of a spatial domain secondary panel. If transmission is blanked for more than 25 µs, the blanking panel can also apply a CAT2 CCA before resuming a data COT transmission.

The second joint access period, for the selected spatial domain primary panel, includes a first contention window for performing a CAT4 CCA, a self-deferral interval prior subsequent to the first contention window, a second predefined period for performing a first CAT2 CCA, that occurs prior to $t_{target}$, and a COT for transmission of DL data bursts and receipt of UL data bursts. Within the COT there are one or more small duration windows that act as guard windows to mitigate interference during switching between downlink and uplink transmissions within the joint access period. Within the switching duration between the DL and UL transmissions, a CAT2 CCA can also be performed to ensure the channel is still free for the intended new transmission. For each spatial domain secondary panel, each joint access period includes an initial pre-defined period for performing a first CAT2 CCA prior to $t_{target}$ and a COT for transmission of DL data bursts and receipt of UL data bursts. The COT also includes one or more small duration windows that act as guard windows to mitigate interference during switching between downlink and uplink transmissions within the joint access period. If the channel is sensed as idle by the CAT4 and CAT2 CCA of the spatial domain primary TRP and/or by the CAT2 CCA of the spatial domain secondary panels, then the respective TRPs will proceed to transmit. If the channel is sensed as busy for either of the CAT4 CCA or CAT2 CCA of the spatial domain primary panel and/or during the CAT2 CCA of the spatial domain secondary panels, then the respective panels may not be able to transmit starting at $t_{target}$.

If a panel has been unsuccessful in being able to access the channel at an earlier time in the joint access period, during any of the one or more small duration windows, the panel can perform a CAT2 CCA, which if successful, can result in the panel being able to transmit on the channel that was scheduled in an upcoming portion of the joint access period.

In some embodiments, the panels that successfully acquire the channel use matching DL/UL slot configurations of their acquired channel occupancy times (COTs). This may be enabled, for instance, by indicating identical dynamic slot format indications (SFIs). Panels that failed an initial CCA can perform CAT2 CCA at the switching gaps for late joint access. If the late accessing panel successfully completes CAT4 CCA before acquiring the channel, its COT is not limited by the Spatial Domain Primary MCOT.

It should be understood that although the two joint access periods shown in FIG. 8A are shown as consecutive joint access periods, FIG. 8A is illustrative of two example joint access periods showing how a blanking pattern can be used in at least two different ways, i.e. despite an earlier failed CCA, allowing late joint access by using an on-demand or pre-configured blanking pattern or switching gaps between DL and UL transmissions.

In FIG. 8A, panel1 804 is selected as the spatial domain primary panel. Therefore, panel1 804 generates and maintains its own back-off counter for a contention window (CW) during which a CCA occurs according to a respective priority class. This can be considered a Type B-like process. gNB 802 controls the CAT 4 CCA and CAT2 CCA processes and transmission of data on the channel for panel 1. Panel2 406 and panel3 408 are spatial domain secondary panels and their CAT2 CCA processes, blanking processes and transmission of data on the channel are controlled by gNB 804. A target transmission time $t_{target}$, when the channel is considered clear for starting transmission of a burst during the COT, is dependent only upon the previous BE and the contention window (CW) of the spatial domain primary panel and need not be communicated to the spatial secondary TRPs if a CCA Success indication is employed to allow for application of self-deferral periods on the spatial domain primary panel. In this example the $t_{target}$ for the first joint access period is located at the start of interval 3.

In FIG. 8A, in the first joint access period, spatial domain primary panel1 404 is shown to perform a CAT4 CCA 810 that happens to start at the beginning of interval 1. The channel is sensed as idle by CAT4 CCA 810, and so CAT4 CCA 810 is successful and the channel is considered to be available for transmission. If a signal had been detected during the CAT4 CCA 810, CAT4 CCA 810 would not be successful and spatial domain primary panel1 404 would not transmit at a $t_{target}$ 809 for the first joint access period. Subsequent to the CAT4 CCA 810, a self-deferral interval 811 occurs that ends prior to the $t_{target}$ 809. Panel1 804 then performs a CAT2 CCA 812 that begins just prior to $t_{target}$ 809 and ends at $t_{target}$ 809. CAT2 CCA 812 is successful. If the channel had been sensed as busy during CAT2 CCA 812 and CAT2 CCA 812 was not successful, the panel1 804 would not transmit at $t_{target}$ 809. The period of CAT2 CCA 812 is denoted as $T_d$. Within Primary MCOT 813, panel1 804 transmits a burst 813A starting at $t_{target}$ 809. During data MCOT 813, prior to the beginning of interval 4, a first blanking window begins. As described above, this blanking window may be the result of a pre-configured one or more blanking windows scheduled during the Primary MCOT 813, or might be one or more blanking windows scheduled on-demand as a result of, for example, panel2 806 having an unsuccessful CAT2 CCA and the gNB scheduling the blanking windows for possible late access. CAT2 CCA 814A is performed during the first blanking window that ends at the beginning of interval 4. The CAT2 CCA 814A is successful and the burst 813B continues. A second blanking window occurs prior to the beginning of interval 5 during which a CAT2 CCA 814B is performed. The CAT2 CCA 814B is successful and the burst 813C continues to completion. After the burst 813C has finished transmission, a new CAT4 CCA 815 begins. After a successful CAT4 CCA 815, there is a brief self-deferral period 816 which ends prior to a CAT2 CCA 817. Although two blanking windows are illustrated in FIG. 8A, it is to be understood that the number of blanking windows can vary in number from joint access period to joint access period and can vary in number based on whether the blanking windows are pre-configured or provided on-demand.

With regard to spatial domain secondary panel2 806, in the first joint access period, the panel is shown to perform a CAT2 CCA 830 that starts just prior to interval 3 and ends at the start of interval 3. The channel is sensed as busy during CAT2 CCA 830, and so CAT2 CCA 830 is unsuccessful so there is no transmission at panel2 806 starting at a $t_{target}$ 809. Panel1 804 and panel3 808 are notified of the failure of CAT2 CCA 830, which can trigger an on-demand usage of one or more blanking windows to allow panel2 806 to join the joint access period late, if there is no pre-configured blanking window scheduled. With the use of on-demand blanking, prior to the beginning of interval 5, a first blanking window occurs and a CAT2 CCA 832 is performed. The CAT2 CCA 832 is successful and burst 833 begins. The duration of the burst 833 is limited based on a maximum time (Primary MCOT) allotted by the spatial domain primary panel1 804. After the burst 833 has finished there is a period of inactivity until in the second joint access period a new CAT2 CCA 835 begins prior to interval 11.

With regard to spatial domain secondary panel3 808, in the first joint access period, panel3 808 performs a CAT2 CCA 840 that begins just prior to $t_{target}$ 809 and ends at $t_{target}$ 809. The CAT2 CCA 840 is successful. During COT 841, panel3 808 transmits a burst 841A starting at $t_{target}$ 809. During COT 841, prior to the beginning of interval 4, a first blanking window begins. A CAT2 CCA 842A is performed within the blanking window and ends at the beginning of interval 4. The CAT2 CCA 842A is successful and burst 841B continues. Prior to the beginning of interval 5, a second blanking window occurs and a CAT2 CCA 842B is performed within the blanking window. The CAT2 CCA 842B is successful and burst 841C continues to completion. After the burst 841C has finished transmission, a new CAT4 CCA 815 begins. After the burst 841C has finished there is a period of inactivity until in the second joint access period a new CAT2 CCA 843 begins prior to interval 11.

As indicated above, the second joint access period is used to illustrate late joint access exploiting DL/UL switching gaps. Panel1 804 is once again the spatial domain primary panel and panel2 806 and panel3 808 are spatial domain secondary panels.

Referring to panel1 804, in the second joint access period the CAT2 CCA 815 is successfully performed and followed by a self-deferral period 816. Prior to $t_{target}$ 829 CAT2 CCA 817 is successfully performed. Following CAT2 CCA 817 a DL data COT 818 occurs. After the DL data COT 818 there is a switching gap 819, which ends at the beginning of interval 13. Switching gap 819 allows transition from DL to UL and reduces a risk of interference between DL and UL communications. Prior to the end of the switching gap 819 at the beginning of interval 14, a further CAT2 CCA 820 occurs. After a successful CAT2 CCA 820, a UL data COT 821 occurs. After the UL data COT 821 there is another switching gap 822 to allow transition from UL back to DL. Prior to the end of the switching gap 822 a further CAT2 CCA 823 occurs. After a successful CAT2 CCA 822, another DL data COT 824 occurs.

Referring to panel2 806, in the second joint access period, a CAT2 CCA 835 is performed prior to $t_{target}$ 829. CAT2 CCA 835 is unsuccessful and so there is no transmission from panel2 806 because the channel is deemed unavailable. A first switching gap 836 occurs just prior to interval 13, in alignment with the DL/UL switching gap seen by panel1 804. CAT2 CCA 836 is not in fact performed because DL and UL configurations are matched across panels and the panel2 806 cannot start with no access to UL. A second switching gap 837 occurs just prior to interval 14 in alignment with the UL/DL switching gap seen by panel1 804. Prior to the end of the switching gap 837 a further CAT2 CCA 838 occurs. After a successful CAT2 CCA 838, a DL data COT 839 occurs.

Referring to panel3 808, in the second joint access period, after a successful CAT2 CCA 843, a DL data COT 844 occurs. After the DL data COT 844 there is a switching gap 845, which ends at the beginning of interval 13. Prior to the end of the switching gap 845, which ends at the beginning of interval 13, a further CAT2 CCA 846 occurs. After a successful CAT2 CCA 846, a UL data COT 847 occurs. After the UL data COT 847 there is another switching gap 848 to allow transition from UL to back to DL. Prior to the end of the switching gap 848 a further CAT2 CCA 849 occurs. After a successful CAT2 CCA 849, another DL data COT 850 occurs.

Figure 8B:
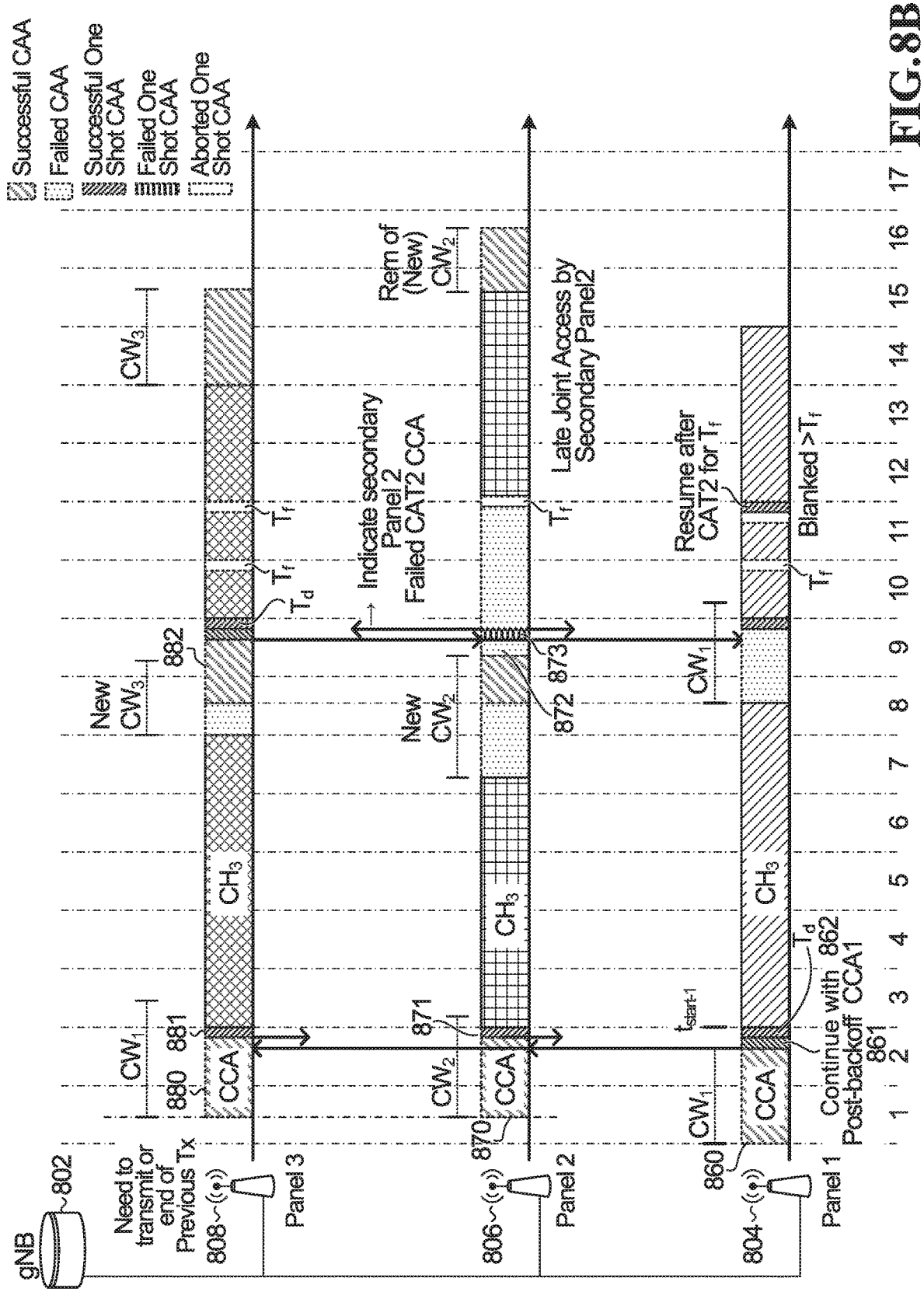
FIG. 8B is a diagram illustrating an eighth example for a group of TRPs attempting to jointly accessing a single channel in unlicensed spectrum according to FIG. 9A is a diagram illustrating a first example for a group of TRPs attempting to jointly accessing a multiple channels in unlicensed spectrum according to one embodiment of the present disclosure.

FIG. 8B illustrates an example in which the second joint access period is similar to the first joint access period of FIG. 8A. In FIG. 8B, in the first joint access period, TRP1 804 is the first to finish a CAT4 CCA 860. TRP1 804 sends a notification to the controller 802, TRP2 806 and TRP3 808 that TRP1 804 has successfully completed the CAT4 CCA and proclaims itself to be the spatial domain primary TRP for the first joint access period. A post-back-off CCA 861 is performed until CAT2 CCA 862. TRP2 806 and TRP3 808 perform CAT4 CCA 870 and 880, respectively, and the CAT2 CCA 871 and 881.

In the second joint access period, TRP3 808 is the first TRP that completes a CAT4 CCA. TRP3 808 sends a notification to the controller 802, TRP2 806 and TRP1 804 that TRP3 808 has successfully completed the CAT4 CCA 882 and proclaims itself to be the spatial domain primary TRP for the second joint access period.

The CAT4 CCA 872 performed by TRP2 806 is unsuccessful and the CAT2 CCA 873 performed by TRP2 806 is also unsuccessful. TRP2 806 sends a notification to the controller 802, TRP2 806 and TRP1 804 that TRP3 808 of the CAT2 CCA failure. This notification from TRP2 806 may result in an on-demand blanking configuration being implemented by the TRPs to allow a late joint access by TRP2 806, as described with reference to the first joint access period in FIG. 8A.

In some embodiments, the data bursts may use a Cyclic Prefix (CP) extension to reserve fractional symbol durations, if any.

FIGS. 9A, 9B, 10A, 10B, 10C, 11A, 11B and 12 illustrate further example scenarios of joint access to the unlicensed spectrum. FIGS. 9A, 9B, 10A, 10B, 10C, 11A, 11B and 12 illustrate examples of how embodiments relating to joint access by a group of multiple TRPs, or panels, as described with reference to FIGS. 4 to 8, can be combined to provide joint access by a group of multiple TRPs, or panels, to more than one channel. The examples of FIGS. 4, 5, 6A and 6B were described to be spatial domain Type-A like procedures and the examples of FIGS. 7A, 7B, 8A and 8B were described to be spatial domain Type-B like procedures. In a scenario of coordinating multiple TRPs over multiple unlicensed channels, it is possible to combine a spatial domain type A-like procedure with a frequency domain type B-like procedure (as will be described with reference to FIGS. 9A and 9B), combine a spatial domain type A-like procedure with a frequency domain type A-like procedure (as will be described with reference to FIGS. 10A, 10B and 10C), combine a spatial domain type B-like procedure with a frequency domain type B-like procedure (as will be described with reference to FIGS. 11A and 11B) or combine a spatial domain type B-like procedure with a frequency domain type A-like procedure (as will be described with reference to FIG. 12).

Figure 9A:
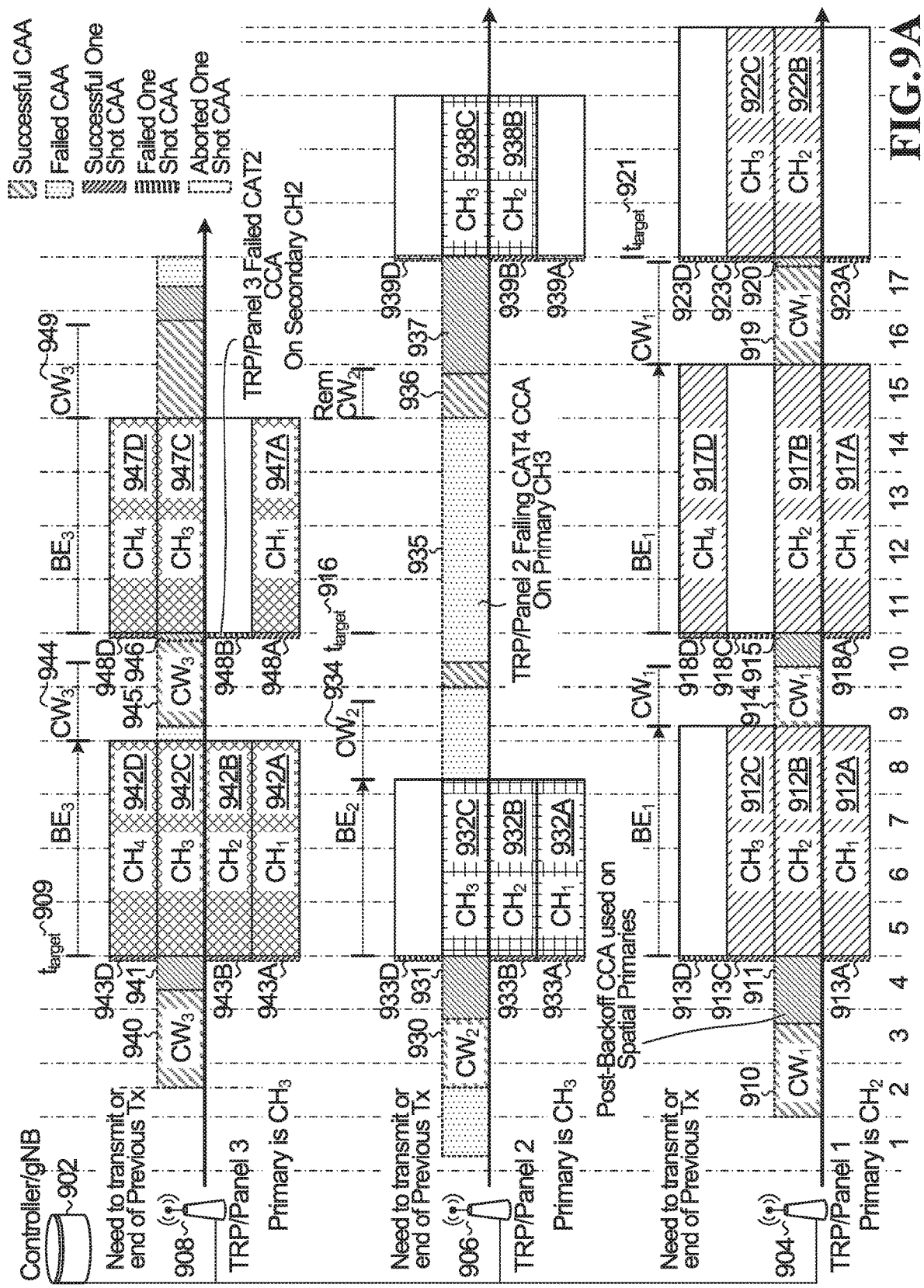
FIG. 9B is a diagram illustrating a second example for a group of TRPs attempting to jointly accessing a multiple channels in unlicensed spectrum according to one embodiment of the present disclosure.

The TRP group in the example of FIG. 9A includes TRPs 904, 906, and 908, which are associated with a controller 902 and three TRPs 904, 906, and 908. The controller 902 is connected with each of the three TRPs 904, 906 and 908 via backhaul connection links.

Although in FIGS. 9A, 9B, 10A, 10B, 10C and 11A channels are shown to be adjacent, it is not considered to be necessary in all embodiments of a combination of a spatial domain Type A-like procedure with a frequency domain Type B-like procedure, or a combination of a spatial domain Type B-like procedure with a frequency domain Type B-like procedure, or a combination of a spatial domain Type B-like procedure with a frequency domain Type A-like procedure. In some embodiments, the channels being accessed by the TRPs, or panels, can be non-contiguous in the frequency domain. In FIG. 12, for example, not all of the channels being accessed are illustrated as being immediately adjacent.

Embodiments pertaining to combinations of a spatial domain Type A-like procedure with a frequency domain Type A-like procedure and that use Wideband CCA, for example as shown in FIGS. 10A, 10B, 10C and 11B, include only adjacent channels.

There are consecutive time intervals labelled 1 to 17 in FIGS. 9A, 9B, 10A, 10B, 10C, 11A, 11B and 12. The marked intervals are the boundaries of a particular time unit. The time unit may be a slot, a mini-slot, a sub-frame, or an OFDM symbol of the unlicensed spectrum. The boundaries are hereafter referred to as 'alignment boundaries.' The alignment boundaries may also align with boundaries of time units of the licensed spectrum.

FIG. 9A illustrates three consecutive joint access periods for access of multiple unlicensed channels by each TRP. It should be understood that this embodiment is equally applicable to cases where the multiple TRPs are multiple panels of the same gNB.

FIG. 9A is a combination of Type A-like procedure in the spatial domain (i.e. per TRP) and Type B-like procedure in the frequency domain (i.e. per channel). Each TRP independently generates and maintains its own back-off counter for use on its selected frequency-domain channel according to the respective priority class (A1-like). Alternatively, the back-off counters are initialized with the same random number generated from the distribution with the largest $CW_p$ among all TRPs/Panels (A2-like). In FIG. 9A each TRP is attempting to access four channels. For each of the TRPs, one of the four channels is selected to be a frequency domain primary channel and the remaining three channels are frequency domain secondary channels. The frequency domain primary channel does not need to be the same channel for each TRP, but it is possible. Likewise, the frequency domain primary channel does not need to be a different channel for each TRP, but it is also possible. The TRPs 904, 906, 908 communicate with the controller 902 for coordinating the $t_{target}$ in each joint access period and keeping the controller and other TRPs apprised of failures in accessing one or more channels.

In FIG. 9A, referring to TRP1 904, channel 2 is selected to be the frequency domain primary channel and channels 1, 3 and 4 are frequency domain secondary channels for all three joint access periods. Although this is the case in FIG. 9A, the frequency domain primary channel could be reconfigured so that the frequency domain primary channel is a different channel in a subsequent joint access channel. In the first joint access period, a first contention window for performing a CAT4 CCA 910 starts at the beginning of interval 2. A post-back-off CCA interval 911 occurs between the end of CAT4 CCA 910 and a determined $t_{target}$ 909. The $t_{target}$ 909 starts at the beginning of interval 5. Because CAT4 CCA 910 is successful, TRP1 904 transmits and may receive data within COT 9128 ending at of $BE_1$ on channel 2. Prior to $t_{target}$ 909, for each of the frequency domain secondary channels, there is a short pre-defined period 913A, 913C, 913D for performing a CAT2 CCA on each respective secondary channel 1, 3 and 4. CAT2 CCA 913A and 913C are successful for frequency domain secondary channels 1 and 3, so TRP1 904 transmits and may receive data within COTs 912A and 912C on channels 1 and 3, respectively. CAT2 CCA 913D is unsuccessful for frequency domain secondary channel 4, so TRP1 904 does not transmit a burst on channel 4 in the first joint access period. The maximum duration of the COT for the frequency domain secondary channels is the maximum duration of the COT for the frequency domain primary channel. After the end of COT 912B, a new contention window for a CAT4 CCA 914 begins for the second joint access period. After the CAT4 CCA 914 is finished there is a new post-back-off CCA interval 915 between the end of CAT4 CCA 914 and a determined $t_{target}$ 916 for the second joint access period. The $t_{target}$ 916 starts at the beginning of interval 11. Because CAT4 CCA 914 is successful, TRP1 904 transmits and may receive data within a COT 917B ending at $BE_1$ on channel 2. Prior to $t_{target}$ 916, for each of the frequency domain secondary channels, there is a pre-defined period 918A, 918C, 918D for performing a CAT2 CCA on each respective secondary channel 1, 3 and 4. CAT2 CCA 918A and 918D are successful for frequency domain secondary channels 1 and 4, so TRP1 904 transmits and may receive data within a COT 917A and 917D on channels 1 and 4, respectively. CAT2 CCA 918C is unsuccessful for frequency domain secondary channel 3, so TRP1 904 does not transmit/receive a data on channel 3 in the second joint access period. After the end of COT 917B, a new contention window for a CAT4 CCA 919 begins for the third joint access period. After CAT4 CCA 919 is finished there is a new post-back-off CCA interval 920 between the end of CAT4 CCA 919 and a determined $t_{target}$ 921 for the third joint access period. The $t_{target}$ 921 starts at the beginning of interval 18. Because CAT4 CCA 919 is successful, TRP1 904 transmits and may receive data within a COT 922B on channel 2. Prior to $t_{target}$ 921, for each of the frequency domain secondary channels, there is a short pre-defined period 923A, 923C, 923D for performing a CAT2 CCA on each respective secondary channel 1, 3 and 4. CAT2 CCA 923C is successful for frequency domain secondary channel 3, so TRP1 904 transmits and may receive data within a COT 922C on channel 3. CAT2 CCA 923A and 923D are unsuccessful for frequency domain secondary channels 1 and 4, so TRP1 904 does not transmit/receive a data on channels 1 and 4 in the third joint access period.

Referring to TRP2 906, channel 3 is selected to be the frequency domain primary channel and channels 1, 2 and 4 are frequency domain secondary channels. In the first joint access period, a first contention window for performing a CAT4 CCA 930 starts within interval 2. A post-back-off CCA interval 931 occurs between the end of the CAT4 CCA 930 and $t_{target}$ 909. Because CAT4 CCA 930 is successful, TRP2 906 transmits and may receive data within a COT 932C ending at $BE_2$ on channel 3. Prior to the $t_{target}$ for each of the frequency domain secondary channels, there is a short pre-defined period 933A, 933B, 933D for performing a CAT2 CCA on each respective secondary channel 1, 2 and 4. CAT2 CCA 933A and 933B are successful for frequency domain secondary channels 1 and 2, so TRP2 906 transmits and may receive data within COTs 932A and 932B on channels 1 and 2, respectively. CAT2 CCA 933D is unsuccessful for frequency domain secondary channel 4, so TRP2 906 does not transmit/receive data on channel 4 in the first joint access period. The maximum duration of the COT for the frequency domain secondary channels is the maximum duration of the data COT (MCOT) for the frequency domain primary channel. The duration is not necessarily the same for all channels as long as each COT is less than the frequency domain primary MCOT. After the end of COT 932C, a new contention window 934 for a CAT4 CCA begins for the second joint access period. The CAT4 CCA in contention window 934 is unsuccessful because a signal is detected on the channel. Because the CAT4 CCA is unsuccessful, no post-back-off CCA interval occurs because the TRP2 906 is not going to transmit a burst on frequency domain primary channel 3. As a result of the frequency domain primary channel not being considered available to TRP2 906, TRP2 906 does not perform CAT2 CCA processes for any of the frequency domain secondary channels 1, 2 and 4 in the second joint access period. TRP2 906 continues with iCCA 935 on primary channel 3 until a new contention window begins for a CAT4 CCA 936 in the third joint access period, the duration of CAT4 CCA 936 being equal to a remainder of the counter duration not used in the second joint access period. After CAT4 CCA 936 is finished there is a new post-back-off CCA interval 937 between the end of CAT4 CCA 936 and a determined $t_{target}$ 921 for the third joint access period. The $t_{target}$ 921 starts at the beginning of interval 18. Because CAT4 CCA 936 is successful, TRP2 906 transmits a burst during COT 938C on channel 3. Prior to the $t_{target}$ 921, for each of the frequency domain secondary channels, there is a short pre-defined period 939A, 939B, 939D for performing a CAT2 CCA on each respective secondary channel 1, 2 and 4. CAT2 CCA 939B is successful for frequency domain secondary channel 2, so TRP2 906 transmits and may receive data within COT 938B on channel 2. CAT2 CCA 939A and 939D are unsuccessful for frequency domain secondary channels 1 and 4, so TRP2 906 does not transmit/receive a burst on channels 1 and 4 in the third joint access period.

Referring to TRP3 908, channel 3 is selected to be the frequency domain primary channel and channels 1, 2 and 4 are frequency domain secondary channels. In the first joint access period, a first contention window for performing a CAT4 CCA 940 starts within interval 2. A post-back-off CCA interval 941 occurs between the end of the CAT4 CCA 940 and $t_{target}$ 909. Because CAT4 CCA 940 is successful, TRP3 908 transmits and may receive data within a burst 942C ending at BE$_3$ on channel 3. Prior to $t_{target}$ 909, for each of the frequency domain secondary channels, there is a short pre-defined period 943A, 943B, 943D for performing a CAT2 CCA on each respective secondary channel 1, 2 and 4. CAT2 CCA 943A, 943B and 913D are all successful for frequency domain secondary channels 1, 2 and 4, so TRP3 908 transmits and may receive data within a COT 942A, 942B and 942D on channels 1, 2 and 4, respectively. The maximum duration of the COT for the frequency domain secondary channels is the maximum duration of the COT for the frequency domain primary channel. After the end of COT 942C, a new contention window 944 for a CAT4 CCA 945 begins for the second joint access period. After CAT4 CCA 945 is finished there is a new post-back-off CCA interval 946 between the end of the CAT4 CCA 945 and $t_{target}$ 916. The $t_{target}$ 916 starts at the beginning of interval 11. Because CAT4 CCA 945 is successful, TRP3 908 transmits and may receive data within a burst 947B on channel 3. Prior to the $t_{target}$ 916, for each of the frequency domain secondary channels, there is a short pre-defined period 948A, 948B, 948D for performing a CAT2 CCA on each respective secondary channel 1, 2 and 4. CAT2 CCA 948A and 948D are successful for frequency domain secondary channels 1 and 4, so TRP3 908 transmits and may receive data within a COT 947A and 947D on channels 1 and 4, respectively. CAT2 CCA 948B is unsuccessful for frequency domain secondary channel 2, so TRP3 908 does not transmit/receive a burst on channel 2 in the second joint access period. After the end of COT duration 947C, a new contention window 949 for a CAT4 CCA begins for the third joint access period. The CAT4 CCA in contention window 949 is unsuccessful because the channel is sensed as busy. Similar to TRP2 906 in the second joint access period, because the CAT4 CCA is unsuccessful, there is no transmission on frequency domain primary channel 3 or any of the frequency domain secondary channels 1, 2 and 4 in the third joint access period. TRP3 908 continues with iCCA on frequency domain primary channel 3 until a new contention window begins for a remainder of the duration of a CAT4 CCA 936 process not used in the third joint access period.

FIG. 9B illustrates an example similar to FIG. 9A with the addition of fall-back early alignment based on a revised $t_{target}$ start time. The first joint access period in FIG. 9B is the same as shown in FIG. 9A. In the second joint access period of FIG. 9B the CW 960 for the frequency domain primary channel (channel 3) is the longest of the spatial domain primary channels for the three TRPs. The CAT4 CCA 962 being performed in the CW 960 is unsuccessful. As a result TRP2 906 issues a missed $t_{target}$ notification to the controller 902. In some embodiments, the notification is also sent to TRP1 904 and TRP3 908. In other embodiments, TRP1 904 and TRP3 908 do not receive the notification from TRP2 906, but receive the notification from the controller 902. The controller 902 is able to determine an earlier $t_{target}$ 964 than the originally scheduled $t_{target}$ 966 because the originally scheduled $t_{target}$ 966 was based on the longest CW being associated with TRP2 906. Because TRP2 906 will miss the originally scheduled $t_{target}$ 966 and the originally scheduled $t_{target}$ 966 is dependent upon CW$_2$ 960, it is not necessary for TRP1 904 and TRP3 908 to wait for the originally scheduled $t_{target}$ 966, if the controller 902 has sufficient time to coordinate a revised $t_{target}$ 964. The revised $t_{target}$ 964 will be dependent upon the next longest CW between TRP1 904 and TRP3 908.

In some embodiments, the transmission power for each TRP that successfully accesses the channel can be reduced based on the number of concurrently transmitting TRPs and the number of cleared frequency channels per TRP.

In some embodiments, coordinating the starting point for the channel access procedures on different frequency primary channels across TRPs results in alignment of the transmission start time per unlicensed channel for a multichannel access attempt.

In some embodiments, when the $t_{target}$ is t at least based on the latest BE of the multiple TRPs and the largest CW of the TRPs, deferral of the CCA due to mutual blocking by longer COTs is provisioned for during the subsequent joint access attempt. The potential aligned transmission of a TRP occurs at the $t_{target}$ which can be the same as or later than the earliest starting point possible if the TRP performs the channel access procedure independently rather than jointly with other TRPs.

In some embodiments, the use of CAT2 CCA on secondary frequency channels of each TRP avoids blocking of a wideband (WB) joint TRP channel access opportunity due to one or more coexisting subband transmissions.

In some embodiments, applying Type A1-like or Type A2-like rules in the spatial domain to generate the back-off counters of the primary channels improves coexistence fairness with other nodes from same or different Radio Access Technologies (RATs).

Figure 10A:
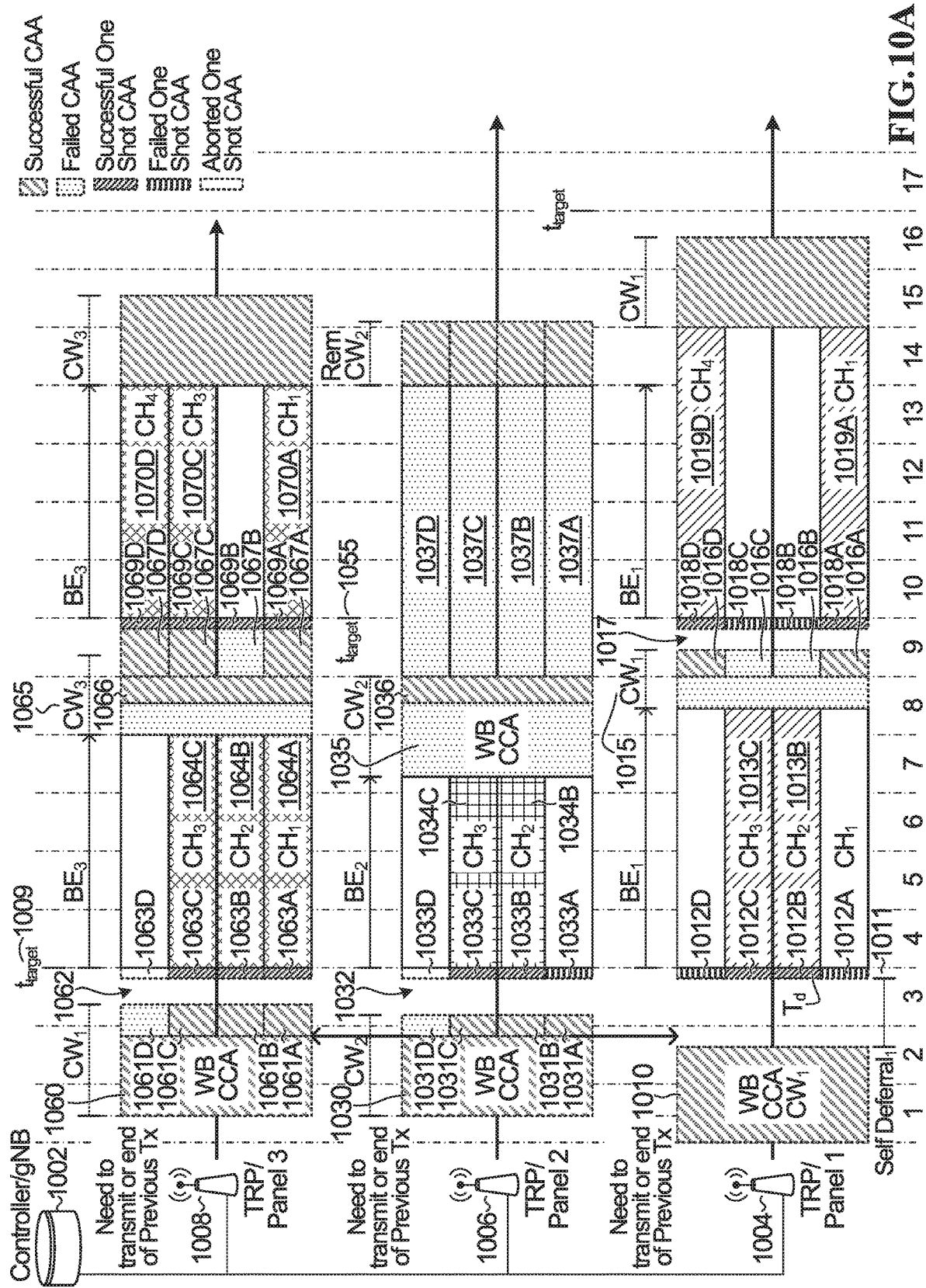
FIG. 10A is a diagram illustrating a third example for a group of TRPs attempting to jointly accessing a multiple channels in unlicensed spectrum according to one embodiment of the present disclosure.
Figure 10B:
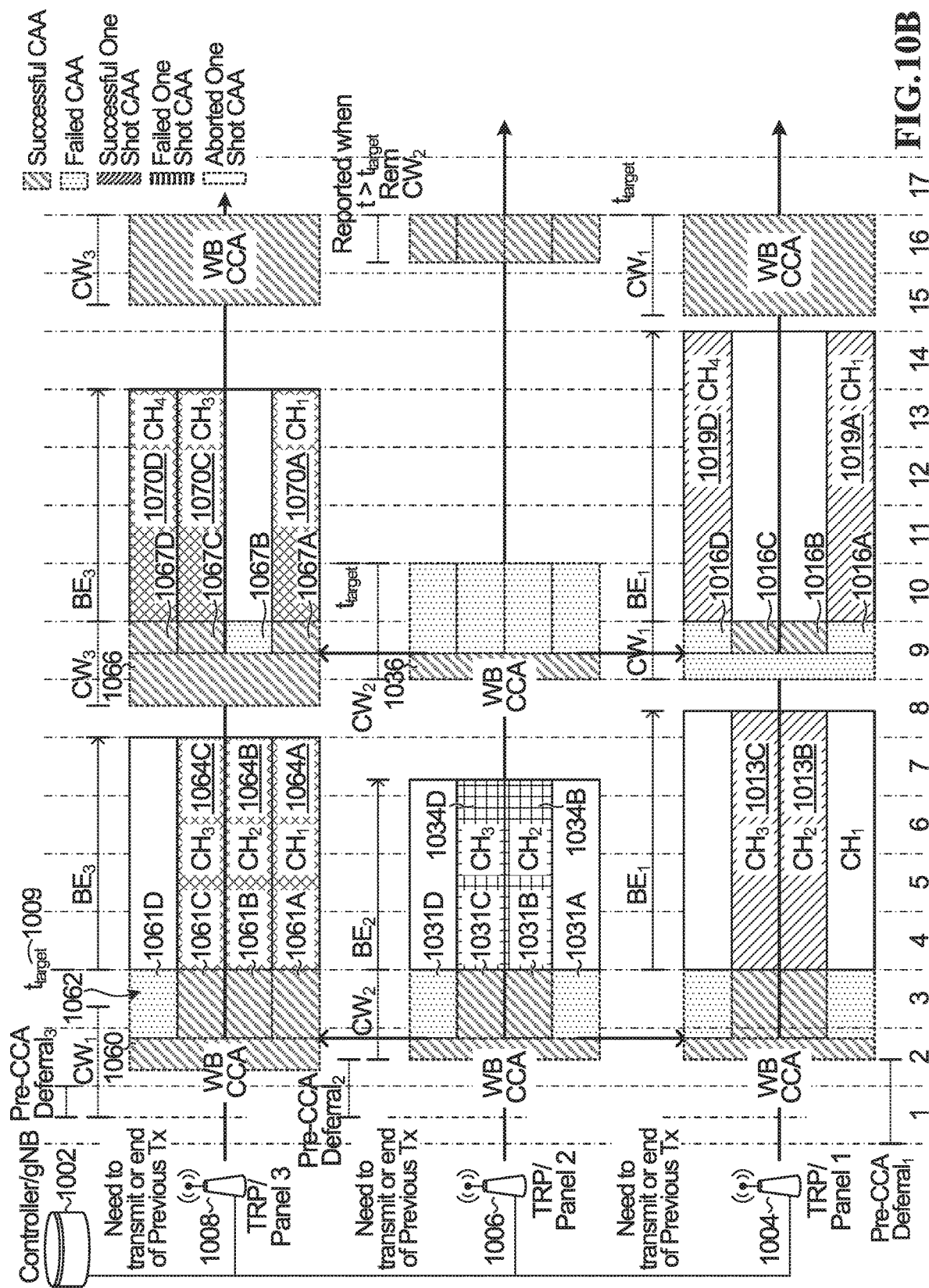
FIG. 10B is a diagram illustrating a fourth example for a group of TRPs attempting to jointly accessing a multiple channels in unlicensed spectrum according to one embodiment of the present disclosure.
Figure 10C:
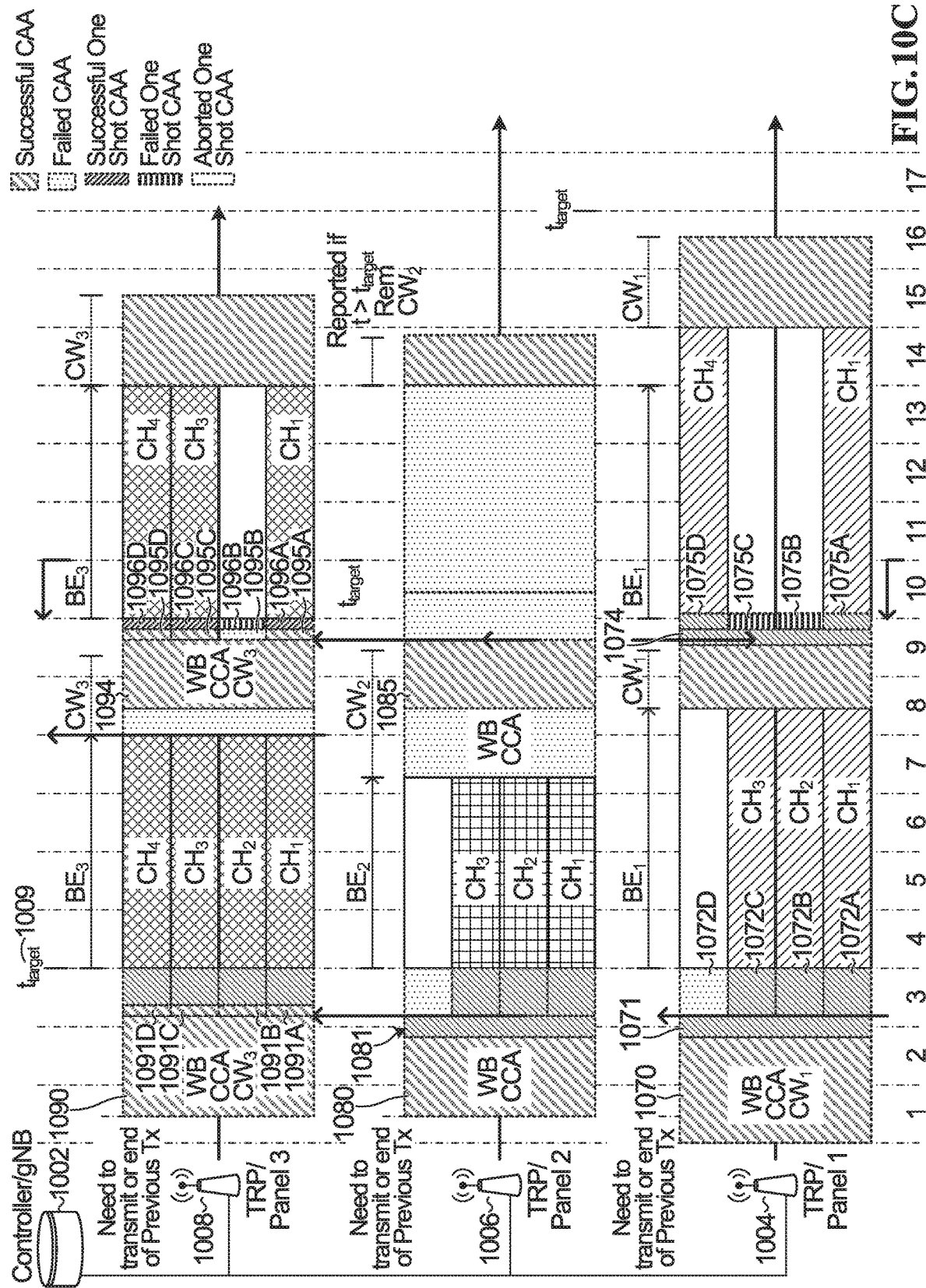
FIG. 10C is a diagram illustrating a fifth example for a group of TRPs attempting to jointly accessing a multiple channels in unlicensed spectrum according to one embodiment of the present disclosure.

FIGS. 10A, 10B and 10C illustrate two consecutive joint access periods for joint access of multiple unlicensed channels by each TRP or panel. Each of FIGS. 10A, 10B and 10C is a combination of Type A-like procedure in the spatial domain and Type A-like procedure in the frequency domain. Each TRP independently generates and maintains its own back-off counter for wideband (WB) CCA over a wideband CC or a BandWidth Part (MP) thereof (Type A1-like).

In FIG. 10A each TRP is attempting to access four channels. Each of the TRPs begins a wideband (WB) CCA process across all four channels, at least until a busy status is detected on one of the channels. If a busy status is detected, the TRP can switch to CAT4 CCA for each of the channels, i.e., sub-band CCA to avoid compromising the entire transmission opportunity. One or more channels may still have a successful CAT4 CCA result even though a busy status is detected on one of the channels. The TRPs 1004, 1006, and 1008 communicate with the controller 1002 for coordinating the $t_{target}$ and keeping the controller and other TRPs apprised of failures accessing one or more of the channels.

In FIG. 10A, referring to TRP1 1004, in the first joint access period, a first contention window for performing a WB CCA 1010 starts at the beginning of interval 1. WB CCA 1010 is successful because an idle status is detected collectively for the four channels. A self-deferral interval 1011 occurs between the end of the WB CCA 1010 and a determined $t_{target}$ 1009. Prior to $t_{target}$ 1009, for each of the channels, there is a short pre-defined period 1012A, 1012B, 1012C, 1012D for performing a CAT2 CCA on each respective channel. CAT2 CCA 1012B and 1012C are successful for channels 2 and 3, so TRP1 1004 transmits and may receive data within COTs 1013B and 1013C having durations $BE_1$ on channels 2 and 3, respectively. CAT2 CCA 1012A and 1012D are unsuccessful for channels 1 and 4, so TRP1 1004 does not transmit/receive a burst on channels 1 and 4 in the first joint access period.

Also in the first joint access period, TRP2 1006 performs a WB CCA 1030. The WB CCA 1030 for TRP2 1006 fails, e.g., due to detection of a transmission on channel 4. Although the transmission detected by TRP2 1006 is in channel 4, it should be understood that the TRP may not know which channel or channels have caused the failure. As a result, TRP2 1006 switches to a CAT4 CCA 1031A, 1031B, 1031C and 1031D for each of the individual channels. When WB CCA is switched to multiple separate subband CCAs, the remaining value of the WB back-off counter is used for the subband back-off counters. This is Type A2-like in the frequency domain. The TRP switches to subband CCA upon detection of CAT4 WB "CCA Failure" at a given CCA slot. R WB CCA failure occurs before the latest BE, switching to subband CCA may not be triggered because the WB CCA failure is attributed to mutual blocking.

TRP2 1006 notifies the controller 1002, TRP1 1004 and TRP3 1008 of the failure. Because the failure and notification occurs after TRP1 1004 has completed its WB CCA 1010, this has no effect on TRP1 1004 WB CCA operation. However, TRP3 1008 has not finished its WB CCA 1060, so TRP3 1008 switches to CAT4 CCA for each of the individual channels, to avoid the possibility of compromising the whole transmission opportunity. Cross-TRP indication can be sent to other in-group TRP, e.g., through the controller, to switch from WB CCA to subband CCA. Switching can also follow a preset rule, e.g., always use WB CCA for CAT4 back-off procedure whereas sub-band CCA is always CAT2 before transmission start.

TRP2 1006 completes the CAT4 CCA procedure 1031A, 1031B, 1031C and 1031D for each of channels 1 to 4, respectively. The CAT4 CCA 1031A, 1031B and 1031C are successful for channels 1 to 3 and CAT4 CCA 1031D is unsuccessful for channel 4. A self-deferral interval 1032 occurs between the end of the CAT4 CCAs for each channel and $t_{target}$ 1009. Prior to $t_{target}$ 1009, for each of the channels, there is a short pre-defined period 1033A, 1033B, 1033C, 1033D for performing a CAT2 CCA on each respective channel. CAT2 CCA 1033B and 1033C are successful for channels 2 and 3, so TRP2 1006 transmits and may receive data within COTs 1034B and 1034C ending at $BE_2$ on channels 2 and 3, respectively. CAT2 CCA 1033A and 1033D are unsuccessful for channels 1 and 4, so TRP2 1006 does not transmit/receive a burst on channels 1 and 4 in the first joint access period.

Also in the first joint access period, TRP3 1008 initially performs a WB CCA 1060. Once TRP3 1008 is notified by TRP3 1008 of the failure of the WB CCA 1030, TRP3 1008 switches to a CAT4 CCA 1061A, 1061B, 1061C and 1061D for each of the individual channels. TRP3 1008 completes the CAT4 CCA procedure 1061A, 1061B, 1061C and 1061D for each of channels 1 to 4, respectively. The CAT4 CCA 1061A, 1061B and 1061C are successful for channels 1 to 3 and CAT4 CCA 1061D is unsuccessful for channel 4. A self-deferral interval 1062 occurs between the end of the CAT4 CCA and $t_{target}$ 1009. Prior to the $t_{target}$ 1009, for each of the channels, there is a short pre-defined period 1063A, 1063B, 1063C, 1063D for performing a CAT2 CCA on each respective channel. CAT2 CCA 1063A, 1063B and 1063C are successful for channels 1, 2 and 3, so TRP3 1008 transmits and may receive data within COTs 1064A, 1064B and 1064C ending at $BE_3$ on channels 1, 2 and 3, respectively. CAT2 CCA 1063D is unsuccessful for channel 4, so TRP3 1008 does not transmit/receive a burst on channel 4 in the first joint access period.

Still referring to TRP3 1008, after the end of COTs 1064A, 1064B and 1064C of channels 1, 2 and 3, a new contention window 1065 for a WB CCA 1066 begins for the second joint access period. TRP3 1008 performs the WB CCA 1066. The WB CCA 1066 fails, because a signal is detected on channel 2. As a result, TRP3 1008 switches to a CAT4 CCA 1067A, 1067B, 1067C and 1067D for each of the individual channels. TRP3 1008 notifies the controller 1002 and TRP1 1004 and TRP2 1006 of the failure. TRP1 and TRP2 1008 are not finished their WB CCA 1015 and 1036, so TRP1 1002 and TRP2 1006 switch to CAT4 CCA for each of the individual channels, to mitigate the possibility that all of the channels will be indicated to be unavailable when some of the channels may in fact still be available. TRP3 1008 completes the CAT4 CCA procedure 1067A, 1067B, 1067C and 1067D for each of channels 1 to 4, respectively. The CAT4 CCA 1067A, 1067C and 1067D are successful for channels 1, 2 and 4 and CAT4 CCA 1067C is unsuccessful for channel 3. A self-deferral interval 1068 occurs between the end of the CAT4 CCA and $t_{target}$ 1055. Prior to the $t_{target}$ 1055, for each of the channels, there is a short pre-defined period 1069A, 1069B, 1069C, 1069D for performing a CAT2 CCA on each respective channel. CAT2 CCA 1069A, 1069C and 1069D are successful for channels 1, 3 and 4, so TRP3 1008 transmits and may receive data within COTs 1070A, 1070C and 1070D on channels 1, 3 and 4, respectively. CAT2 CCA 1069B is unsuccessful for channel 2, so TRP3 1008 does not transmit/receive a burst on channel 2 in the second joint access period.

Referring back to TRP2 1006, after the end of COTs 1034B and 1034C of channels 2 and 3, a new contention window 1035 for a WB CCA 1036 begins for the second joint access period. TRP2 1006 starts the WB CCA 1036. As a result of receiving notification of a WB CCA failure of TRP3 1008, TRP2 1006 switches to a CAT4 CCA 1037A, 1037B, 1037C and 1037D for each of the individual channels. CAT4 CCA procedure 1037A, 1037B, 1037C and 1037D are each unsuccessful for channels 1, 2, 3 and 4, respectively, so TRP2 1006 does not transmit/received a burst on any of the channels in the second joint access period.

Referring back to TRP1 1004, after the end of COTs 1013B and 1013C of channels 2 and 3, a new contention window 1014 for a WB CCA 1015 begins for the second joint access period. As a result of receiving notification of the WB CCA failure of TRP3 1008, TRP1 1004 switches to a CAT4 CCA 1016A, 1016B, 1016C and 1016D for each of the individual channels. TRP1 1004 completes the CAT4 CCA procedure 1016A, 1016B, 1016C and 1016D for each of channels 1 to 4, respectively. The CAT4 CCA 1016A and 1016D are successful for channels 1 and 4 and CAT4 CCA 1016B and 1016C are unsuccessful for channels 2 and 3, respectively. A self-deferral interval 1017 occurs between the end of the CAT4 CCA and $t_{target}$ 1055. Prior to the $t_{target}$ 1055, for each of the channels, there is a short pre-defined period 1018A, 1018B, 1018C, 1018D for performing a CAT2 CCA on each respective channel. CAT2 CCA 1018A and 1018D are successful for channels 1 and 4, so TRP1 1004 transmits and may receive data within COTs 1019A and 1019D on channels 1 and 4, respectively. CAT2 CCA 1018B and 1018C are unsuccessful for channels 2 and 3, so TRP1 1004 does not transmit/receive a burst on channels 2 and 3 in the second joint access period.

FIG. 10B illustrates an example similar to FIG. 10A. However, instead of having a self-deferral 1032 between the WB CCA 1010 and the CAT2 CCAs 1012A, 1012B, 1012C and 1012D or the separate sub-band CCAs 1031A, 1031B, 1031C and 1031D and the CAT2 CCAs 1033A, 1033B, 1033C and 1033D, as in the example of the first joint access period of TRP1 1008 and TRP2 1006 in FIG. 10A, in FIG. 10B the WB CCA, or the separate sub-band CCAs, end at the $t_{target}$ and there is no CAT2. There is also a pre-CCA deferral period prior to when the WB CCA starts for each TRP in each joint access period.

Referring to FIG. 10B, in the first joint access period, for each of the TRPs, after a pre-CCA deferral period, a WB CCA is performed. The WB CCA for TRP2 1006 fails and TRP2 1006 sends a cross-TRP indication, e.g., through the controller. Thus both TRP1 1004 and TRP3 1008 switch to a sub-band CCA. The sub-band CCA each start from a same back-off counter and therefore the CAAs finish at $t_{target}$ simultaneously.

In the second joint access period, all three TRPs start with WB CCA, but once again they change to sub-band CCA as in the first joint access period. The sub-band CCA is unsuccessful for all of the channels for TRP2 1006 and so TRP2 1006 does not access any of the channels in the second joint access period. TRP2 1006 notifies the controller 1002, TRP1 1004 and TRP8 1008 of a missed $t_{target}$. The originally scheduled $t_{target}$ is thus revised to an earlier start time. The originally scheduled $t_{target}$ was dependent upon the $BE_1$ of TRP1 1004 and $CW_2$ of TRP2 1006. The controller can then determine the revised $t_{target}$ based on the next longest CW in a similar manner as described with reference to FIG. 6A.

In the third joint access period, TRP1 1004 and TRP 3 1008 perform WB CCA and TRP2 1006 performs sub-band CCA instead of a WB CCA until $t_{target}$ since its access was blocked in the second joint access period. The sub-band CCA performed by TRP2 1006 may have a duration equal to a remainder of the counter duration of the CW of the second joint access period from when the sub-band CCA was frozen upon detecting busy status on the four channels.

FIG. 10C illustrates an example using WB CCA and which also involves using a post back-off CCA and a missing $t_{target}$ notification sent by a TRP when the $t_{target}$ will be missed due to a failed CCA. In FIG. 10C, the notification also results in the $t_{target}$ being revised from the originally scheduled $t_{target}$ in the second joint access period.

In FIG. 10C, in the first joint access period, for TRP 1 1004, a WB CCA 1070 is successfully completed, after which a post back-off WB CCA 1071 is started. The post back-off WB CCA 1071 fails and so the post back-off WB CCA 1071 switches to a post back-off sub-band CCA 1072A, 1072B, 1072C and 1072D. Upon failure of the post back-off WB CCA 1071, TRP1 1004 sends the failure notification to controller 1002, TRP2 1006 and TRP3 1008. Upon receipt of the notification from TRP1 1004, TRP2 1006 has already finished a WB CCA 1080 and is currently undergoing a post back-off WB CCA. TRP2 1006 then switches from the post back-off WB CCA to a post back-off sub-band CCA 1082A, 1082B, 1082C and 1082D. Upon receipt of the notification from TRP1 1004, TRP3 1008 has not finished a WB CCA 1090 so TRP3 1008 switches from WB CCA 1090 to a sub-band CCA 1091A, 1091B, 1091C and 1091D. Once the sub-band CCA is completed, TRP3 1008 performs the post back-off sub-band CCA 1092A, 1092B, 1092C and 1092D. Each of the post back-off sub-band CCAs for the three TRPs end at the $t_{target}$ for the first joint access period.

In the second joint access period, all three TRPs start with WB CCA, but once again they change to sub-band CCA. The WB CCA 1085 is unsuccessful for all of the channels for TRP2 1006 and so TRP2 1006 does not access any of the channels in the second joint access period. The originally scheduled $t_{target}$ is also revised to an earlier start time. The originally scheduled $t_{target}$ was dependent upon the $BE_1$ of TRP1 1004 and $CW_2$ of TRP2 1006. The sub-band CCA is unsuccessful for TRP2 1006 and TRP2 1006 notifies the controller 1002, TRP1 1004 and TRP5 1008 of a missed $t_{target}$. The controller can then determine the revised $t_{target}$ based on the next longest CW in a similar manner as described with reference to FIG. 6A.

With regard to TRP1 1004, in the second joint access period, TRP1 1004 receives a missed $t_{target}$ notification from TRP2 1006. TRP1 1004 does not need to switch from post back-off WB CCA 1074 to post back-off sub-band CCA based on the received missed $t_{target}$ notification. However, there is a detected signal on channels 2 and 3 that results in TRP1 1004 switching from WB post-back-off CCA 1074 to sub-band post back-off CCAs 1075A, 1075B, 1075C and 1075D. The busy status detected on channels 2 and 3 results in channels 2 and 3 being inaccessible to TRP1 1004.

With regard to TRP3 1008, in the second joint access period, TRP3 1008 receives the missed $t_{target}$ notification from TRP2 1006. TRP3 1008 is still in WB CCA 1094, but does not switch from WB CCA 1094 to sub-band CCA based on the received missed $t_{target}$ notification. However, there is a detected signal on channel 2 at around the same time that results in TRP3 1008 switching from WB CCA 1094 to sub-band CCA 1095A, 1095B, 1095C and 1095D. Once the sub-band CCA is completed, the sub-band post back-off CCA 1096A, 1096B, 1096C and 1096D is performed until the revised $t_{target}$. The busy status detected on channel 2 results in channel 2 being inaccessible to TRP3 1008.

In some embodiments, employing WB CCA as a default for the back-off procedure per TRP reduces complexity and energy consumption of LBT compared to subband LBT.

In some embodiments, switching to subband CAT4 or CAT2 on the secondary frequency channels of each TRP avoids blocking of a WB joint TRP channel access opportunity due to one or more coexisting subband transmissions.

In some embodiments, coordinating the starting point for the channel access procedures on different frequency primary channels of the multiple TRPs results in alignment of the transmission start time per unlicensed channel for a multi-channel access attempt.

In some embodiments, when the $t_{target}$ is at least based on a latest BE for the multiple TRPs and the largest CW for the multiple TRPs, deferral of the CCA due to mutual blocking by longer COTs is provisioned for during a subsequent joint access attempt.

In some embodiments, applying Type A1-like or Type A2-like rules in the spatial domain to generate the back-off counters of the primary channels improves coexistence fairness with other nodes from same or different RATs.

Figure 11A:
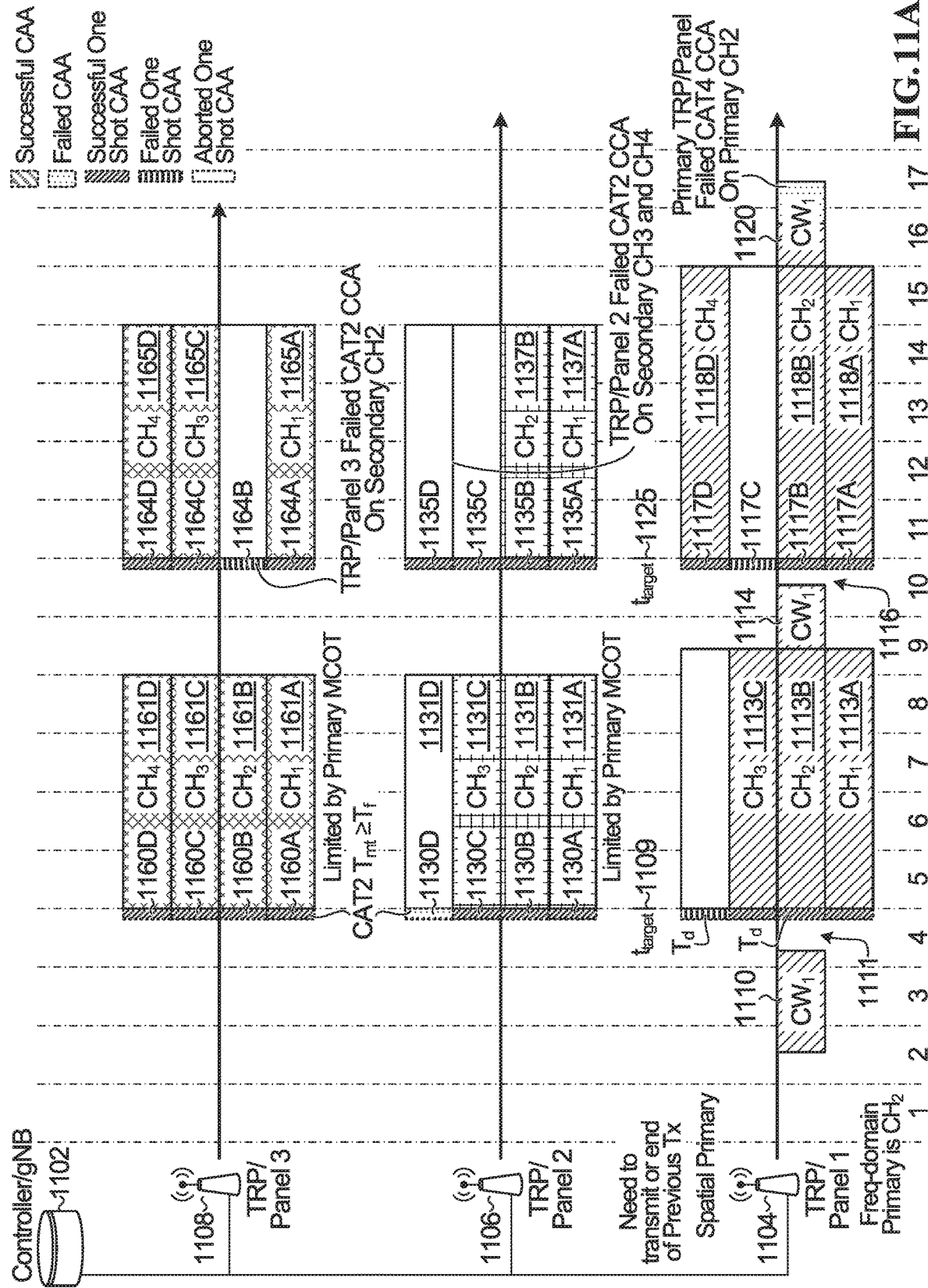
FIG. 11A is a diagram illustrating a sixth example for a group of TRPs attempting to jointly accessing a multiple channels in unlicensed spectrum according to one embodiment of the present disclosure.
Figure 12:
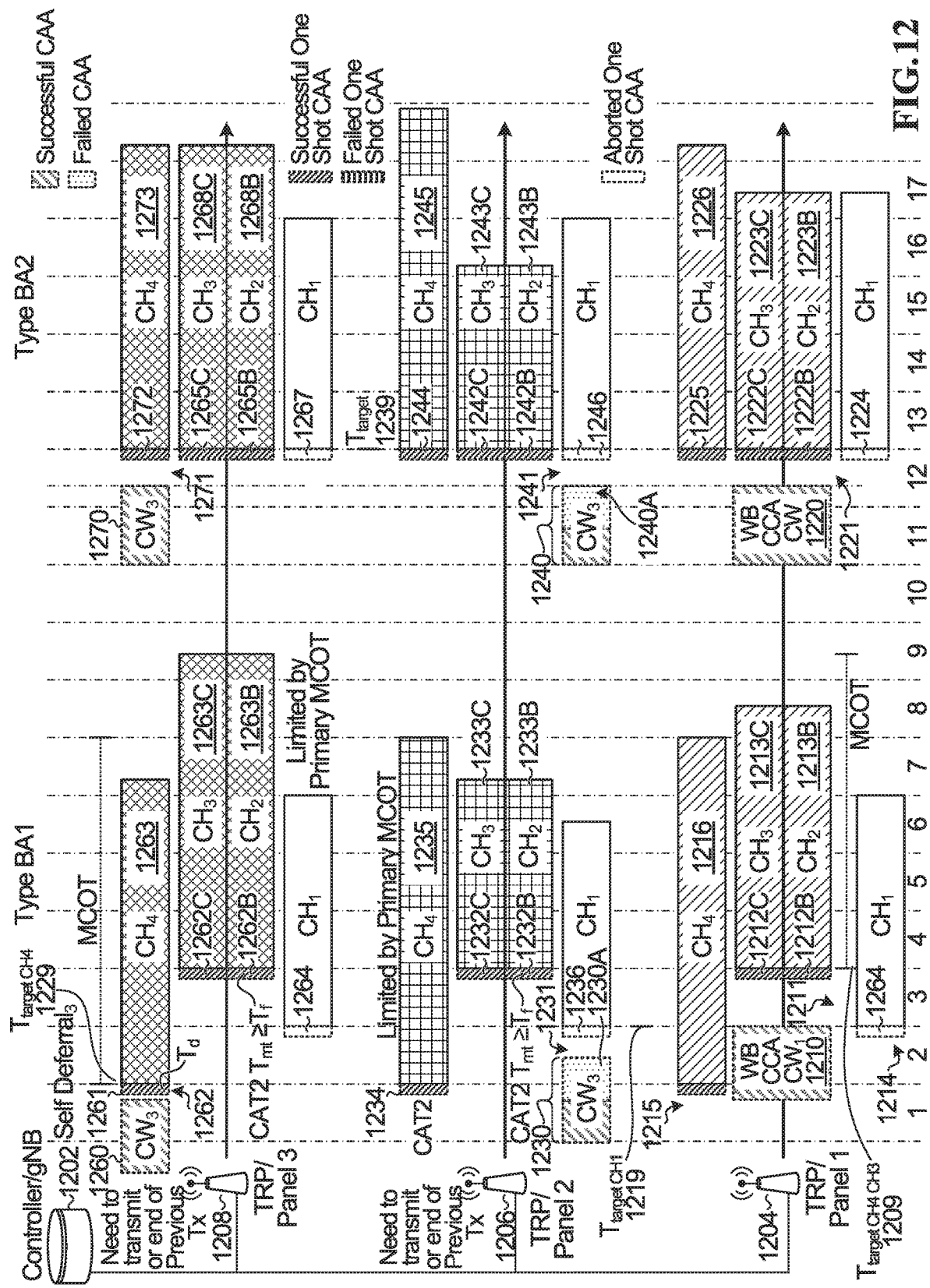
FIG. 12 is a diagram illustrating an eighth example for a group of TRPs attempting to synchronously access a single channel while jointly accessing multiple channels in unlicensed spectrum according to one embodiment of the present disclosure.

FIG. 11A illustrates two consecutive joint access periods for access of multiple unlicensed channels by each TRP or panel. FIG. 11A is a combination of a Type B-like procedure in the spatial domain and a Type B-like procedure in the frequency domain. In FIG. 11A each TRP is attempting to access four channels. One of the TRPs of the group of TRPs is selected to be a spatial domain primary TRP for at least one joint access period and the remaining two TRPs are spatial domain secondary TRPs for the corresponding number of joint access periods. The spatial domain primary TRP does not need to be the same TRP for all joint access periods. The spatial domain primary TRP can independently generate and maintain its own back-off counter according to the respective priority class. The back-off counter of the spatial primary TRP can be generated from the distribution with the largest $CW_p$ among all TRPs/Panels similar to frequency-domain Type B2.

The TRPs 1104, 1106, and 1108 communicate with the controller 1102 for communicating the $t_{target}$, which depends only on the spatial domain primary TRP, and keeping the controller and other TRPs apprised of failures accessing one or more channels.

In FIG. 11A, TRP1 1104 is selected as the spatial domain primary TRP for both the first and second joint access periods. In another embodiment, no coordination of starting time is required and a cross-TRP back-off success indication sent by TRP1 1104 through the controller is employed instead. The TRP can be selected as a spatial domain primary based on a random selection of the TRPs in the group of TRPs, based on a round robin selection or based on the first TRP that finishes its CAT4 CCA on its frequency-domain primary channel indicating that it is the primary for the current joint access period, which can result in other TRPs terminating their own CAT4 CCA and abandoning the respective remaining CW.

In the first joint access period, a first contention window for performing a CAT4 CCA 1110 starts on a frequency-domain primary channel within interval 2. The frequency-domain primary channel is channel 2 (CH$_2$). TRP1 1104 notifies the controller 1102, TRP2 1106 and TRP3 1108 of a successfully completed CAT4 CCA procedure. A self-deferral interval 1111 occurs between the end of the CAT4 CCA 1110 and a determined $t_{target}$ 1109. Prior to the $t_{target}$ 1109, for each of the channels, there is a short pre-defined period 1112A, 1112B, 1112C, 1112D for performing a CAT2 CCA on each respective channel. CAT2 CCA 1112A, 1112B and 1112C are successful for channels 1, 2 and 3, so TRP1 1104 transmits and may receive data within COTs 1113A, 1113B and 1113C on channels 1, 2 and 3, respectively. CAT2 CCA 1112D is unsuccessful for channel 4, so TRP1 1104 does not transmit/receive a burst on channel 4 in the first joint access period.

For TRP2 1106, also in the first joint access period, prior to $t_{target}$ 1109, for each of the channels, there is a short pre-defined period 1130A, 1130B, 1130C, 1130D for performing a CAT2 CCA on each respective channel. CAT2 CCA 1130A, 1130B and 1130C are successful for channels 1, 2 and 3, so TRP2 1106 transmits and may receive data within COTs 1131A, 1131B and 1131C on channels 1, 2 and 3, respectively. CAT2CCA 1130D is unsuccessful for channel 4, so TRP2 1106 does not transmit/receive a burst on channel 4 in the first joint access period.

For TRP3 1108, also in the first joint access period, prior to $t_{target}$ 1109, for each of the channels, there is a short pre-defined period 1160A, 1160B, 1160C, 1160D for performing a CAT2 CCA on each respective channel. CAT2 CCA 1160A, 1160B, 1160C and 1160D are successful for channels 1, 2, 3 and 4, so TRP3 1108 transmits and may receive data within COTs 1161A, 1161B, 1161C and 1161D on channels 1, 2, 3 and 4, respectively.

TRP1 1104 is still selected as the spatial domain primary TRP in the second joint access period. A first contention window for performing a CAT4 CCA 1114 starts after COT 1113B of the first joint access period. A self-deferral interval 1116 occurs between the end of the CAT4 CCA 1114 and $t_{target}$ 1125. Prior to $t_{target}$ 1125, for each of the channels, there is a short pre-defined period 1117A, 1117B, 1117C, 1117D for performing a CAT2 CCA on each respective channel. CAT2 CCA 1117A, 1117B and 1117D are successful for channels 1, 2 and 4, so TRP1 1104 transmits and may receive data within COTs 1118A, 1118B and 1118D on channels 1, 2 and 4, respectively. CAT2 CCA 1117C is unsuccessful for channel 3, so TRP1 1104 does not transmit/receive a burst on channel 3 in the second joint access period. There is a new contention window 1120 as part of a third joint access period. The CAT4 CCA is shown to fail in contention window 1120.

Referring to TRP2 1106, after the end of COTs 1131A, 1131B and 1131C of channels 1, 2 and 3, TRP2 1106 remains idle with respect to accessing, transmitting or receiving on the unlicensed channels until prior to $t_{target}$ 1125. Prior to $t_{target}$ 1125, for each of the channels, there is a short pre-defined period 1135A, 1135B, 1135C, 1135D for performing a CAT2 CCA on each respective channel. CAT2 CCA 1135A and 1135B are successful for channels 1 and 2, so TRP2 1106 transmits and may receive data within COTs 1137A and 1137B on channels 1 and 2, respectively. CAT2 CCA 1135C and 1135D are unsuccessful for channels 3 and 4, so TRP2 1106 does not transmit/receive a burst on channels 3 and 4 in the second joint access period.

Referring to TRP3 1108, after the end of the COTs 1161A, 1161B, 1161C and 1161D of channels 1, 2, 3 and 4, TRP3 1108 remains idle with respect to accessing, transmitting or receiving on the unlicensed channels until prior to $t_{target}$ 1125. Prior to $t_{target}$ 1125, for each of the channels, there is a short pre-defined period 1164A, 1164B, 1164C, 1164D for performing a CAT2 CCA on each respective channel. CAT2 CCA 1164A, 1164C and 1164D are successful for channels 1, 3 and 4, so TRP3 1108 transmits and may receive data within COTs 1165A, 1165C and 1165D on channels 1, 3 and 4, respectively. CAT2 CCA 1164B is unsuccessful for channel 2, so TRP3 1108 does not transmit/receive a burst on channel 2 in the second joint access period.

Figure 11B:
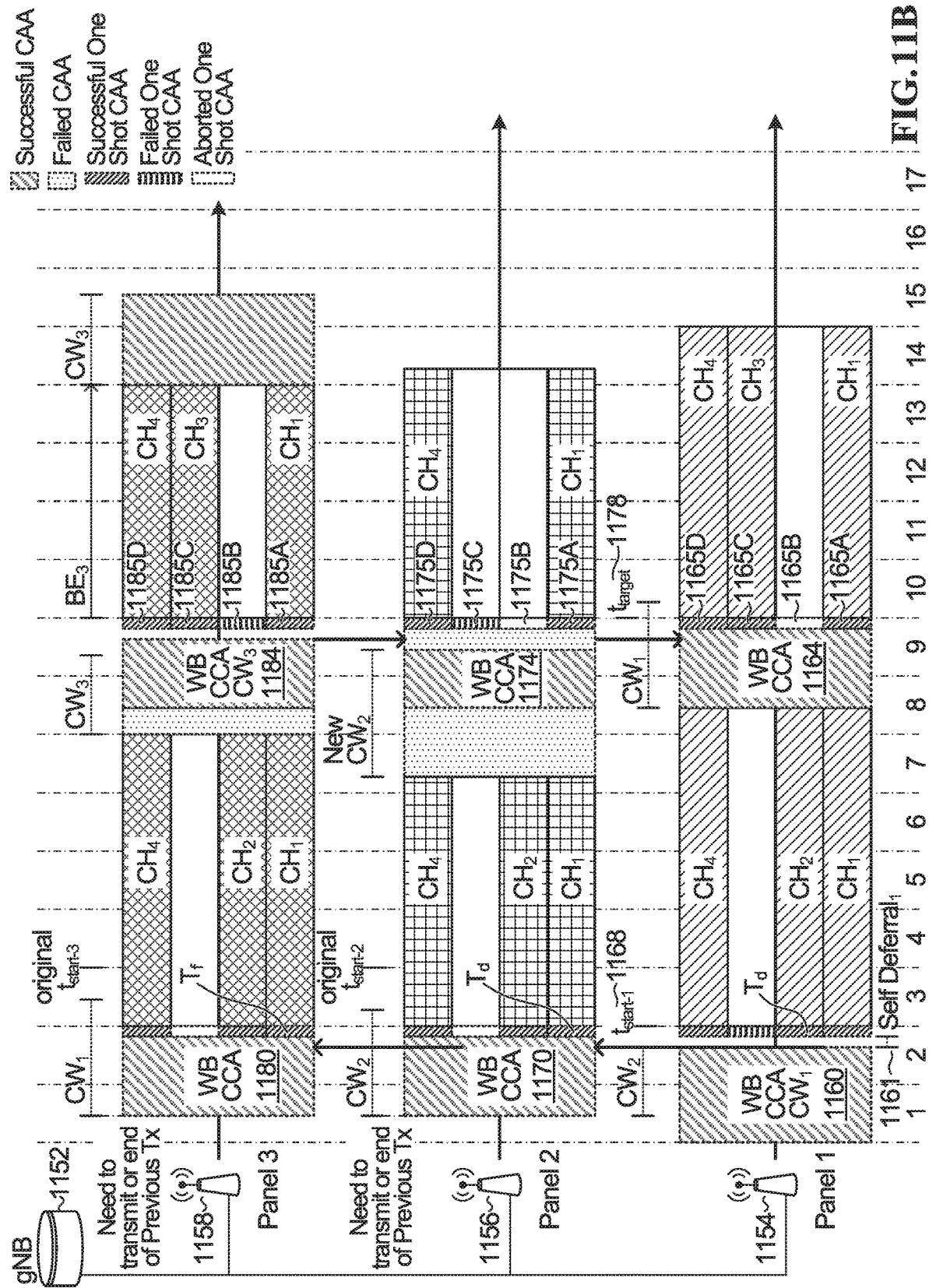
FIG. 11B is a diagram illustrating a seventh example for a group of TRPs attempting to jointly accessing a multiple channels in unlicensed spectrum according to one embodiment of the present disclosure.

FIG. 11B is described with regard to the use of three antenna panels associated with, and controlled by a gNB, as opposed to multiple TRPs being controlled by a controller, as in the example of FIG. 11A. However, it is to be understood that the same procedure could apply to multiple TRPs being coordinated by a controller, or to multiple antenna panels of multiple TRPs. In FIG. 11B a spatial domain primary panel is designated and the remaining panels are designated spatial domain secondary panels. In FIG. 11B, in a first joint access period instead of a panel being pre-selected as the spatial domain primary panel, panel1 1154 completes a WB CCA 1160 before WB CCAs 1170 and 1180 of the other two panels 1156 and 1158 and therefore sends a notification to gNB 1150, panel2 1156 and panel3 1158 designating itself the spatial domain primary panel. In addition, the notification causes the WB CCAs 1170 and 1180 to truncate prior to $t_{target}$ 1168 of panel1 1154 for the first joint access period. Therefore, all three panels have the same $t_{target}$, which can be different than the originally scheduled $t_{target}$ for panel2 1156 and panel3 1158.

Once panel1 1154 has completed the WB CCA 1160, there is a brief self-deferral period 1161. A sub-band CAT2 CCA 1162A, 1162B, 1162C and 1162D occurs after the self-deferral period 1161 and ends at $t_{target}$ 1168.

In the example of FIG. 11B, if a channel of the spatial domain primary panel is found not to be accessible, then that channel is also considered not to be accessible for the spatial domain secondary panels. In the brief period between when WB CCAs 1170 and 1180 are truncated and $t_{target}$ 1168, panel2 1156 and panel3 1158 each switch from WB CCA to CAT2 sub-band CCA.

In the second joint access period, spatial domain secondary Panel2 1156 fails WB CCA 1174 before the counter reaches zero and spatial domain secondary panel3 1158 completes WB CCA 1184 first. Panel3 1158 sends a notification to gNB 1150 designating itself the spatial domain primary panel. In some embodiments, panel 1158 sends the notification to panel1 1154 and panel2 1156. In other embodiments, gNB 1150 sends the notification to panel1 1154 and panel2 1156. Before $t_{target}$ 1178 switches to a sub-band CCA 1185A, 1185B, 1185C and 1185D. Panel3 1158 senses channel 2 as busy, so it is unavailable, but senses that channels 1, 3 and 4 are accessible.

Also in the second joint access period, spatial domain panel1 1154 receives the notification that spatial domain panel 3 is the new spatial domain primary panel and switches to a sub-band CAT2 CCA 1165A, 1165B, 1165C and 1165D. Panel1 1154 senses channel 2 as busy, so it is unavailable, but senses that channels 1, 3 and 4 are accessible.

Also, in the second joint access period, spatial domain panel2 1156 receives the notification that spatial domain panel31158 is the new spatial domain primary panel and switches to a sub-band CCA 1175A, 1175B, 1175C and 1175D. Panel21156 senses channels 2 and 3 as busy, so they are unavailable, but senses that channels 1 and 4 are accessible.

In some embodiments, employing a Type B-like procedure in both spatial and frequency domains provides fast low-complexity joint TRP access to multiple channels with reduced calculation and coordination of $t_{target}$ for the current joint access period, yet at the expense of higher probability of blocking due to dependency on a single channel. However, the embodiment of FIG. 11B mitigates the latter issue by employing WB CAT4 CCA on the spatial domain primary panel and switching to sub-band CAT2 CCA per channel before the transmission start time, especially once the WB CCA fails at a CCA slot. As such, channel access of spatial domain secondary panels to each unlicensed channel depends on the spatial domain primary CCA result on the corresponding unlicensed channel, in addition to their respective CAT2 CCA.

In another embodiment of joint multi-channel access using the spatial domain Type B (not captured in the figures), a self-deferral period and a CAT2 CCA may not be needed after a successful WB or sub-band CAT4 CCA by the spatial domain primary TRP. Rather the spatial domain primary TRP may start a transmission immediately upon the success of the WB or sub-band CAT4 CCA using a mini-slot/partial sub-frame and/or cyclic prefix (CP) extension to fill the time gap, if any, until the earliest alignment boundary. In such case, CAT2 CCA for a spatial secondary TRP is performed such that it ends at the transmission starting point of the spatial domain primary TRP, e.g., based on prior knowledge of the spatial domain primary TRP's CW period or back-off counter value.

Embodiments consistent with what is described for FIG. 11 may be particularly suitable for intra-site panels of the same gNB due to more efficient backhaul communications.

In some embodiments, applying Type B-like processes in the spatial domain to generate the back-off counters of the primary channels may improve coexistence fairness with other nodes from same or different RATs.

FIG. 12 illustrates two consecutive joint access periods for access of multiple unlicensed channels by each TRP or panel, each illustrating a different embodiment of a combination of a Type B-like procedure in the spatial domain and a Type A-like procedure in the frequency domain. The first joint access period illustrates a first example of combining a Type B-like procedure in the spatial domain and a Type A-like procedure in the frequency domain and the second joint access period illustrates a second example of combining a Type B-like procedure in the spatial domain and a Type A-like procedure in the frequency domain. In FIG. 12 each TRP is attempting to access four channels. Each of the channels is selected to have a spatial domain primary TRP. The TRPs 1204, 1206, and 1208 communicate with the controller 1202 for coordinating the $t_{target}$ and keeping the controller and other TRPs apprised of failures accessing one or more channels.

In the first joint access period, the various channels have different $t_{target}$ times, which means that the $t_{target}$ are not necessarily aligned with one another because the back off counters of the spatial domain primary TRPs for each channel are generated and maintained independently from one another from individual distributions. Maintenance and adjustment of the CW on a given frequency channel can be based at least on the HARQ-ACK values corresponding to a reference slot/subframe of all the spatial transmissions on the respective channel.

In FIG. 12, TRP1 1204 is selected as the spatial domain primary TRP for channels 2 and 3 for both joint access periods. TRP2 1206 is selected as the spatial domain primary TRP for channel 1 in the two separate example joint access periods. TRP3 1208 is selected as the spatial domain primary TRP for channel 4 in the two separate example joint access periods. The spatial domain primary TRP does not need to be maintained for the same channel for each joint access period, as the spatial domain primary TRP for a given channel can be reconfigured for different joint access channels.

In the first joint access period, for TRP1 1204 and channels 2 and 3, a first contention window for performing a WB CCA 1210 starts within interval 2. A WB CCA is used in this case because channels 2 and 3 are adjacent to one another. A self-deferral interval 1211 occurs between the end of the WB CCA 1210 and a determined $t_{targetCH2/CH3}$ 1209. The $t_{targetCH2/CH3}$ 1209 begins at interval 4. Because WB CCA 1210 is successful, prior to the $t_{targetCH2/CH3}$ 1209, for each of channels 2 and 3, there is a short pre-defined period 1212B and 1212C for performing a CAT2 CCA on each of channels 2 and 3, respectively. The CAT2 CCA 1212B and 1212C are successful and therefore TRP1 1204 transmits and may receive data within COTs 1213B and 1213C, on each of channels 2 and 3, respectively.

For TRP2 1206 and channels 2 and 3, prior to $t_{targetCH2/CH3}$ 1209, for each of channels 2 and 3, there is a short pre-defined period 1232B and 1232C for performing a CAT2 CCA on each of channels 2 and 3, respectively. The CAT2 CCA 1232B and 1232C are successful and therefore TRP2 1206 transmits and may receive data within COTs 1233B and 1233C, on each of channels 2 and 3, respectively.

For TRP3 1208 and channels 2 and 3, prior to $t_{targetCH2/CH3}$ 1209, for each of channels 2 and 3, there is a short pre-defined period 12628 and 1262C for performing a CAT2 CCA on each of channels 2 and 3, respectively. The CAT2 CCA 12628 and 1262C are successful and therefore TRP3 1208 transmits and may receive data within COTs 12638 and 1263C, on each of channels 2 and 3, respectively.

Also in the first joint access period, for TRP2 1206 and channel 1, a first contention window 1230 for performing a CAT4 CCA 1230A starts at the beginning of interval 1. The CAT4 CCA 1230A is unsuccessful because a signal is detected on channel 1. A self-deferral interval 1231 occurs between the end of the CAT4 CCA 1230A and $t_{targetCH1}$ 1219. The $t_{targetCH1}$ 1219 begins at interval 3. Prior to the $t_{targetCH1}$ 1219, for channel 1, there is a short pre-defined period 1236 for performing a CAT2 CCA on channel 1. The CAT2 CCA is unsuccessful and therefore nothing is transmitted/received, because channel 1 is considered to be unavailable.

For TRP1 1204 and channel 1, prior to the $t_{targetCH1}$ 1219, for channel 1, there is a short pre-defined period 1214 for performing a CAT2 CCA. The CAT2 CCA is unsuccessful and therefore nothing is transmitted/received, because channel 1 is considered to be unavailable.

For TRP3 1208 and channel 1, prior to the $t^{targetCH1}$ 1219, for channel 1, there is a short pre-defined period 1264 for performing a CAT2 CCA. The CAT2 CCA is unsuccessful and therefore nothing is transmitted/received, as channel 1 is considered to be unavailable.

Also in the first joint access period, for TRP3 1208 and channel 4, a first contention window for performing a CAT4 CCA 1260 starts prior to interval 1. A self-deferral interval 1261 occurs between the end of the CAT4 CCA 1260 and $t_{targetCH4}$ 1229. Prior to $t_{targetCH4}$ 1229, for channel 4, there is a short pre-defined period 1262 for performing a CAT2 CCA on channel 4. CAT2 CCA 1262 is successful for channel 4, so TRP3 1208 transmits and may receive data within COT 1263 on channel 4.

For TRP1 1204 and channel 4, prior to the $t_{targetCH4}$ 1229, for channel 4, there is a short pre-defined period 1215 for performing a CAT2 CCA. The CAT2 CCA is successful and therefore TRP1 1204 transmits and may receive data within COT 1216 on channel 4.

For TRP2 1206 and channel 4, prior to the $t_{targetCH4}$ 1229, for channel 4, there is a short pre-defined period 1234 for performing a CAT2 CCA. The CAT2 CCA is successful and therefore TRP2 1206 transmits and may receive data within COT 1235 on channel 4.

In the second joint access period, instead of the various channels having different $t_{target}$ times, all the channels have a same target time because the back off counters of the spatial domain primary TRPs for each channel are generated and maintained form a single distribution. Therefore the $t_{target}$ aligned for the various is channels. Maintenance and adjustment of this common CW can be based at least on the HARQ-ACK values corresponding to a reference slot/sub-frame of all the space-frequency transmissions.

In the second joint access period, for TRP1 1204 and channels 2 and 3, a first contention window for performing a WB CCA 1220 starts at the beginning of interval 11. A self-deferral interval 1221 occurs between the end of the WB CCA 1220 and a determined $t_{target}$ 1239. The $t_{target}$ 1239 begins at interval 13. Because WB CCA 1220 is successful, prior to the $t_{target}$ 1239, for each of channels 2 and 3, there is a short pre-defined period 1222B and 1222C for performing a CAT2 CCA on each of channels 2 and 3, respectively. The CAT2 CCA 1222B and 1222C are successful and therefore TRP1 1204 transmits and may receive data within COTs 1223B and 1223C, on each of channels 2 and 3, respectively.

For TRP2 1206 and channels 2 and 3, prior to $t_{target}$ 1239, for each of channels 2 and 3, there is a short pre-defined period 1242B and 1242C for performing a CAT2 CCA on each of channels 2 and 3, respectively. The CAT2 CCA 1242B and 1242C are successful and therefore TRP2 1206 transmits and may receive data within COTs 1243B and 1243C, on each of channels 2 and 3, respectively.

For TRP3 1208 and channels 2 and 3, prior to $t_{target}$ 1239, for each of channels 2 and 3, there is a short pre-defined period 1265B and 1265C for performing a CAT2 CCA on each of channels 2 and 3, respectively. The CAT2 CCA 12658 and 1265C are successful and therefore TRP3 1208 transmits and may receive data within COTs 12688 and 12638, on each of channels 2 and 3, respectively.

Also in the second joint access period, for TRP2 1206 and channel 1, a first contention window 1240 for performing a CAT4 CCA 1240A starts at the beginning of interval 11. The CAT4 CCA 1240A is unsuccessful because a signal is detected on channel 1. A self-deferral interval 1241 occurs between the end of the CAT4 CCA 1240A and $t_{target}$ 1229. The $t_{target}$ 1239 begins at interval 13. Prior to the $t_{target}$ 1239, for channel 1, there is a short pre-defined period 1246 for performing a CAT2 CCA on channel 1. The CAT2 CCA is unsuccessful and therefore nothing is transmitted/received, because channel 1 is considered to be unavailable.

For TRP1 1204 and channel 1, prior to the $t_{target}$ 1239, for channel 1, there is a short pre-defined period 1224 for performing a CAT2 CCA. The CAT2 CCA is unsuccessful and therefore nothing is transmitted/received, because channel 1 is considered to be unavailable.

For TRP3 1208 and channel 1, prior to the $t_{target}$ 1239, for channel 1, there is a short pre-defined period 1267 for performing a CAT2 CCA. The CAT2 CCA is unsuccessful and therefore nothing is transmitted/received, because channel 1 is considered to be unavailable.

Also in the second joint access period, for TRP3 1208 and channel 4, a first contention window for performing a CAT4 CCA 1270 starts at interval 11. A self-deferral interval 1271 occurs between the end of the CAT4 CCA 1270 and $t_{target}$ 1239. Prior to $t_{target}$ 1239, for channel 4, there is a short pre-defined period 1272 for performing a CAT2 CCA on channel 4. CAT2 CCA 1272 is successful for channel 4, so TRP3 1208 transmit and may receive data within COT 1273 on channel 4.

For TRP1 1204 and channel 4, prior to the $t_{target}$ 1239, for channel 4, there is a short pre-defined period 1225 for performing a CAT2 CCA. The CAT2 CCA is successful and therefore TRP1 1204 transmit and may receive data within COT 1226 on channel 4.

For TRP2 1206 and channel 4, prior to the $t_{target}$ 1239, for channel 4, there is a short pre-defined period 1244 for performing a CAT2 CCA. The CAT2 CCA is successful and therefore TRP2 1206 transmits and may receive data within COT 1245 on channel 4.

Figure 13:
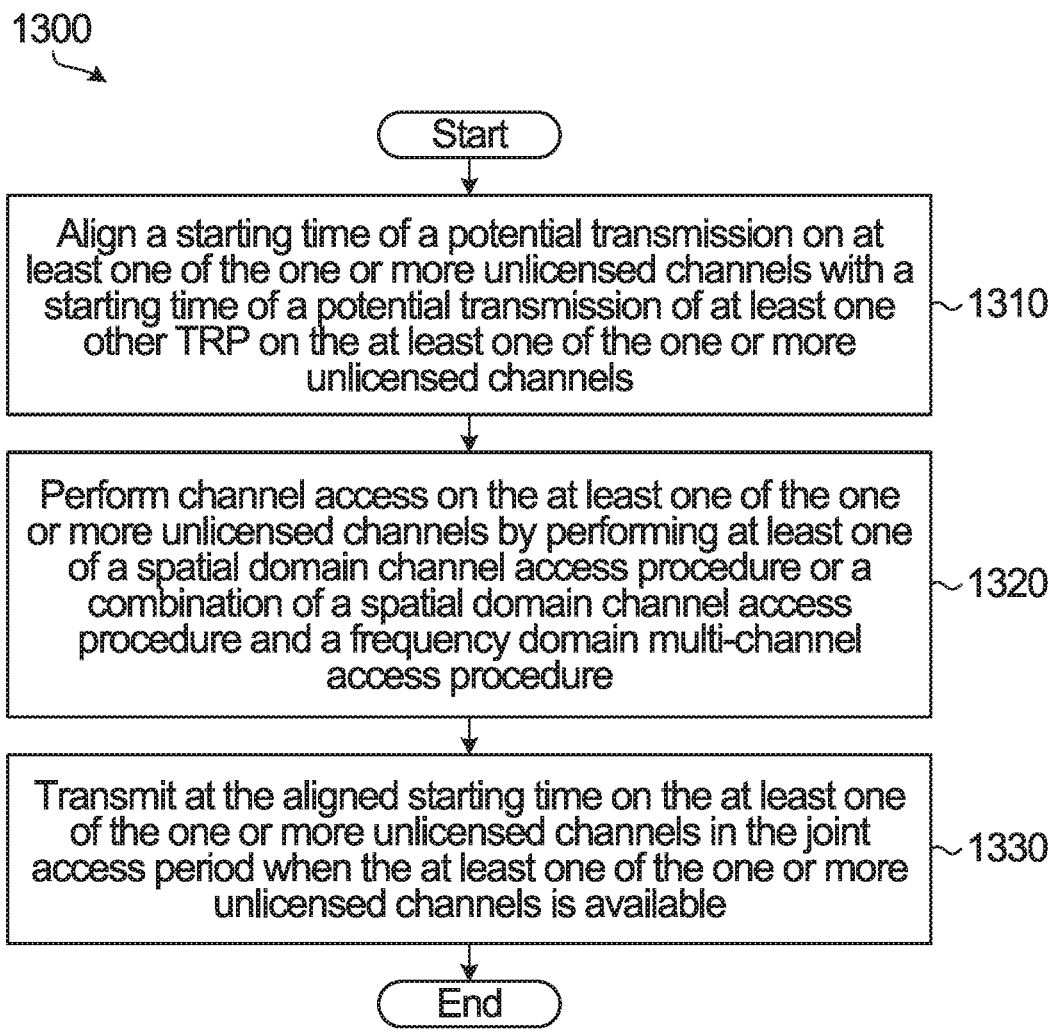
FIG. 13 is a flow chart describing a method according to a first aspect of the application.

In some embodiments of the application, there is provided a method for a transmit receive point (TRP) to access one or more unlicensed channels in an unlicensed spectrum jointly with at least one other TRP. FIG. 13 is a flow chart 1300 illustrating steps in an example method. Step 1310 includes aligning a starting time of a potential transmission on at least one of the one or more unlicensed channels with a starting time of a potential transmission of at least one other TRP on the at least one of the one or more unlicensed channels. Step 1320 include performing channel access on the at least one of the one or more unlicensed channels by performing at least one of a spatial domain channel access procedure or a combination of a spatial domain channel access procedure and a frequency domain multi-channel access procedure. Step 1330 includes transmitting at the aligned starting time on the at least one of the one or more unlicensed channels in the joint access period when the at least one of the one or more unlicensed channels is available.

In some embodiments, the method further includes receiving a configuration from a central controller including an indication of a type of a spatial domain channel access procedure and a type of a frequency domain multi-channel access procedure to be used for joint access to the one or more unlicensed channels.

In some embodiments, performing channel access comprises performing a first type of clear channel assessment (CCA) for at least one of the one or more unlicensed channels by configuring the TRP with a random back-off counter for at least one unlicensed channel for the first type of CCA.

In some embodiments, configuring the TRP with a random back-off counter for at least one unlicensed channel for a first type of CCA comprises configuring the TRP with a different random back-off counter for one of the unlicensed channels than a random back-off counter for one of the unlicensed channels for the at least one other TRP.

In some embodiments, configuring the TRP with a random back-off counter for at least one unlicensed channel for a first type of CCA comprises configuring the TRP with the same random back-off counter for one of the unlicensed channels as a random back-off counter for one of the unlicensed channels for the at least one other TRP.

In some embodiments, the random back-off counter is generated from a single distribution for a contention window based at least in part on the channel access priority class.

In some embodiments, the random back-off counter is generated from a distribution for a contention window corresponding to a largest channel access priority class value of all of the unlicensed channels across the set of the TRP and the at least one other TRP.

In some embodiments, configuring the TRP with a random back-off counter for at least one unlicensed channel for a first type of CCA comprises configuring the TRP with a random back-off counter for all of the unlicensed channels that is different than a random back-off counter for all of the unlicensed channels for the at least one other TRP.

In some embodiments, the TRP with a random back-off counter for at least one unlicensed channel for a first type of CCA comprises configuring the TRP with a random back-off counter for all of the unlicensed channels that is that same as a random back-off counter for all of the unlicensed channels for the at least one other TRP.

In some embodiments, performing the first type of CCA for at least one of the one or more unlicensed channels comprises performing a wideband (WB) CCA for all of the unlicensed channel simultaneously.

In some embodiments, the method further includes, upon the TRP determining that the WB channel is busy during a CCA slot of the WB CCA, changing from the WB CCA to sub-band CCA for the remaining CCA slots without terminating the channel access procedure for each separate unlicensed channel.

In some embodiments, determining that the WB channel is busy during a CCA slot of the WB CCA comprises receipt of a notification of CCA failure.

In some embodiments, the method further includes the TRP performing a second type of CCA for at least one of the one or more unlicensed channels immediately prior to the starting time of the potential transmission on the one or more of the unlicensed channels.

In some embodiments, the method further includes, when the first type of CCA or the second type of CCA senses an unlicensed channel to be busy during a CCA slot, the TRP sending a notification of at least one of a CCA failure and a missed starting time of a potential transmission to the at least one other TRP.

In some embodiments, the method further includes receiving a notification of an earlier starting time of a potential transmission than a previously scheduled starting time of a potential transmission and realigning the starting time of the potential transmission accordingly.

In some embodiments, a duration between an end of the first type of CCA and the starting time of a potential transmission are defined by at least one of a self-deferral duration, a post-back-off CCA and a duration of a second type of CCA.

Figure 14:
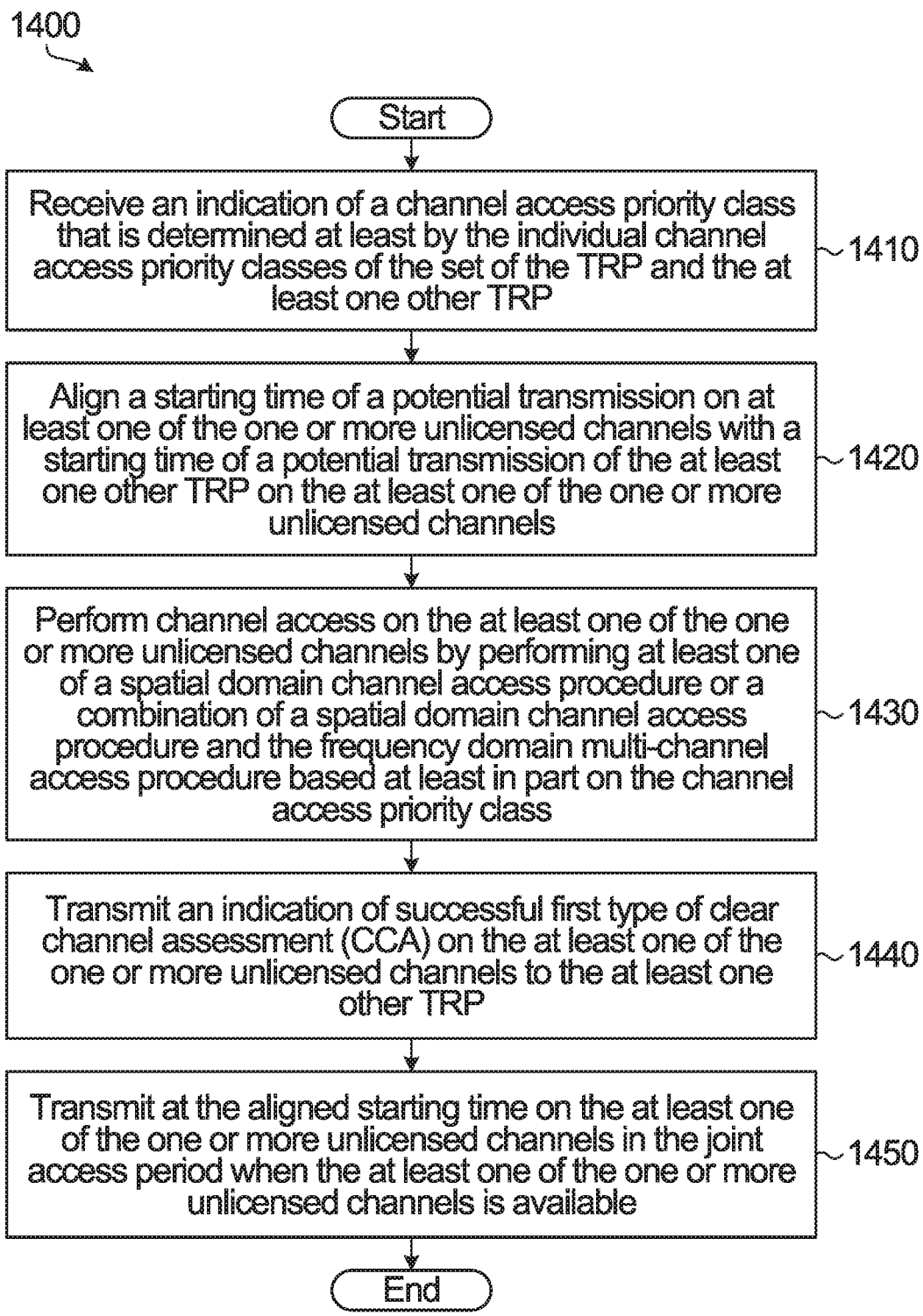
FIG. 14 is a flow chart describing a method according to a second aspect of the application.

In some embodiments of the application, there is provided a method for a transmit receive point (TRP) to access one or more unlicensed channels in an unlicensed spectrum jointly with at least one other TRP. FIG. 14 is a flow chart 1400 illustrating steps in an example method. Step 1410 includes receiving an indication of a channel access priority class that is determined at least by the individual channel access priority classes of the set of the TRP and the at least one other TRP. Step 1420 involves aligning a starting time of a potential transmission on at least one of the one or more unlicensed channels with a starting time of a potential transmission of the at least one other TRP on the at least one of the one or more unlicensed channels. Step 1430 includes performing channel access on the at least one of the one or more unlicensed channels by performing at least one of a spatial domain channel access procedure or a combination of a spatial domain channel access procedure and the frequency domain multi-channel access procedure based at least in part on the channel access priority class. Step 1440 includes transmitting an indication of successful first type of clear channel assessment (CCA) on the at least one of the one or more unlicensed channels to the at least one other TRP. Step 1450 includes transmitting at the aligned starting time on the at least one of the one or more unlicensed channels in the joint access period when the at least one of the one or more unlicensed channels is available.

In some embodiments, the method further includes receiving a configuration from a central controller indicating a type of the spatial domain channel access procedure or a type of combination of the spatial domain channel access procedure and the frequency domain multi-channel access procedure to be used for joint access to the one or more unlicensed channels.

In some embodiments, the TRP is assigned as a primary TRP based upon a controller selecting the TRP as the primary TRP or the TRP contending to be the primary TRP by being a first TRP to complete a first type of CCA.

In some embodiments, performing channel access comprises performing the first type of CCA for at least one of the one or more unlicensed channels by configuring the primary TRP with a random back-off counter for at least one unlicensed channel for the first type of CCA.

In some embodiments, configuring the primary TRP with a random back-off counter for at least one unlicensed channel for a first type of CCA comprises configuring the primary TRP with a different random back-off counter for one of the unlicensed channels than a random back-off counter for one of the unlicensed channels for the secondary TRPs.

In some embodiments, configuring the primary TRP with a random back-off counter for at least one unlicensed channel for a first type of CCA includes configuring the primary TRP with the same random back-off counter for one of the unlicensed channels as a random back-off counter for one of the unlicensed channels for the secondary TRPs.

In some embodiments, the random back-off counter is generated from a single distribution for a contention window based at least in part on the channel access priority class.

In some embodiments, the random back-off counter is generated from a distribution for a contention window corresponding to a largest channel access priority class value of all of the unlicensed channels across the set of the TRP and the at least one other TRP.

In some embodiments, performing the first type of CCA for at least one of the one or more unlicensed channels includes performing a wideband (WB) CCA for a subset of the unlicensed channels simultaneously.

In some embodiments, the method further includes upon receipt of a notification of CCA failure, changing from the WB CCA to sub-band CCA for the remaining CCA slots without terminating the channel access procedure for each separate unlicensed channel.

In some embodiments, the method further includes configuring the TRP with a random back-off counter for at least one unlicensed channel for a first type of CCA that includes assigning at least one unlicensed channel to the TRP, so that the TRP is a primary TRP to the at least one unlicensed channel and configuring the primary TRP with a random back-off counter for the at least one unlicensed channel of that primary TRP.

In some embodiments, the method further includes the primary TRP performing a second type of CCA for at least one of the one or more unlicensed channels immediately prior to the starting time of the potential transmission on the one or more of the unlicensed channels.

In some embodiments, the method further includes when the first type of CCA or the second type of CCA of the primary TRP senses an unlicensed channel to be busy during a CCA slot, the primary TRP sending a notification of CCA failure to the at least one other TRP.

In some embodiments, the method further includes the primary TRP performing the channel access procedure, even if the primary TRP has nothing to transmit in the current joint access period, upon receiving a channel access request from a secondary TRP and the primary TRP not transmitting in the joint access period although one or more unlicensed channels are available.

In some embodiments, the method further includes the primary TRP providing one or more blanking periods, subsequent to the starting time of the potential transmission, during which a second type of CCA can be performed.

In some embodiments, the primary TRP providing one or more blanking periods occurs as a result of a switching period between downlink (DL) and uplink (UL) transmissions or upon receipt of an notification of a CCA failure from the at least one other TRP.

In some embodiments, the method further includes a duration between an end of the first type of CCA and the starting time of a potential transmission are defined by at least one of a self-deferral duration, a postback-off CCA and a duration of a second type of CCA.

Figure 15:
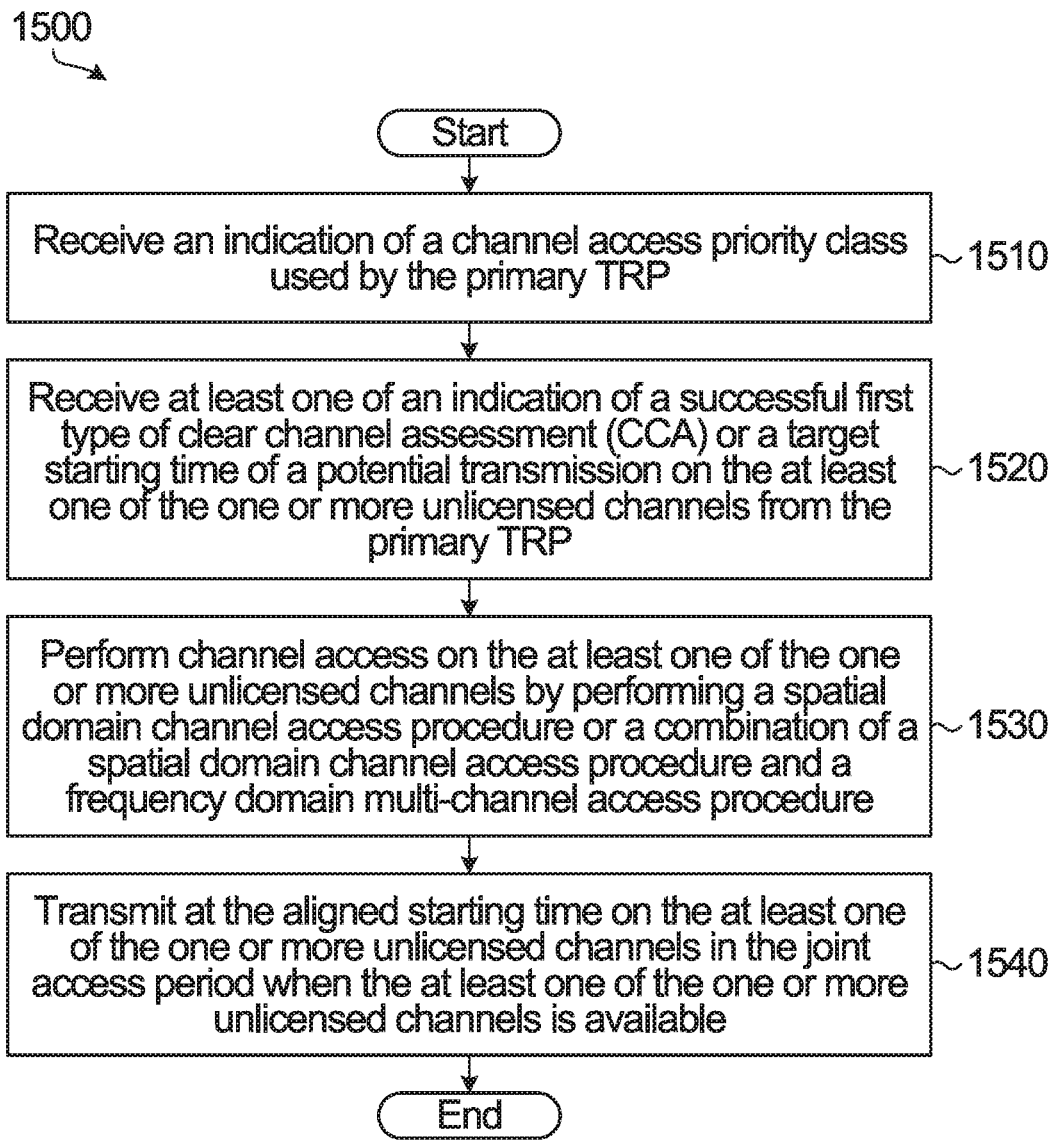
FIG. 15 is a flow chart describing a method according to a third aspect of the application.

In some embodiments of the application, there is provided a method for a secondary transmit receive point (TRP) to access one or more unlicensed channels in an unlicensed spectrum jointly with a primary TRP. FIG. 15 is a flow chart 1500 illustrating steps in an example method. Step 1510 includes receiving an indication of a channel access priority class used by the primary TRP. Step 1520 includes receiving at least one of an indication of a successful first type of clear channel assessment (CCA) or a target starting time of a potential transmission on the at least one of the one or more unlicensed channels from the primary TRP. Step 1530 includes performing channel access on the at least one of the one or more unlicensed channels by performing a spatial domain channel access procedure or a combination of a spatial domain channel access procedure and a frequency domain multi-channel access procedure. Step 1540 includes transmitting at the aligned starting time on the at least one of the one or more unlicensed channels in the joint access period when the at least one of the one or more unlicensed channels is available.

In some embodiments, the method further includes aligning a starting time of a potential transmission on at least one of the one or more unlicensed channels with a starting time of a potential transmission of the primary TRP on the at least one of the one or more unlicensed channels.

In some embodiments, the method further includes the secondary TRP sending a channel access request to the primary TRP when the secondary TRP intends to transmit during the current joint access period regardless of whether the primary TRP intends to transmit in the current joint access period or not.

In some embodiments, the method further includes the secondary TRP performing a second type of CCA for at least one of the one or more unlicensed channels immediately prior to the target transmission start time for jointly transmitting on the one or more of the unlicensed channels.

In some embodiments, the method further includes when the second type of CCA senses an unlicensed channel to be busy that results in the secondary TRP making a determination that the unlicensed channel is unavailable to the secondary TRP, the secondary TRP sending a notification of a CCA failure to the at least one TRP.

In some embodiments, the method further includes the TRP providing one or more blanking periods, subsequent to the starting time of the potential transmission, during which a second type of CCA can be performed.

In some embodiments, the TRP providing one or more blanking periods occurs as a result of a switching period between downlink (DL) and uplink (UL) transmissions or upon receipt of an notification of a CCA failure from the at least one TRP.

In some embodiments, the method further includes performing the second type of CCA for at least one of the one or more unlicensed channels comprises performing a wideband (WB) CCA for a subset of adjacent channels of the one or more unlicensed channels simultaneously.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

What is claimed is:

1. A method for a first transmit receive point (TRP) to access one or more unlicensed channels in an unlicensed spectrum jointly with a second TRP spatially separated from the first TRP, the method comprising:

performing, by the first TRP, a first clear channel assessment (CCA) on the one or more unlicensed channels for a first downlink transmission by performing at least one of a spatial domain channel access procedure or a combination of the spatial domain channel access procedure and a frequency domain multi-channel access procedure;

aligning a starting time of the first downlink transmission of the first TRP with a starting time of a second downlink transmission of the second TRP, the aligned starting time determined in accordance with at least a contention window duration of a second CCA independently performed by the second TRP on the one or more unlicensed channels, the contention window duration of the second CCA being randomly generated; and transmitting the first downlink transmission at the aligned starting time on a first unlicensed channel upon detecting that the first unlicensed channel is available, the first unlicensed channel belonging to the one or more unlicensed channels, both the first downlink transmission and the second downlink transmission being transmitted on the first unlicensed channel at the aligned starting time in accordance with the spatial domain channel access procedure.

2. The method of claim 1 further comprising receiving a configuration from a central controller including an indication of a type of the spatial domain channel access procedure and a type of the frequency domain multi-channel access procedure to be used for joint access to the one or more unlicensed channels.

3. The method of claim 1, wherein performing the first CCA comprises performing the first CCA of a first type for the one or more unlicensed channels by configuring the first TRP with a random back-off counter for the one or more unlicensed channel for the first CCA of the first type.

4. The method of claim 3, wherein configuring the first TRP with the random back-off counter for the one or more unlicensed channel for the first CCA of the first type comprises configuring the first TRP with a different random back-off counter for one of the unlicensed channels than a random back-off counter for one of the unlicensed channels for the second TRP.

5. The method of claim 3, wherein configuring the first TRP with the random back-off counter for the one or more unlicensed channel for the first CCA of the first type comprises configuring the first TRP with the same random back-off counter for one of the unlicensed channels as a random back-off counter for one of the unlicensed channels for the second TRP.

6. The method of claim 3, wherein the random back-off counter is generated from a single distribution for a contention window based at least in part on the channel access priority class.

7. The method of claim 3, wherein the random back-off counter is generated from a distribution for a contention window corresponding to a largest channel access priority class value of all of the unlicensed channels across the set of the TRP and the at least one other TRP.

8. The method of claim 3, wherein configuring the first TRP with the random back-off counter for the one or more unlicensed channel for the first CCA of the first type comprises configuring the first TRP with a random back-off counter for all of the unlicensed channels that is different than a random back-off counter for all of the unlicensed channels for the second TRP.

9. The method of claim 3, wherein configuring the first TRP with the random back-off counter for the one or more unlicensed channel for the first CCA of the first type comprises configuring the first TRP with a random back-off counter for all of the unlicensed channels that is the same as a random back-off counter for all of the unlicensed channels for the second TRP.

10. The method of claim 8, wherein performing the first CCA of the first type for the one or more unlicensed channels comprises performing a wideband (WB) CCA for all of the unlicensed channels simultaneously.

11. The method of claim 3, further comprising the first TRP performing a third CCA of a second type for the one or more unlicensed channels prior to the aligned starting time.

12. The method of claim 11 further comprising when the first CCA of the first type or the third CCA of the second type senses an unlicensed channel to be busy during a CCA slot, the first TRP sending a notification of at least one of a CCA failure and a missed starting time of the first downlink transmission of the first TRP to the second TRP.

13. The method of claim 3, wherein a duration between an end of the first CCA of the first type and the aligned starting time is defined by at least one of a self-deferral duration, a post-back-off CCA and a duration of a third CCA of a second type.

14. The method of claim 1, wherein the first TRP is a first antenna set on a gNodeB (gNB), and the second TRP is a second antenna set on the same gNB.

15. The method of claim 14, wherein the first antenna set and the second antenna set having different quasi co-located (QCL) assumptions.

16. The method of claim 1, wherein the first TRP is a first antenna set, and the second TRP is a second antenna set, the first antenna set and the second antenna set having different quasi co-located (QCL) assumptions.

17. A first transmit receive point (TRP) comprising:
at least one antenna configured to transmit or receive a signal, and
a controller configured to:
perform a first clear channel access (CCA) on one or more unlicensed channels for a first downlink transmission by performing at least one of a spatial domain channel access procedure or a combination of the spatial domain channel access procedure and a frequency domain multi-channel access procedure;
align a starting time of the first downlink transmission of the first TRP with a starting time of a second downlink transmission of a second TRP spatially separated from the first TRP, the aligned starting time determined in accordance with at least contention window duration of a second CCA independently performed by the second TRP on the one or more unlicensed channels, the contention window duration of the second CCA being randomly generated; and
transmit the first downlink transmission on a first unlicensed channel upon detecting that the first unlicensed channel is available, the first unlicensed channel belonging to the one or more unlicensed channels, both the first downlink transmission and the second downlink transmission being transmitted on the first unlicensed channel at the aligned starting time in accordance with the spatial domain channel access procedure.

18. The first TRP of claim 17 further configured to receive on the at least one antenna, a configuration from a central controller including an indication of a type of the spatial domain channel access procedure and a type of the frequency domain multi-channel access procedure to be used for joint access to the one or more unlicensed channels.

19. The first TRP of claim 17, wherein the controller configured to perform the first CCA comprises the controller performing the first CCA of a first type for the one or more unlicensed channels by configuring the first TRP with a random back-off counter for one or more unlicensed channel for the first CCA of the first type.

20. The first TRP of claim 19, wherein the controller configuring the first TRP with the random back-off counter for the one or more unlicensed channel for the first CCA of the first type comprises configuring the first TRP with a different random back-off counter for one of the unlicensed channels than a random back-off counter for one of the unlicensed channels for the second TRP.

21. The first TRP of claim 19, wherein the controller configuring the first TRP with the random back-off counter for the one or more unlicensed channel for the first CCA of the first type comprises configuring the first TRP with the same random back-off counter for one of the unlicensed channels as a random back-off counter for one of the unlicensed channels for the second TRP.

22. The first TRP of claim 20, wherein performing the first CCA of the first type for the one or more unlicensed channels comprises performing a wideband (WB) CCA for all of the unlicensed channels simultaneously.

23. The first TRP of claim 17, wherein the first TRP is a first antenna set on a gNodeB (gNB), and the second TRP is a second antenna set on the same gNB.

24. The first TRP of claim 23, wherein the first antenna set and the second antenna set having different quasi co-located (QCL) assumptions.

25. The first TRP of claim 17, wherein the first TRP is a first antenna set, and the second TRP is a second antenna set, the first antenna set and the second antenna set having different quasi co-located (QCL) assumptions.

* * * * *